US011711267B2

(12) United States Patent
Parker et al.

(10) Patent No.: US 11,711,267 B2
(45) Date of Patent: Jul. 25, 2023

(54) 5G NETWORK SLICING WITH DISTRIBUTED LEDGER TRACEABILITY AND RESOURCE UTILIZATION INFERENCING

(71) Applicant: Intel Corporation, Santa Clara, CA (US)

(72) Inventors: Valerie J. Parker, Portland, OR (US); Neal Conrad Oliver, Portland, OR (US); Stephen T. Palermo, Chandler, AZ (US); Hari K. Tadepalli, Gilbet, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/798,946

(22) Filed: Feb. 24, 2020

(65) Prior Publication Data
US 2020/0195495 A1    Jun. 18, 2020

Related U.S. Application Data

(60) Provisional application No. 62/810,012, filed on Feb. 25, 2019.

(51) Int. Cl.
H04L 41/082    (2022.01)
H04L 41/5006   (2022.01)
(Continued)

(52) U.S. Cl.
CPC ........ H04L 41/082 (2013.01); G06F 9/45558 (2013.01); G06F 16/1805 (2019.01); G06F 16/1824 (2019.01); H04L 9/0637 (2013.01); H04L 41/16 (2013.01); H04L 41/5006 (2013.01); H04W 48/18 (2013.01); G06F 2009/45595 (2013.01); H04L 9/50 (2022.05)

(58) Field of Classification Search
None
See application file for complete search history.

(56) References Cited

U.S. PATENT DOCUMENTS

2017/0367081 A1* 12/2017 Cui .................... H04L 41/0816
2020/0029250 A1*  1/2020 Ibek ................... H04L 41/0893
(Continued)

Primary Examiner — Kevin T Bates
Assistant Examiner — Emad Siddiqi
(74) Attorney, Agent, or Firm — Schwegman Lundberg & Woessner, P.A.

(57) ABSTRACT

Various systems and methods for implementing an edge computing system to realize 5G network slices with blockchain traceability for informed 5G service supply chain are disclosed. A system configured to track network slicing operations includes memory and processing circuitry configured to select a network slice instance (NSI) from a plurality of available NSIs based on an NSI type specified by a client node. The available NSIs uses virtualized network resources of a first network resource provider. The client node is associated with the selected NSI. The utilization of the network resources by the plurality of available NSIs is determined using an artificial intelligence (AI)-based network inferencing function. A ledger entry of associating the selected NSI with the client node is recorded in a distributed ledger, which further includes a second ledger entry indicating allocations of resource subsets to each of the NSIs based on the utilization.

20 Claims, 24 Drawing Sheets

(51) Int. Cl.
*H04L 41/16* (2022.01)
*G06F 16/18* (2019.01)
*H04W 48/18* (2009.01)
*G06F 9/455* (2018.01)
*H04L 9/06* (2006.01)
*G06F 16/182* (2019.01)
*H04L 9/00* (2022.01)

(56) References Cited

U.S. PATENT DOCUMENTS

2020/0057860 A1* 2/2020 Patil .................... G06F 21/6209
2020/0396645 A1* 12/2020 Grinshpun .............. A63F 13/65
2021/0091994 A1* 3/2021 Meirosu .............. H04L 41/5006
2021/0385724 A1* 12/2021 Wang ...................... H04L 41/40

* cited by examiner

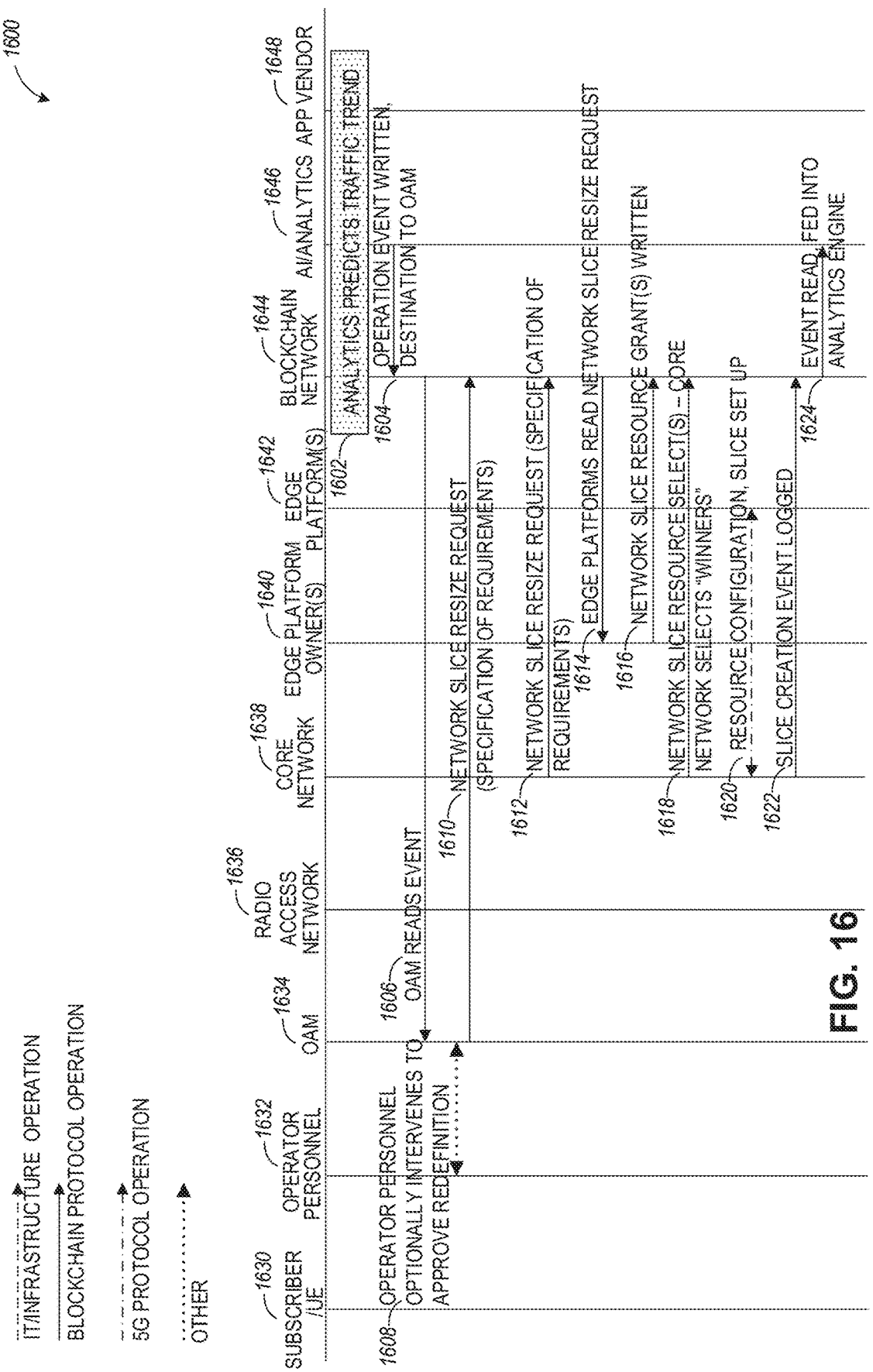

5G NETWORK SLICING WITH DISTRIBUTED LEDGER TRACEABILITY AND RESOURCE UTILIZATION INFERENCING

PRIORITY CLAIM

This application claims the benefit of priority to U.S. Provisional Patent Application Ser. No. 62/810,012, filed Feb. 25, 2019, and entitled "5G NETWORK SLICING WITH BLOCKCHAIN TRACEABILITY FOR INFORMED 5G SERVICE SUPPLY CHAIN," which application is incorporated herein by reference in its entirety.

TECHNICAL FIELD

Embodiments described herein generally relate to data processing, network communication, and communication system implementations, and in particular, to techniques for implementing a multi-access edge computing (MEC) based system to realize network slicing with distributed ledger (e.g., blockchain) traceability for an informed supply chain. Some aspects relate to 5G network slicing with distributed ledger traceability and resource utilization analytics/inferencing, such as artificial intelligence (AI)-based analytics.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for the operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

In a similar manner, Internet-of-Things (IoT) networks and devices are designed to offer a distributed compute arrangement, from a variety of endpoints. IoT devices are physical or virtualized objects that may communicate on a network and may include sensors, actuators, and other input/output components, which may be used to collect data or perform actions in a real-world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, private enterprise networks (e.g., software-defined wide-area networks, or SD-WANs), and IoT networks, devices, and services have introduced a number of advanced use cases and scenarios occurring at and towards the edge of the network. However, these advanced use cases have also introduced a number of corresponding technical challenges relating to security, processing, and network resources, service availability, and efficiency, among many other issues. One such challenge is in relation to achieving traceability of configuring and deploying network resources (e.g., in connection with Communication Service Provider (CSP) Service Level Agreements (SLAs) within an informed 5G supply chain of CSPs, edge platform owners, application vendors, and subscribers. Another challenge may be related to achieving optimal resource allocation of network resources, such as in connection with provisioning network slice instances.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 16 illustrates a flow diagram of example functionalities performed in connection with the re-provisioning of network slice instances using a distributed ledger network for resource management, according to an example.

DETAILED DESCRIPTION

Figure 1A:
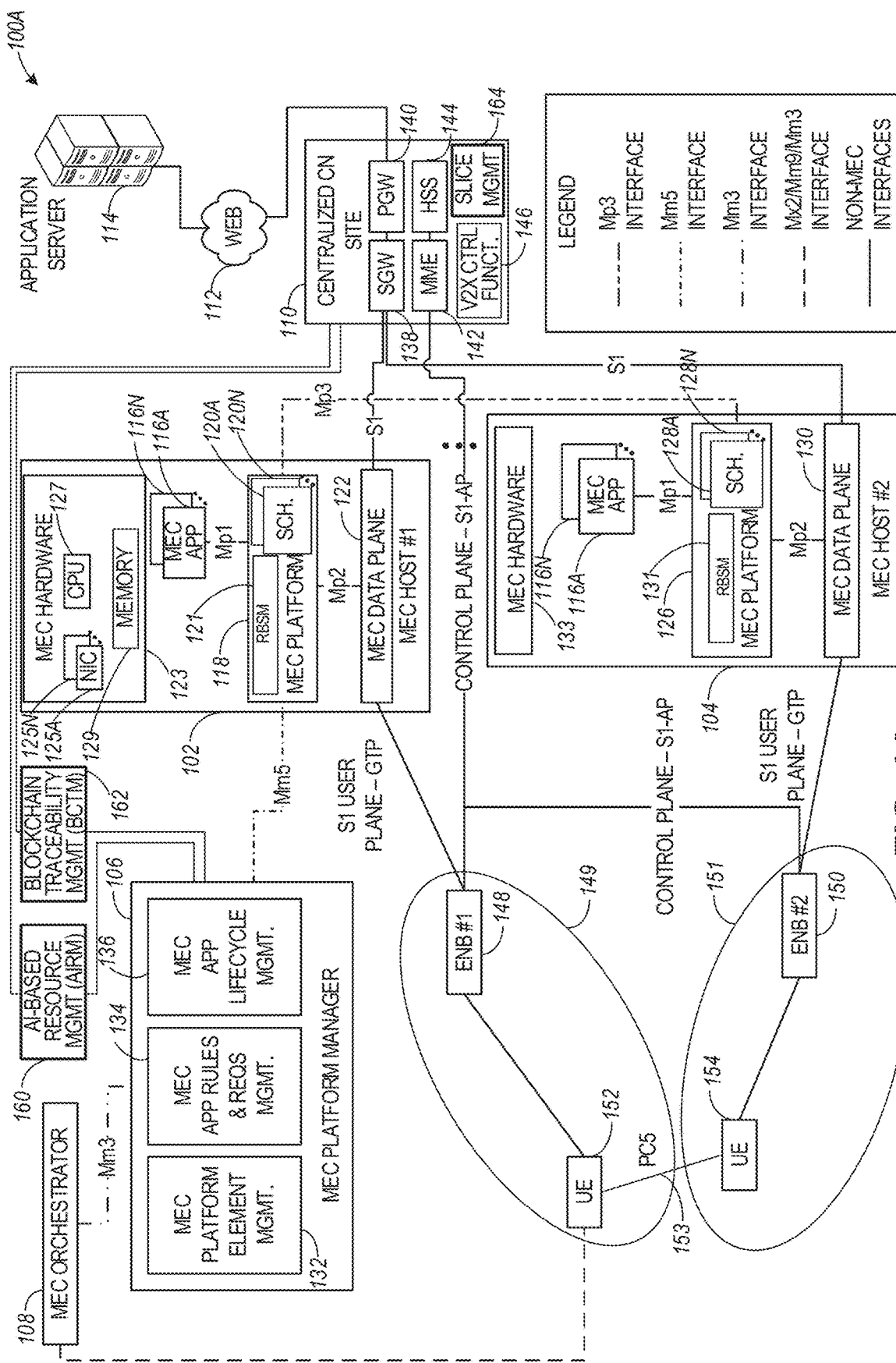
FIG. 1A illustrates a MEC communication infrastructure with a common core network, the MEC infrastructure including slice management, resource management, and traceability functions, according to an example.

In the following description, methods, configurations, and related apparatuses are disclosed for network slicing with blockchain traceability for an informed service supply chain. As an overview, the technological solutions disclosed herein integrate MEC with various types of IoT or Fog networking implementations as well as dynamic network slicing and resource utilization management. These may benefit a variety of use cases, such as fifth generation (5G) network communications among automotive devices, including those use cases termed as vehicle-to-vehicle (V2V), vehicle-to-infrastructure (V2I), and vehicle-to-everything (V2X). As with most MEC installations, the goal with the present configurations is to bring the application endpoints as close to the vehicular environment, or other endpoints, as possible and to dynamically adjust compute resources as well as resources used by one or more network (e.g., 5G) network slice instances (NSIs), including resource usage accountability using distributed ledger (e.g., blockchain) traceability techniques, to enable low latency or high bandwidth services with optimal QoS. These systems and techniques may be implemented in, or augment, virtualized environments that may be implemented within various types of MEC, edge, network function virtualization (NFV), or fully virtualized 5G network environments.

As is understood, edge architectures offer application developers and content providers cloud-computing capabilities and an IT service environment at the edge of the network. This environment offers ultra-low latency and high bandwidth throughput as well as real-time access to radio network information that may be leveraged by applications. Edge network technology permits flexible and rapid deployments of innovative applications and services towards mobile subscribers, enterprises, or vertical segments.

The present techniques and configurations may be utilized in connection with many aspects of current networking systems, but are provided with reference to 5G, edge, IoT, MEC, and NFV deployments. The present techniques and configurations specifically may be (but are not required to be) relevant to the standards and approaches published in 3GPP TS 23.501 V15.3.0 (2018 September) "System Architecture for the 5G System"; ETSI GS MEC-003 "Mobile Edge Computing (MEC); Framework and Reference Architecture" (e.g., V2.0.3); ETSI GS NFV-SEC 013 "Network Functions Virtualization (NFV) Release 3; Security, Security Management and Monitoring" (e.g., v. 3.1.1) and related MEC, NFV, or networked operational implementations. However, while the present techniques and configurations may provide significant benefits to edge architectures and other network architectures, the applicability of the present techniques and configurations may be extended to any number of edge computing devices or fog computing platforms.

The following provides a detailed discussion of these techniques within specific systems and services, but which are applicable to the larger context of IoT and edge computing deployments. Further, the disclosed edge architectures and service deployment examples provide one illustrative example of a Fog device or Fog system, but many other combinations and layouts of devices and systems located at the edge of a network may be provided. Further, the techniques disclosed herein may relate to other IoT and 5G network communication standards and configurations, and other intermediate processing entities and architectures.

In some aspects, techniques disclosed herein can include providing distributed ledger (e.g., blockchain) quality traceability of 5G network slice instances and virtual network services necessary for Service Provider Service Level Agreements (SLAs). In some aspects, techniques disclosed herein can be used for 5G network slicing to enable multiple owners, users, and applications to utilize a communication network in compartments (or slice instances) through the transfer of computing and communication resources. In some aspects, blockchain traceability can be used to provide traceability and tracking (e.g., of resource usage and dynamic resource allocation during dynamic slice usage) to meet SLAs associated with services delivered in the 5G communication environment (within a 5G supply chain).

In some aspects, techniques disclosed herein can include on-demand 5G network slice instance deployments with block chain traceability for an informed 5G service supply chain that includes service providers, regulators, and certain 5G fixed and mobile subscribers. In this regard, the 5G slice and virtual network service traceability requirements can be met while leveraging public key encryption (PKE) hardware acceleration to perform and allow for on-demand 5G network slice instance creation, deployment, and re-configuration. Additionally, techniques discussed herein may use artificial intelligence (AI)-based network inferencing functions to perform resource management in connection with the 5G network slice instance configuration, deployment, and re-configuration. For example, AI-based network inferencing functions may be used to dynamically monitor and predict network resource utilization as well as detect changes in SLAs used in connection with 5G network slice instance management to trigger initial resource allocation as well as re-allocation of the network resources within a specific network slice instance or among a group of network slice instances.

Example Edge Computing Architectures

FIG. 1A illustrates a MEC communication infrastructure 100A with a common core network, the MEC infrastructure including slice management, AI-based resource management, and traceability functions, according to an example. The connections represented by some form of a dashed line (as noted in the legend in FIG. 1A) may be defined according to a specification from an ETSI MEC standards family.

The MEC communication infrastructure 100A can include entities from a MEC-based architecture integrated with a mobile network, such as a 5G mobile network. For example, the MEC communication infrastructure 100A can include a plurality of MEC hosts such as MEC hosts 102 and 104, a MEC platform manager 106, and a MEC orchestrator 108. The 3GPP based entities can include a centralized core network (CN) 110 coupled to an application server 114 via the network 112 (e.g., the Internet), as well as radio access networks (RANs) represented by base stations 148 and 150 coupled to corresponding user equipments (UEs) 152 and 154. The base stations 148 and 150 can include evolved Node-Bs (eNBs), Next Generation Node-Bs (gNBs), or other types of base stations operating in connection with a 3GPP wireless family of standards or another type of wireless standard.

In some aspects, the MEC communication infrastructure 100A can be implemented by different network operators in the same country and/or in different countries, using different network traffic types. For example, the radio access network associated with base station 148 (with a coverage area 149) can be within a first public land mobile network (PLMN) (i.e., associated with a first mobile services provider or operator and a first network traffic type), and base station 150 (with a coverage area 151) can be within a second public land mobile network (PLMN) (i.e., associated with a second mobile services provider or operator and a second network traffic type). As used herein, the terms "mobile services provider" and "mobile services operator" are interchangeable.

In this regard, the MEC communication infrastructure 100A can be associated with a multi-operator scenario composed of two coverage areas 149 and 151 where communication services (e.g., V2X services) can be provided, with each coverage area being operated by a mobile services operator. Additionally, each of the UEs 152 and 154 can be configured for network slice operation, where each UE can use one or more types of network slice instances configured by, e.g., the core network 110 using the slice management functionality 164. Techniques discussed herein can be used to provide resource management and resource usage traceability (e.g., via AI-based resource management (AIRM) module 160 and blockchain traceability management (BC™) module 162) in connection with computing and communication resources used by the UEs and/or the core network in connection with configuring and using network slices (e.g., 5G slices). In some aspects, techniques disclosed herein can be used to dynamically manage resources used for communication slices (e.g., deploy new slices, re-assign resources from one slice to another, close one or more slices, and so forth).

The solid line connections in FIG. 1A represents non-MEC connections, such as utilizing 3GPP cellular network connections S1, S1-AP, etc. Other connection techniques (e.g., protocols) and connections may also be used. Accordingly, in the scenario of FIG. 1A, the system entities (e.g., MEC orchestrator 108, MEC platform manager 106, MEC hosts 102, 104 are connected by MEC (or NFV) logical links (indicated with dashed lines), in addition to network infrastructure links (e.g., a 5G Long Term Evolution (LTE) network, such as provided among UEs 152, 154, eNBs 148, 150, a CN site 110, etc.) (indicated with solid lines). A further connection to cloud services (e.g., an application server 114 access via the network 112) may also be connected via backhaul network infrastructure links.

Techniques disclosed herein apply to 2G/3G/4G/LTE/LTE-A (LTE Advanced) and 5G networks, with the examples and aspects disclosed using 4G/LTE networks. In aspects, the CN 110 may be an evolved packet core (EPC) network, a NextGen Packet Core (NPC) network (e.g., a 5G network), or some other type of CN (e.g., as illustrated in reference to FIGS. 2A-3E). In EPC (Evolved Packet Core), which is associated with 4G/LTE, the CN 110 can include a serving gateway (S-GW or SGW) 138, a packet data network (PDN) gateway (P-GW or PGW) 140, a mobility management entity (MME) 142, and a home subscriber server (HSS) 144 coupled to a V2X control function 146. In 5G, the Core Network is referred to as the NextGen Packet Network (NPC). In NPC (and as illustrated in FIGS. 3A-3D), the S/P-GW is replaced with a user plane function (UPF), and the MME is replaced with two individual functional components, the Access Management Function (AMF) and the Session Management Function (SMF). The 4G HSS is split into different entities in 5G: the Authentication Server Function (AUSF) and the Universal Data Management (UDM), with the subscription data being managed via the Universal Data Management (UDM) function. In EPC, the S1 interface can be split into two parts: the S1-U (user plane) interface which carries traffic data between the eNBs 148, 150 and the S-GW 138 via the MEC hosts 102, 104, and the S1-AP (control plane) interface which is a signaling interface between the eNBs 148, 150 and the MME 142.

The MME 142 may be similar in function to the control plane of legacy Serving General Packet Radio Service (GPRS) Support Nodes (SGSN). The MME 142 may manage mobility aspects in access such as gateway selection and tracking area list management. The HSS 144 may comprise a database for network users, including subscription-related information to support the network entities' handling of communication sessions, including subscription information associated with V2X communications. The CN 110 may comprise one or several HSSs 144, depending on the number of mobile subscribers, on the capacity of the equipment, on the organization of the network, etc. For example, the HSS 144 can provide support for routing/roaming, authentication, authorization (e.g., V2X communication authorization), naming/addressing resolution, location dependencies, etc.

The S-GW 138 may terminate the S1 interface 413 towards the RANs of eNBs 148, 150, and route data packets between the RANs and the CN 110. In addition, the S-GW 138 may be a local mobility anchor point for inter-RAN node handovers and also may provide an anchor for inter-3GPP mobility. Other responsibilities may include charging and some policy enforcement.

The P-GW 140 may terminate an SGi interface toward a PDN. The P-GW 140 may route data packets between the RANs and external networks such as a network including the application server (AS) 114 (alternatively referred to as application function (AF)) via an Internet Protocol (IP) interface (e.g., an interface to the network 112 coupled to the AS 114. The P-GW 140 can also communicate data to other external networks, which can include the Internet, IP multimedia subsystem (IPS) network, and other networks. Generally, the application server 114 may be an element offering applications that use IP bearer resources with the core network (e.g., UMTS Packet Services (PS) domain, LTE PS data services, etc.). The application server 114 can also be configured to support one or more communication services (e.g., Voice-over-Internet Protocol (VoIP) sessions, PTT sessions, group communication sessions, social networking services, etc.) for the UEs 152, 154 via the CN 110 and one or more of the MEC hosts 102, 104.

The P-GW 140 may further include a node for policy enforcement and charging data collection. A Policy and Charging Enforcement Function (PCRF) (not illustrated in FIG. 1A) can be the policy and charging control element of the CN 110. In a non-roaming scenario, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF may be communicatively coupled to the application server 114 via the P-GW 140. The application server 114 may signal the PCRF to indicate a new service flow and select the appropriate Quality of Service (QoS) and charging parameters.

The V2X control function 146 is used in connection with authorizing UEs to use V2X services based on HSS information (e.g., subscription information managed by the HSS 144), assist one or more UEs in obtaining the network address of an application server (e.g., 114) or a V2X application server, as well as providing V2X configuration parameters for direct communication (i.e., device-to-device communications). The interface for direct device-to-device communication is referred to as PC5. The PC5 parameters may be provided by the V2X control function 146 to one or more UEs for purposes of configuring V2X communication between the UEs.

Network Slice Instance Examples

The slice management function 164 can be used for configuring one or more network slice instances (e.g., 5G slice instances) for use by UEs or other devices within the communication architecture 100A. In some aspects, the communication architecture further includes artificial intelligence (AI)-based resource management (AIRM) module 160 and a blockchain traceability management (BC™) module 162, which modules can provide functionalities in connection with dynamic slice configuration, dynamic resource management, and resource traceability within the architecture 100A.

Network slicing is a set of technologies that allow a mobile network to be divided into multiple logical networks that are capable of providing special treatment for different use-cases (e.g., low latency, high bandwidth, and high reliability).

A network slice instance (NSI) consists of an access network component (i.e., a RAN), and a collection of control plane and user plane network functions from the core network. Provisioning an NSI (i.e., allocating the NSI and associating NSIs with one another and/or associating an NSI to a subscriber such as user equipment (UE)) is carried out by the network operator. An NSI may be identified by a Slice Service Type (SST), which is a numeric value that is associated with the characteristics of an NSI. In some aspects, "standardized" SSTs, as discussed below, may be used. An NSI with one of these SST values has presumably been optimized by the network operator to carry traffic of each type, e.g., enhanced mobile broadband or low latency. A network operator may define additional SST types, for different services.

The standard SST types are intended to make possible providing network slices across network operators. If a distributed database, such as a blockchain-supported ledger, were provided, the functionality of network slicing could be enhanced for users who are traveling out of their network area.

In some aspects, a network may provision multiple copies of a network slice instance. The network slice instances may share an SST value and may be differentiated by a Slice Differentiator (SD) value.

In some aspects, an SST value of 1 is used in connection with network slice instances suitable for the handling of 5G enhanced Mobile Broadband (eMBB) communications. In some aspects, an SST value of 2 is used in connection with network slice instances suitable for the handling of ultra-reliable low latency (URLLC) communications. In some aspects, an SST value of 3 is used in connection with network slice instances suitable for the handling of massive IoT (MIoT) communications.

In some aspects, SST and SD information may be collected (e.g., from a subscriber device such as a UE) in an information element (IE) called a Single Network Slice Selection Assistance Information (S-NSSAI) IE. S-NSSAI IEs may be grouped together into an NSSAI. NSSAIs may be provisioned into a UE when the owner of the UE subscribes to a network.

In some aspects, the techniques discussed herein may use the following rules for using network slice instances and NSSAI information:

(a) When a UE runs an application (e.g., a voice telephone service or any other phone application (or app)), it attempts to establish a Packet Data Unit (PDU) session with a data network. The data network may be considered as the "server" side of where an application runs. An example of a data network is an edge platform.

(b) When the PDU session is requested, the UE may request that an S-NSSAI be satisfied. The network may attempt to provide the UE access to a network slice that satisfies the S-NSSAI. The UE may not necessarily get the NSI that it requests; it may be rejected for various reasons, such as unavailability or non-authorization; and it may be given a default NSI instead.

(c) When a UE moves between networks, the S-NSSAI that it wants may not necessarily be available in the visited network. The standard SST types (listed above) are intended to help solve this issue, but, if it were possible to predict behavior and arrange to provision a new NSI in the visited network, enhanced user experience may be available.

(d) Network slice instances may change dynamically. A network operator may create new NSIs in response to load conditions (e.g., as detected by the AIRM 160), or may change the assignment of a UE to an NSI. These decisions are driven by network operations monitoring, and a prediction function may be useful in carrying out these decisions. In some aspects, the AIRM 160 may further provide AI-based predictions associated with resource utilization, which may be used for dynamic network slice instance configuration, provisioning, and modification (e.g., re-provisioning with a different set of resources).

AI-Based Resource Management

The AIRM module 160 may comprise suitable circuitry, logic, interfaces and/or code and can be configured to provide resource management functions. More specifically, the AIRM module 160 can use AI-based (e.g., machine learning) network inferencing functions to dynamically assess resource usage within the architecture 100A and provide a resource allocation recommendation (e.g., to the CN 110, the MEC platform manager 106, an Operation, Administration, and Management (OAM) node, or another management entity or a resource provider entity) for dynamic allocation (or re-allocation) of computing and communication resources based on current resource usage, past resource usage, or intended (future) resource usage (e.g., based on previous dynamic slice allocations or current network slice instance allocation requests). The computing and communication resources may include at least one radio access network (RAN) of a Communications Service Provider (CSP), a control plane network function of the CSP, a user plane network function of the CSP, at least one hardware processing resource of the CSP in an edge computing network, at least one hardware processing resource of another network entity in the edge computing network (e.g., an edge platform owner such as an enterprise entity or a resource vendor entity), and at least one data network of the CSP or another resource provider.

Distributed Ledger (e.g., Blockchain) Examples

The BCTM module 162 may comprise suitable circuitry, logic, interfaces and/or code and can be configured to provide resource usage traceability using blockchain techniques.

Blockchain technology offers a way to record transactions or any digital interaction that is designed to be secure, transparent, resistant to outages, auditable, and efficient. A blockchain is a digital, distributed transaction ledger that is stored and replicated on multiple computing systems interconnected by a communications network. Such computing systems can be referred to as a distributed ledger network (or blockchain network) which includes multiple blockchain nodes. Each of the blockchain nodes maintains their copy of the distributed ledger so that it cannot be tampered with physically, and operate a consensus protocol that guarantees that any data retrieved from the ledger has not been accidentally or deliberately modified, and is in the correct order.

A blockchain may support an application programming interface (API) allowing applications to carry out other functions in addition to storing and accessing data. For example, the Ethereum blockchain supports the concept of a "smart contract", which is an executable code executed by a blockchain node in response to data stored on a blockchain. For example, a secure payment procedure can be created in which a buyer posts a payment transaction to the ledger, but ownership of the value of the transaction is not transferred to the seller until the buyer also posts a "received" transaction to the ledger. Enforcement of the contract is carried out in a secure, non-repudiable manner.

A blockchain may be public or private. A public blockchain allows anybody who can connect to the blockchain network on the Internet to use it. In a public system, there is no enforcement of access to the blockchain, so the consensus protocol itself may be used to protect the integrity of the ledger. A private blockchain provides access control via secure access technology such as encryption or secure credentials.

The consensus protocol plays a central role in blockchain technology. In a public blockchain, the ledger integrity may be maintained by making changes to it prohibitively expensive so that the probability that a point source (error or malefactor) could make an undetected change is very small. Public blockchain networks are very large in order to spread the cost among a large number of nodes. A private blockchain network is able to reduce the cost of a transaction by trading it off against the cost of building a secure network for the blockchain nodes. The designer of a blockchain network has a large number of design options to satisfy the requirements of a system that uses blockchain technology as part of its design. In this regard, the functionalities of a blockchain make it very suitable for use within the architecture 100A in connection with resource utilization and traceability of resource-related transactions (e.g., network slice instance configuration, provisioning, reconfiguration, etc.).

In some aspects, the BCTM module 162 can use blockchain technology to provide traceability of user equipment slice requests, current resource usage by one or more slices, dynamic slice allocations and reallocations, as well as slice resource usage changes due to the dynamic slice allocations and reallocations.

In some aspects, resource management and traceability functions provided by the AIRM module 160 and the BCTM module 162, as well as slice management functions provided by the slice management module 164, can be incorporated within one or more MEC hosts (e.g., as a resource, blockchain, and slice management (RBSM) module 121 within MEC host 102 or module 131 within MEC host 104). In some aspects, the RBSM module can be incorporated within the MEC platform or can be incorporated as a MEC app instantiated by the MEC platform (e.g., MEC app 116A instantiated by the MEC platform using MEC hardware 123 and 133). In some aspects, resource management and traceability functions provided by the AIRM module 160 and the BCTM module 162, as well as the slice management functions provided by the slice management module 164, can be provided by the MEC platform manager 106, the MEC orchestrator 108, and/or other modules within the MEC communication architecture 100A, including an OAM node or other management nodes. In some aspects, AIRM, BC™, and slice management related functions may be distributed across multiple nodes or within a single management node (e.g., as an RBSM module) in an MEC architecture or another type of network architecture (such as an edge computing network or other types of networks as illustrated in connection with FIGS. 1B, IC, 2A, 3A, and 5-9).

The MEC hosts 102, . . . , 104 can be configured in accordance with the ETSI GS MEC-003 specification. The MEC host 102 can include an MEC platform 118, which can be coupled to one or more MEC applications (apps) such as MEC apps 116A, . . . , 116N (collectively, MEC app 116) and to MEC data plane 122. The MEC host 104 can include a MEC platform 126, which can be coupled to an MEC app 116 and MEC data plane 130. The MEC platform manager 106 can include a MEC platform element management module 132, MEC application rules and requirements management module 134, and MEC application lifecycle management module 136. The MEC host 102 also includes MEC hardware 123, such as network interfaces (e.g. network interface cards or NICs) 125A, . . . , 125N, one or more CPUs 127, and memory 129. Additional description of the MEC related entities 102, 104, 106, and 108 are provided hereinbelow in connection with FIG. 4.

In some aspects, the MEC apps 116A, . . . , 116N can each provide an NFV instance configured to process network connections associated with a specific network traffic type (e.g., 2G, 3G, 4G, 5G or another network traffic type). In this regard, the terms "MEC app" and "NFV" (or "MEC NFV") are used interchangeably. Additionally, the term "NFV" and "NFV instance" are used interchangeably. The MEC platform 118 can further include one or more schedulers 120A, . . . , 120N (collectively, a scheduler 120). Each of the schedulers 120A, . . . , 120N may comprise suitable circuitry, logic, interfaces, and/or code and is configured to manage instantiation of NFVs 116A, . . . , 116N (collectively, an NFV 116). More specifically, a scheduler 120 can select a CPU (e.g., one of the CPUs 127) and/or other network resources for executing/instantiating the NFV 116. Additionally, since each of the NFVs 116A, . . . , 116N is associated with processing a different network traffic type, the scheduler 120 can further select a NIC (e.g., from the available NICs 125A, . . . , 125N) for use by the NFV 116. Each of the schedulers 120A, . . . , 120N can have a different type of SLA and QoS requirements, based on the network traffic type handled by the associated NFV. For example, each traffic type (e.g., 2G, 3G, 4G, 5G, or any other type of wireless connection to the MEC host) has an associated class of service (CloS) (e.g., 2G_low, 2G_mid, 2G_high, etc.) which can be preconfigured in the MEC host, defining CloS-specific resource requirements (i.e., I/O, memory, processing power, etc.) for different loads of that particular traffic type.

FIG. 1A further illustrates MEC host 104 including MEC hardware 133, RBSM module 131, and schedulers 128A, . . . , 128N, which can have the same functionality as MEC hardware 123, RBSM module 121, and schedulers 120A, . . . , 120N described in connection with MEC host 102. Even though the RBSM module 121 is illustrated as being implemented within the MEC platform 118, the present disclosure is not limited in this regard and one or more components of the RBSM module 121 can be implemented within other modules of the MEC host 102, the MEC orchestrator 108, or the MEC platform manager 106.

Figure 1B:
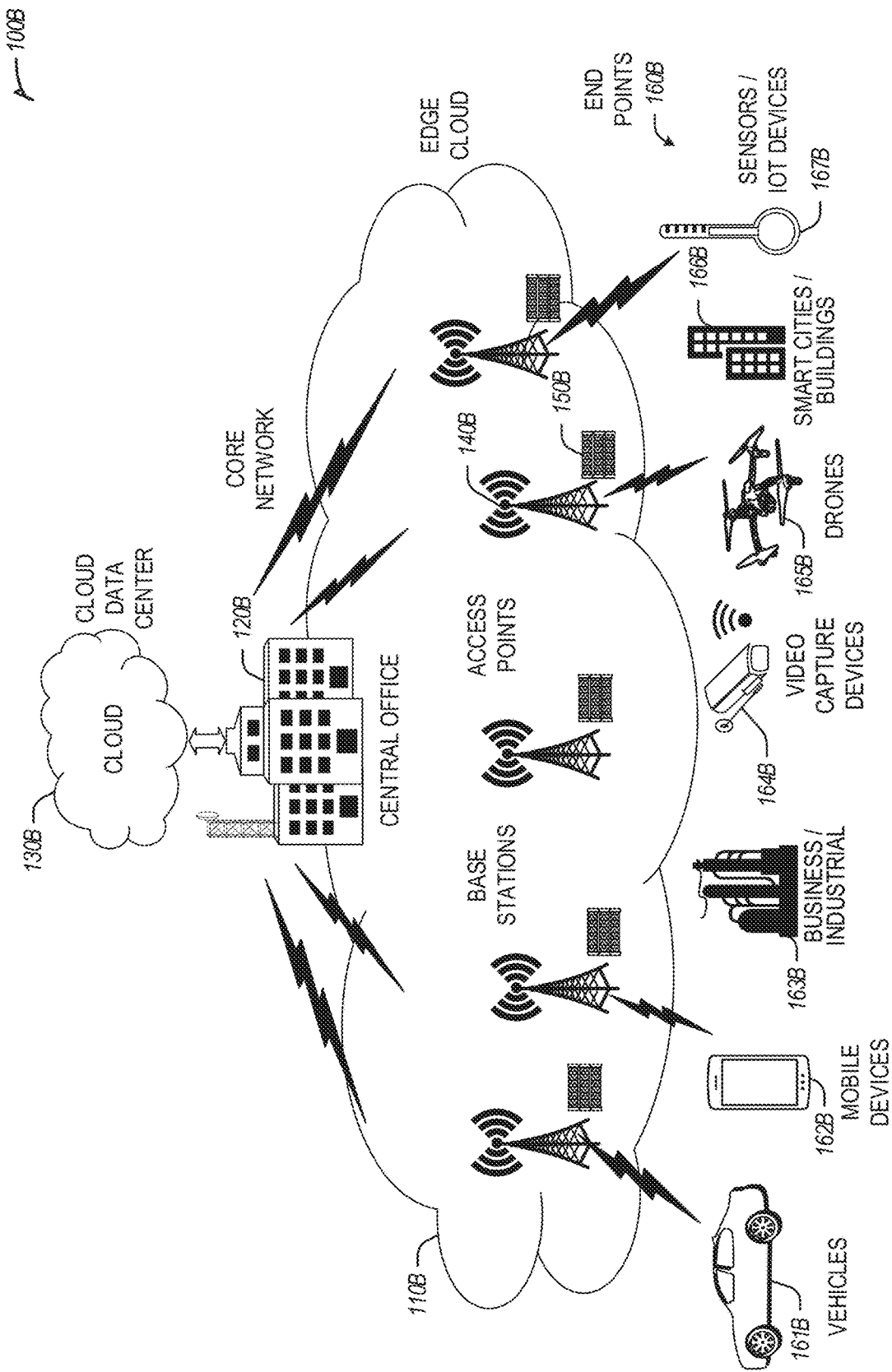
FIG. 1B illustrates an overview of an edge cloud configuration for edge computing, according to an example.

FIG. 1B is a block diagram 100B showing an overview of a configuration for edge computing, which includes a layer of processing referenced in many of the current examples as an "edge cloud". This network topology, which may include a number of conventional networking layers (including those not shown herein), may be extended through the use of 5G network slice instance management using blockchain traceability and AI-based resource management techniques discussed herein.

As shown, the edge cloud 110B is co-located at an edge location, such as the base station 140B, a local processing hub 150B, or a central office 120B, and thus may include multiple entities, devices, and equipment instances. The edge cloud 110B is located much closer to the endpoint (consumer and producer) data sources 160B (e.g., autonomous vehicles 161B, user equipment 162B, business, and industrial equipment 163B, video capture devices 164B, drones 165B, smart cities and building devices 166B, sensors and IoT devices 167B, etc.) than the cloud data center 130B. Compute, memory, and storage resources which are offered at the edges in the edge cloud 110B are critical to providing ultra-low latency response times for services and functions used by the endpoint data sources 160B as well as reduce network backhaul traffic from the edge cloud 110B toward cloud data center 130 thus improving energy consumption and overall network usages among other benefits.

Compute, memory, and storage are scarce resources, and generally, decrease depending on the edge location (e.g., fewer processing resources being available at consumer end point devices than at a base station or at a central office). However, the closer that the edge location is to the endpoint (e.g., UEs), the more that space and power are constrained. Thus, edge computing, as a general design principle, attempts to minimize the number of resources needed for network services, through the distribution of more resources which are located closer both geographically and in-network access time.

The following describes aspects of an edge cloud architecture that covers multiple potential deployments and addresses restrictions that some network operators or service providers may have in their own infrastructures. These include variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for the connected user equipment, without further communicating data via backhaul networks. Or as another example, central office network management hardware may be replaced with compute hardware that performs virtualized network functions and offers compute resources for the execution of services and consumer functions for connected devices. These and other scenarios may involve the use of platform resource management, as provided in the discussion below.

In contrast to the network architecture of FIG. 1A, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage but is not optimal for highly time-varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage, and processing as well as remote cloud data-center based storage and processing. Key performance indicators (KPIs) may be used to identify where sensor data is best transferred and where it is processed or stored. This typically depends on the ISO layer dependency of the data. For example, a lower layer (PHY, MAC, routing, etc.) data typically changes quickly and is better handled locally in order to meet latency requirements. Higher layer data such as Application-Layer data is typically less time-critical and may be stored and processed in a remote cloud data-center.

Figure 1C:
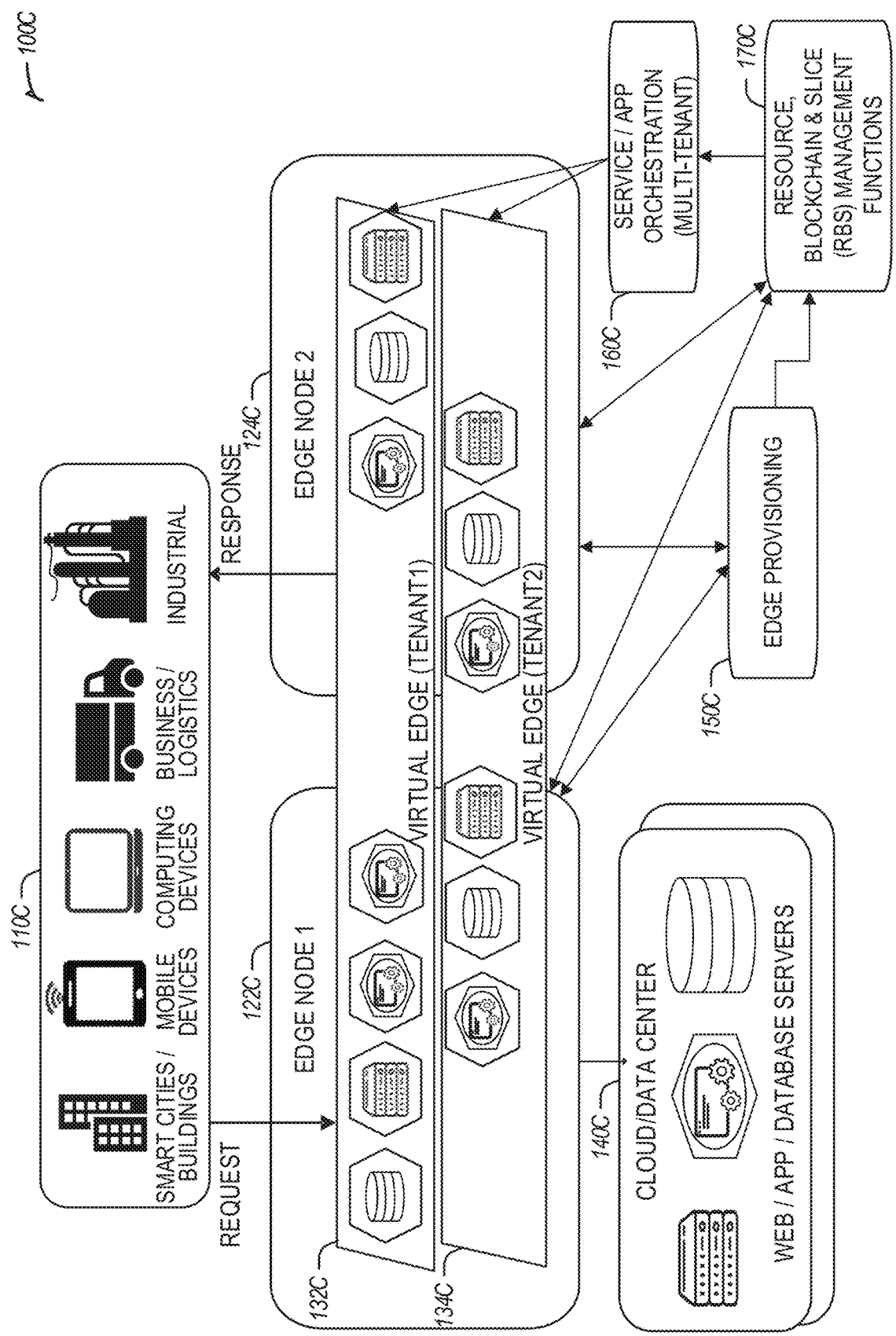
FIG. 1C illustrates deployment and orchestration for virtual edge configurations across an edge-computing system operated among multiple edge nodes and multiple tenants, according to an example.

FIG. 1C illustrates deployment and orchestration for virtual edge configurations across an edge-computing system operated among multiple edge nodes and multiple tenants. Specifically, FIG. 1C depicts coordination of a first edge node 122C and a second edge node 124C in an edge-computing system 100C, to fulfill requests and responses for various client endpoints 110C from various virtual edge instances. The virtual edge instances provide edge compute capabilities and processing in an edge cloud, with access to a cloud/data center 140C for higher-latency requests for websites, applications, database servers, etc. Thus, the edge cloud enables coordination of processing among multiple edge nodes for multiple tenants or entities using 5G network slice instance management using blockchain traceability and AI-based resource management techniques discussed herein.

In the example of FIG. 1C, these virtual edge instances include a first virtual edge 132C, offered to a first tenant (Tenant 1), which offers a first combination of edge storage, computing, and services; and a second virtual edge 134C, offering a second combination of edge storage, computing, and services, to a second tenant (Tenant 2). The virtual edge instances 132C, 134C are distributed among the edge nodes 122C, 124C, and may include scenarios in which a request and response are fulfilled from the same or different edge nodes. The configuration of each edge node 122C, 124C to operate in a distributed yet coordinated fashion with shared memory access occurs based on edge provisioning functions 150C and resource, blockchain, and slice management (RBSM) functions 170C. The functionality of the edge nodes 122C, 124C to provide coordinated operation for applications and services, among multiple tenants, occurs based on orchestration functions 160C.

In some aspects, the RBSM functions 170 may perform the functionalities of the AI-based resource management module 160, the blockchain traceability management module 162, and the slice management module 164, as discussed herein above in connection with FIG. A. The RBSM functions 170 may be used to determine (or predict) network resource utilization using AI-based network inferencing functions, and configure one or more network slice instances based on the network resource utilization (e.g., as illustrated in connection with FIGS. 11-16).

It should be understood that some of the devices in 110C are multi-tenant devices where Tenant1 may function within a Tenant1 'slice' while a Tenant2 may function within a Tenant2 slice. A trusted multi-tenant device may further contain a tenant-specific cryptographic key such that the combination of key and slice may be considered a "root of trust" (RoT) or tenant-specific RoT. An RoT may further be computed dynamically composed using a security architecture, such as a DICE (Device Identity Composition Engine) architecture where a DICE hardware building block is used to construct layered trusted computing base contexts for layering of device capabilities (such as a Field Programmable Gate Array (FPGA)). The RoT also may be used for a trusted computing context to support respective tenant operations, etc. The use of this RoT and the security architecture may be enhanced by the attestation operations further discussed herein.

Additionally, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 1C. An orchestrator may use a DICE layering and fan-out construction to create a root of trust context that is tenant-specific. Thus, orchestration functions, provided by an orchestrator, may participate as a tenant-specific orchestration provider.

Accordingly, an edge-computing system may be configured to fulfill requests and responses for various client endpoints from multiple virtual edge instances (and, from a cloud or remote data center, not shown). The use of these virtual edge instances supports multiple tenants and multiple applications (e.g., AR/VR, enterprise applications, content delivery, gaming, compute offload) simultaneously. Further, there may be multiple types of applications within the virtual edge instances (e.g., normal applications, latency-sensitive applications, latency-critical applications, user plane applications, networking applications, etc.). The virtual edge instances may also be spanned across systems of multiple owners at different geographic locations.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. In this regard, a container can be used for executing an application associated with a service or other virtualized node functions. An edge service instance can include multiple containers, where each container may be associated with its own SLA. A container arrangement (e.g., an edge service instance) may be adapted for use by multiple tenants in system arrangement, where containerized pods, functions, and functions-as-a-service instances are launched within virtual machines specific to each tenant (aside from the execution of virtualized network functions).

Within the edge cloud, a first edge node 122C (e.g., operated by a first owner) and a second edge node 124C (e.g., operated by a second owner) may operate or respond to a container orchestrator as well as to a PRM to coordinate the execution of various applications within the virtual edge instances offered for respective tenants as well as management of platform resources in connection with execution of the various applications. For instance, the edge nodes 122C, 124C may be coordinated based on edge provisioning functions 150C and RBS management functions 170C, while the operation of the various applications is coordinated with orchestration functions 160C.

Various system arrangements may provide an architecture that treats VMs, Containers, and Functions equally in terms of application composition (and resulting applications are combinations of these three ingredients). Each ingredient may involve the use of one or more accelerators (e.g., FPGA, ASIC) components as a local backend. In this manner, applications can be split across multiple edge owners, coordinated by an orchestrator.

It should be appreciated that the edge computing systems and arrangements discussed herein may be applicable in various solutions, services, and/or use cases.

Figure 2A:
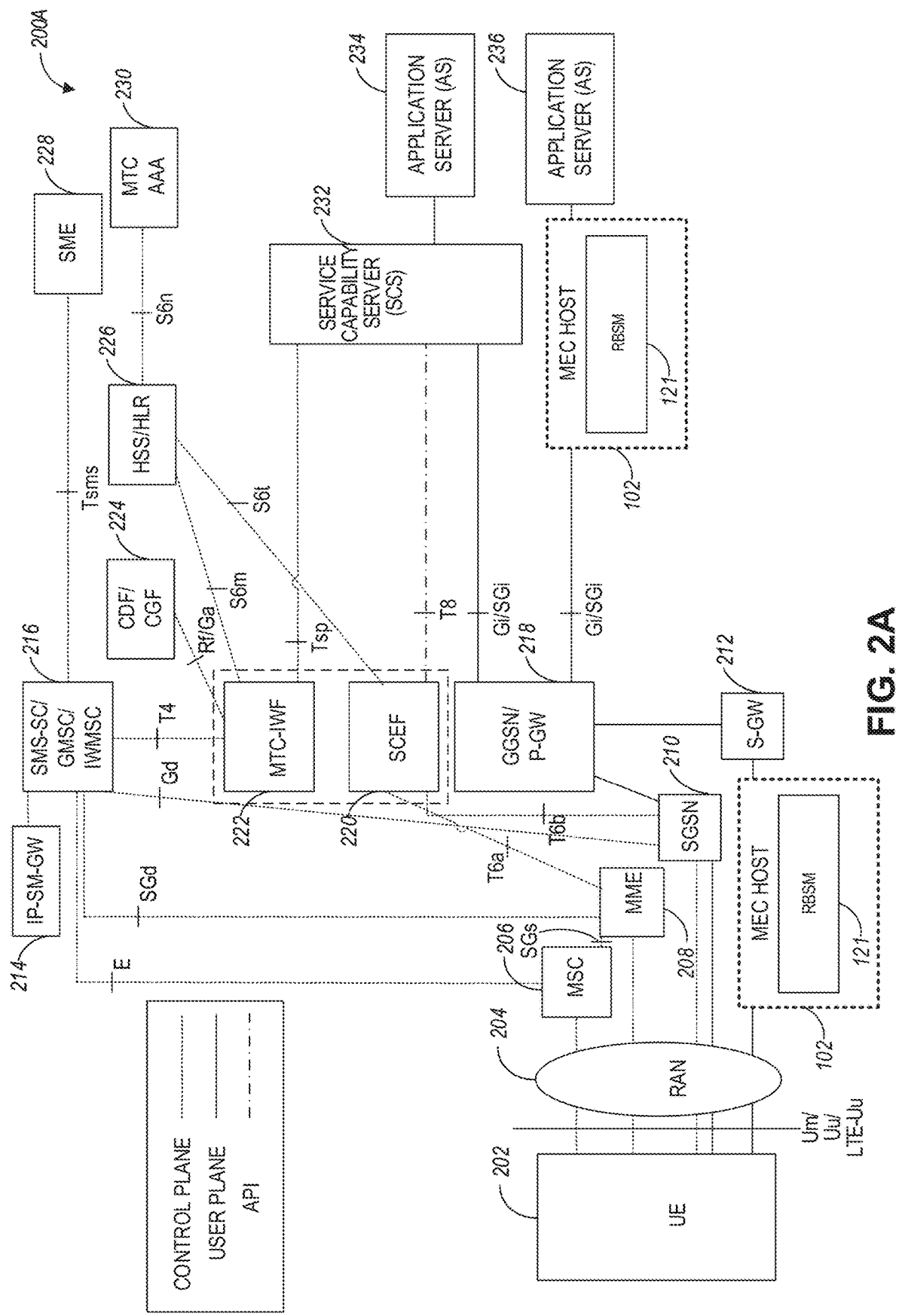
FIG. 2A illustrates an example Cellular Internet-of-Things (CIoT) network architecture with a MEC host using a MEC QoS manager, according to an example.

FIG. 2A illustrates an example Cellular Internet-of-Things (CIoT) network architecture with an MEC host using a MEC QoS manager, according to an example. Referring to FIG. 2A, the CIoT architecture 200A can include the UE 202 and the RAN 204 coupled to a plurality of core network entities. In some aspects, the UE 202 can be a machine-type communication (MTC) UE. The CIoT network architecture 200A can further include a mobile services switching center (MSC) 206, MME 208, a serving GPRS support node (SGSN) 210, a S-GW 212, an IP-Short-Message-Gateway (IP-SM-GW) 214, a Short Message Service-Service Center (SMS-SC)/gateway mobile service center (GMSC)/Inter-working MSC (IWMSC) 216, MTC interworking function (MTC-IWF) 222, a Service Capability Exposure Function (SCEF) 220, a gateway GPRS support node (GGSN)/Packet-GW (P-GW) 218, a charging data function (CDF)/charging gateway function (CGF) 224, a home subscriber server (HSS)/a home location register (HLR) 226, short message entities (SME) 228, MTC authorization, authentication, and accounting (MTC AAA) server 230, a service capability server (SCS) 232, and application servers (AS) 234 and 236. In some aspects, the SCEF 220 can be configured to securely expose services and capabilities provided by various 3GPP network interfaces. The SCEF 220 can also provide means for the discovery of the exposed services and capabilities, as well as access to network capabilities through various network application programming interfaces (e.g., API interfaces to the SCS 232).

FIG. 2A further illustrates various reference points between different servers, functions, or communication nodes of the CIoT network architecture 200A. Some example reference points related to MTC-IWF 222 and SCEF 220 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 222 and the SMS-SC 216 in the HPLMN), T6a (a reference point used between SCEF 220 and serving MME 208), T6b (a reference point used between SCEF 220 and serving SGSN 210), T8 (a reference point used between the SCEF 220 and the SCS/AS 234, 236), S6m (a reference point used by MTC-IWF 222 to interrogate HSS/HLR 226), S6n (a reference point used by MTC-AAA server 230 to interrogate HSS/HLR 226), and S6t (a reference point used between SCEF 220 and HSS/HLR 226).

In some aspects, the UE 202 can be configured to communicate with one or more entities within the CIoT architecture 200A via the RAN 204 (e.g., CIoT RAN) according to a Non-Access Stratum (NAS) protocol, and using one or more radio access configuration, such as a narrowband air interface, for example, based on one or more communication technologies, such as Orthogonal Frequency-Division Multiplexing (OFDM) technology. As used herein, the term "CIoT UE" refers to a UE capable of CIoT optimizations, as part of a CIoT communications architecture. In some aspects, the NAS protocol can support a set of NAS messages for communication between the UE 202 and an Evolved Packet System (EPS) Mobile Management Entity (MME) 208 and SGSN 210. In some aspects, the CIoT network architecture 200A can include a packet data network, an operator network, or a cloud service network, having, for example, among other things, servers such as the Service Capability Server (SCS) 232, the AS 234, or one or more other external servers or network components.

The RAN 204 can be coupled to the HSS/HLR servers 226 and the AAA servers 230 using one or more reference points including, for example, an air interface based on an S6a reference point, and configured to authenticate/authorize CIoT UE 202 to access the CIoT network. The RAN 204 can be coupled to the CIoT network architecture 200A using one or more other reference points including, for example, an air interface corresponding to an SGi/Gi interface for 3GPP accesses. The RAN 204 can be coupled to the SCEF 220 using, for example, an air interface based on a T6a/T6b reference point, for service capability exposure. In some aspects, the SCEF 220 may act as an API GW towards a third-party application server such as server 234. The SCEF 220 can be coupled to the HSS/HLR 226 and MTC AAA 230 servers using an S6t reference point and can further expose an Application Programming Interface to network capabilities.

In certain examples, one or more of the CIoT devices disclosed herein, such as the UE 202, the RAN 204, etc., can include one or more other non-CIoT devices, or non-CIoT devices acting as CIoT devices, or having functions of a CIoT device. For example, the UE 202 can include a smartphone, a tablet computer, or one or more other electronic device acting as a CIoT device for a specific function, while having other additional functionality. In some aspects, the RAN 204 can include a CIoT enhanced Node B (CIoT eNB) communicatively coupled to a CIoT Access Network Gateway (CIoT GW). In certain examples, the RAN 204 can include multiple base stations (e.g., CIoT eNBs or other types of base stations) connected to the CIoT GW, which can include MSC 206, MME 208, SGSN 210, or S-GW 212. In certain examples, the internal architecture of RAN 204 and the CIoT GW may be left to the implementation and need not be standardized.

In some aspects, the CIoT architecture 200A can include one or more MEC hosts that can provide a communication link between different components of the CIoT architecture. For example, MEC host 102 can be coupled between the RAN 204 and the S-GW 212. In this case, the MEC host 102 can use one or more NFV instances to process wireless connections with the RAN 204 and the S-GW 212. The MEC host 102 can also be coupled between the P-GW 218 and the application server 236. In some aspects, the MEC host can have connections beyond the P-GW, including a Wi-Fi network, other wireless types of networks, and wireline connections. In this case, the MEC host 102 can use the one or more NFV instances to process wireless connections originating from or terminating at the P-GW 218 and the application server 236. In some aspects, the MEC host 102 includes an RBSM module 121, which is configured according to techniques disclosed herein to perform 5G network slice instance management using blockchain traceability and AI-based resource management techniques discussed herein.

Figure 2B:
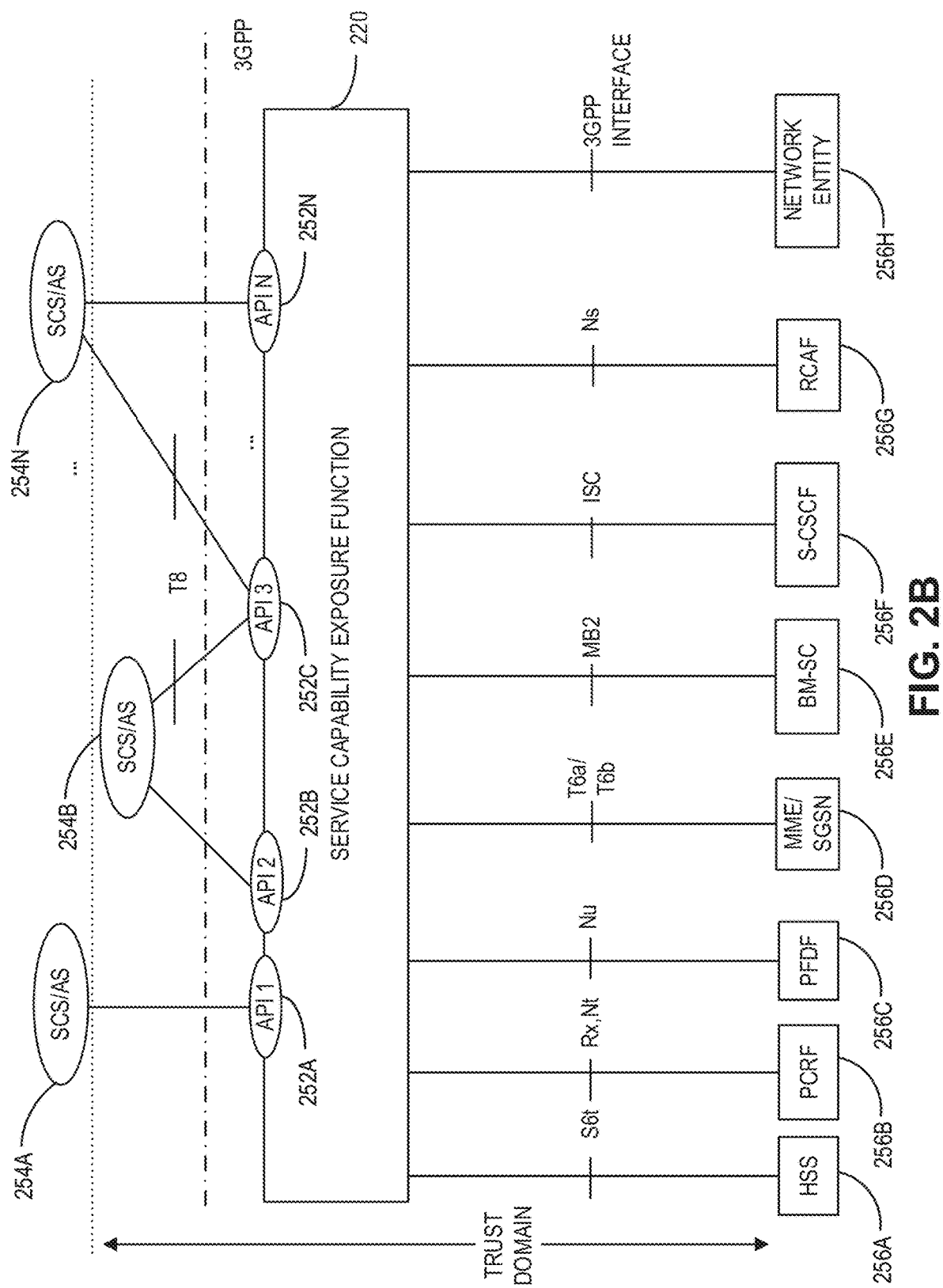
FIG. 2B illustrates an example Service Capability Exposure Function (SCEF) used by the CIoT network architecture of FIG. 2B, according to an example.

FIG. 2B illustrates an example Service Capability Exposure Function (SCEF) used by the CIoT network architecture of FIG. 2B, according to an example. Referring to FIG. 2B, the SCEF 220 can be configured to expose services and capabilities provided by 3GPP network interfaces to external third-party service provider servers hosting various applications. In some aspects, a 3GPP network such as the CIoT architecture 200A can expose the following services and capabilities: a home subscriber server (HSS) 256A, a policy and charging rules function (PCRF) 256B, a packet flow description function (PFDF) 256C, a MME/SGSN 256D, a broadcast multicast service center (BM-SC) 256E, a serving call server control function (S-CSCF) 256F, a RAN congestion awareness function (RCAF) 256G, and one or more other network entities 256H. The above-mentioned services and capabilities of a 3GPP network can communicate with the SCEF 220 via one or more interfaces as illustrated in FIG. 2B. The SCEF 220 can be configured to expose the 3GPP network services and capabilities to one or more applications running on one or more service capability server (SCS)/application server (AS), such as SCS/AS 254A, 254B, . . . , 254N. Each of the SCS/AS 254A-254N can communicate with the SCEF 220 via application programming interfaces (APIs) 252A, 252B, 252C, . . . , 252N, as seen in FIG. 2B.

Figure 3A:
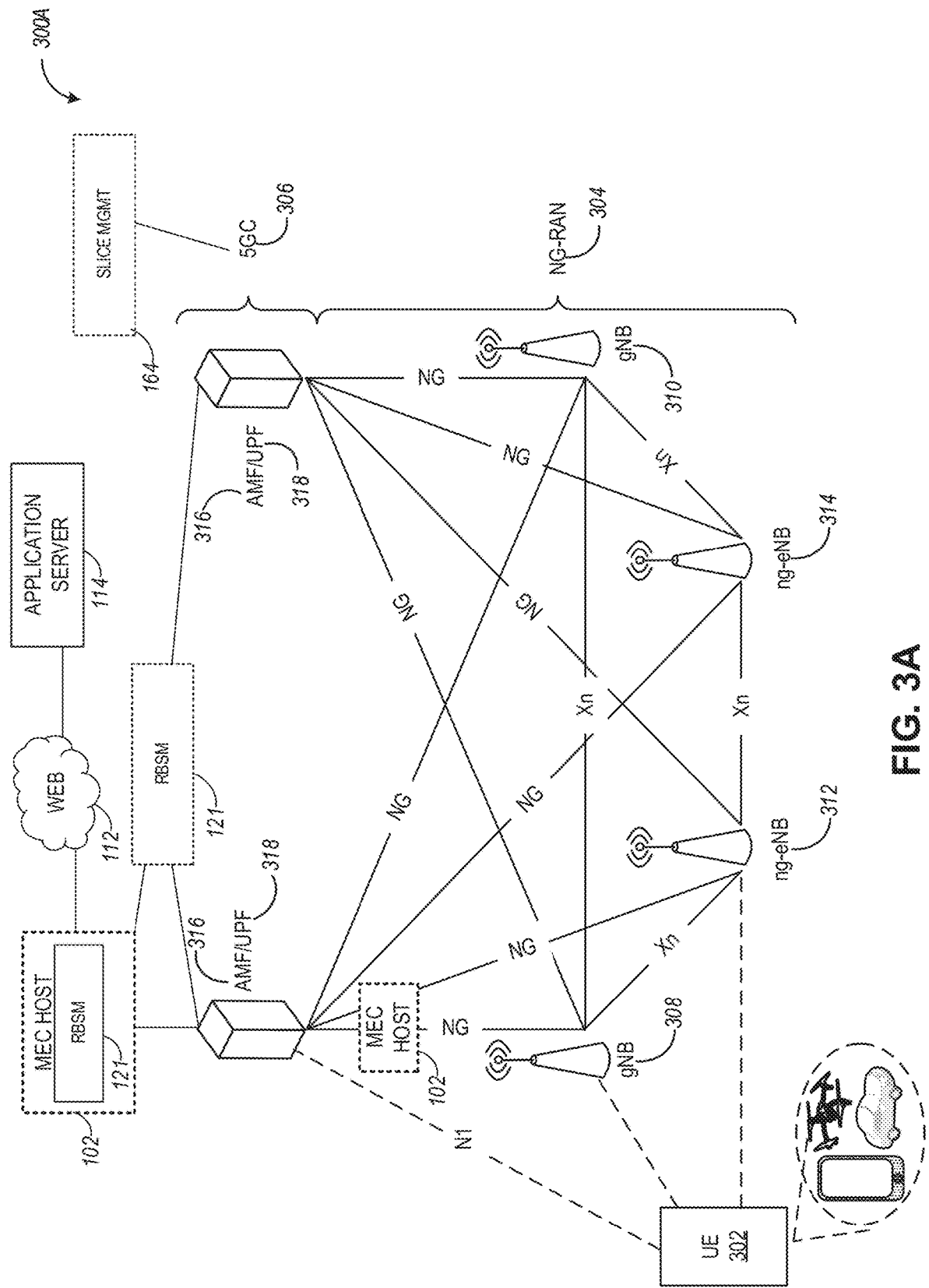
FIG. 3A is a simplified diagram of an exemplary Next-Generation (NG) system architecture with a MEC host using a MEC QoS manager, according to an example.

FIG. 3A is a simplified diagram of an exemplary Next-Generation (NG) system architecture with an MEC host using a MEC QoS manager, according to an example. Referring to FIG. 3A, the NG system architecture 300A includes NG-RAN 304 and a 5G network core (5GC) 306. The NG-RAN 304 can include a plurality of NG-RAN nodes, for example, gNBs 308 and 310, and NG-eNBs 312 and 314. The gNBs 308/310 and the NG-eNBs 312/314 can be communicatively coupled to the UE 302 via a wireless connection. The core network 306 (e.g., a 5G core network or 5GC) can include an access and mobility management function (AMF) 316 or a user plane function (UPF) 318. The AMF 316 and the UPF 318 can be communicatively coupled to the gNBs 308/310 and the NG-eNBs 312/314 via NG interfaces. More specifically, in some aspects, the gNBs 308/310 and the NG-eNBs 312/314 can be connected to the AMF 316 by N2 interface, and to the UPF 318 by N3 interface. The gNBs 308/310 and the NG-eNBs 312/314 can be coupled to each other via Xn interfaces.

In some aspects, a gNB 308 can include a node providing New Radio (NR) user plane and control plane protocol termination towards the UE and can be connected via the NG interface to the 5GC 306. In some aspects, an NG-eNB 312/314 can include a node providing evolved universal terrestrial radio access (E-UTRA) user plane and control plane protocol terminations towards the UE and is connected via the NG interface to the 5GC 306. In some aspects, any of the gNBs 308/310 and the NG-eNBs 312/314 can be implemented as a base station (BS), a mobile edge server, a small cell, a home eNB, although aspects are not so limited.

In some aspects, the NG system architecture 300A can include one or more MEC hosts that can provide a communication link between different components of the NG architecture. For example, MEC host 102 can provide an interface between the AMF 316 (or UPF 318) in the 5GC 306 and the application server 114. The MEC host 102 can use one or more NFV instances to process wireless connections with the 5GC 306 and the application server 114. The MEC host 102 can also be coupled between one or more of the gNBs (e.g., gNB 308) and the AMF/UPF in the 5GC 306. In this case, the MEC host 102 can use the one or more NFV instances to process wireless connections originating from or terminating at the gNB 308 and the 5GC 306.

In some aspects, the MEC host 102 includes an RBSM module 121, which is configured according to techniques disclosed herein to provide 5G network slice instance management using blockchain traceability and AI-based resource management techniques discussed herein. In some aspects, the RBSM module 121 can be incorporated as a standalone server or an application running on a virtual machine, which is accessible to the 5G core 306 as well as the MEC host 102. In some aspects, the 5G core 306 can provide slice management functionalities performed by the slice management module 164, as disclosed herein.

In some aspects, the system architecture 300A (which can be the same as 100A) can be a 5G-NR system architecture providing network slicing and supporting policy configuration and enforcement between network slices as per service level agreements (SLAs) within the RAN 304 (or 204). Additionally and as illustrated in greater detail in FIG. 3E, the RAN 304 can provide separation of central unit control plane (CU-CP) and central unit user plane (CU-UP) functionalities while supporting network slicing (e.g., using resource availability and latency information communication via different RAN interfaces, such as E1, F1-C, and F1-U interfaces). In some aspects, the UE 302 (or 152) can communicate RRC signaling to the gNB 308 for establishing a connection with an entity (e.g., UPF 318) of the 5GC 306. The gNB 308 can include separate distributed units (DUs), CU-CP, and CU-UP entities (as illustrated in FIG. 3E). The CU-CP entity can obtain resource utilization and latency information from the DU and CU-UP entities and select a DU/CU-UP pair based on such information for purposes of configuring the network slice. Network slice configuration information associated with the configured network slice (including resources for use while communicating via the slice) can be provided to the UE 302 for purposes of initiating data communication with the 5GC UPF entity 318 using the network slice.

Figure 3B:
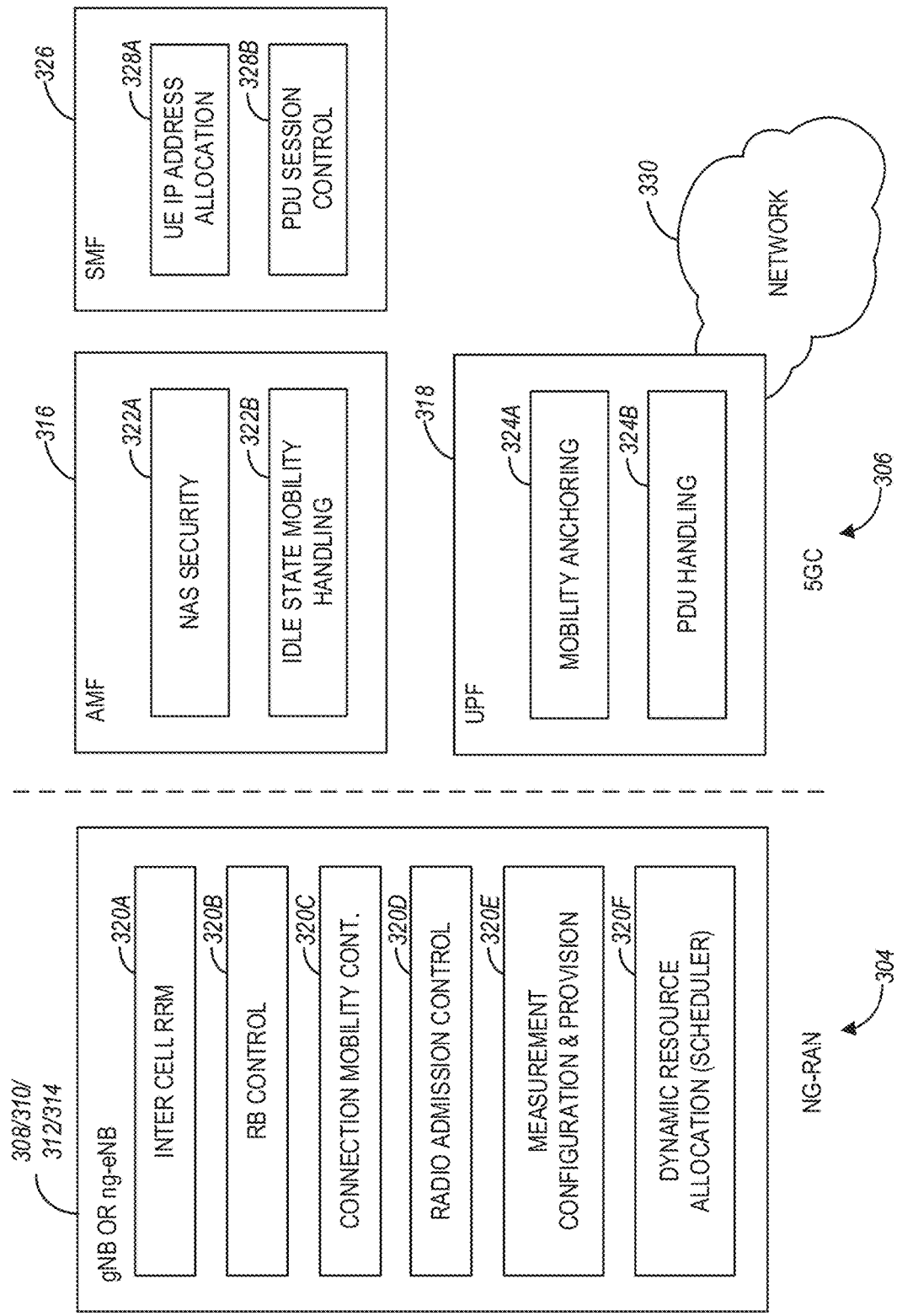
FIG. 3B illustrates an exemplary functional split between next generation radio access network (NG-RAN) and the 5G Core network (5GC) in connection with the NG system architecture of FIG. 3A, according to an example.

FIG. 3B illustrates an exemplary functional split between next generation radio access network (NG-RAN) and the 5G Core network (5GC) in connection with the NG system architecture of FIG. 3A, according to an example. FIG. 3B illustrates some of the functionalities the gNBs 308/310 and the NG-eNBs 312/314 can perform within the NG-RAN 304, as well as the AMF 316, the UPF 318, and a Session Management Function (SMF) 326 (not illustrated in FIG. 3A) within the 5GC 306. In some aspects, the 5GC 306 can provide access to a network 330 (e.g., the Internet) to one or more devices via the NG-RAN 304.

In some aspects, the gNBs 308/310 and the NG-eNBs 312/314 can be configured to host the following functions: functions for Radio Resource Management (e.g., inter-cell radio resource management 320A, radio bearer control 320B, connection mobility control 320C, radio admission control 320D, measurement and measurement reporting configuration for mobility and scheduling 320E, and dynamic allocation of resources to UEs in both uplink and downlink (scheduling) 320F); IP header compression; encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 316 can be configured to host the following functions, for example, NAS signaling termination; NAS signaling security 322A; access stratum (AS) security control; inter-core network (CN) node signaling for mobility between 3GPP access networks; idle state/mode mobility handling 322B, including mobile device, such as a UE reachability (e.g., control and execution of paging retransmission); registration area management; support of intra-system and inter-system mobility; access authentication; access authorization including check of roaming rights;

mobility management control (subscription and policies); support of network slicing or SMF selection, among other functions.

The UPF 318 can be configured to host the following functions, for example, mobility anchoring 324A (e.g., anchor point for Intra-/Inter-RAT mobility); packet data unit (PDU) handling 324B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); or downlink packet buffering and downlink data notification triggering, among other functions.

The Session Management function (SMF) 326 can be configured to host the following functions, for example, session management; UE IP address allocation and management 328A; selection and control of user plane function (UPF); PDU session control 328B, including configuring traffic steering at UPF 318 to route traffic to proper destination; control part of policy enforcement and QoS; or downlink data notification, among other functions.

Figure 3C:
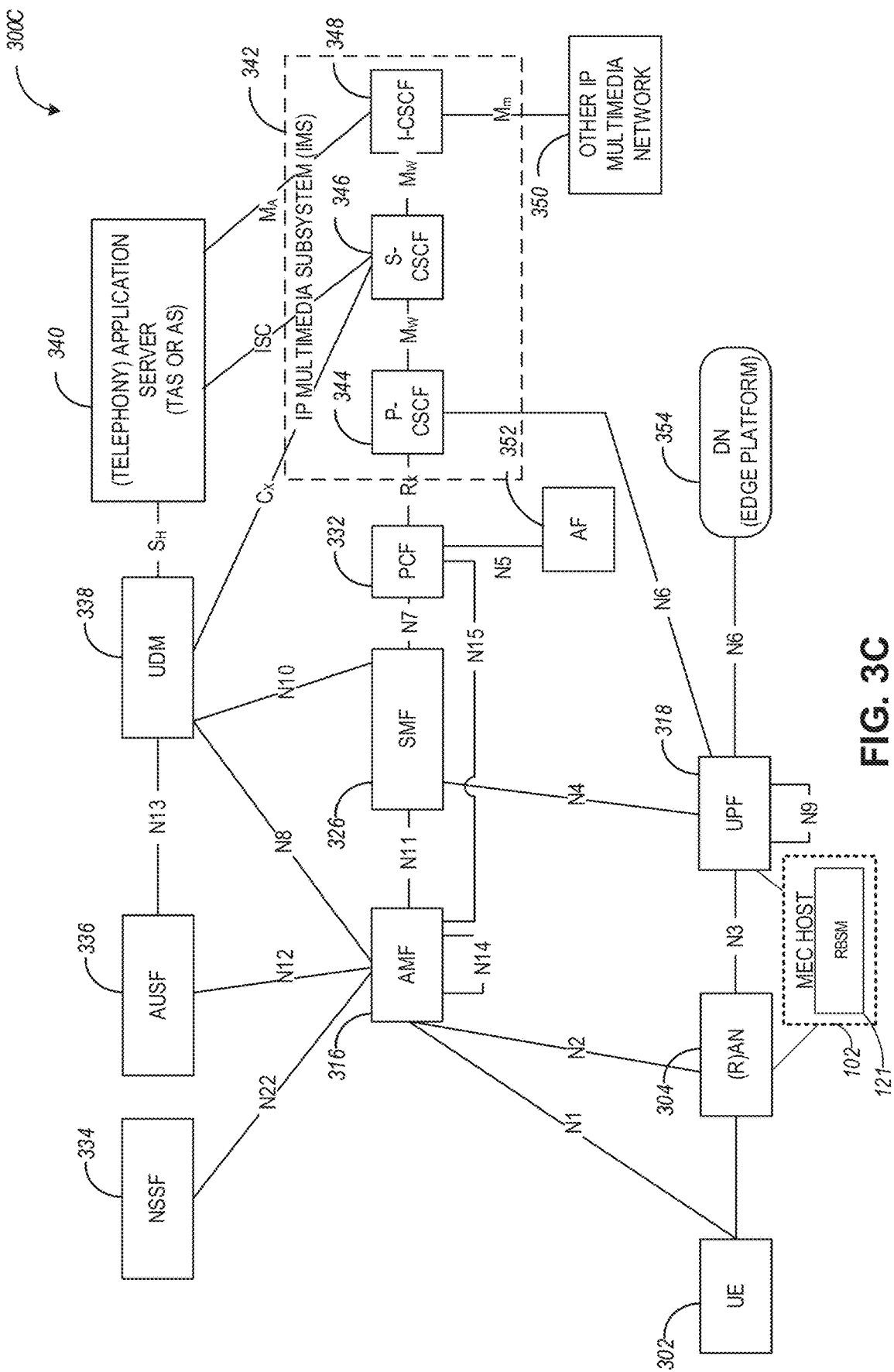
FIG. 3C and FIG. 3D illustrate non-roaming 5G system architectures with a MEC host using resource management and traceability functions, according to an example.
Figure 3D:
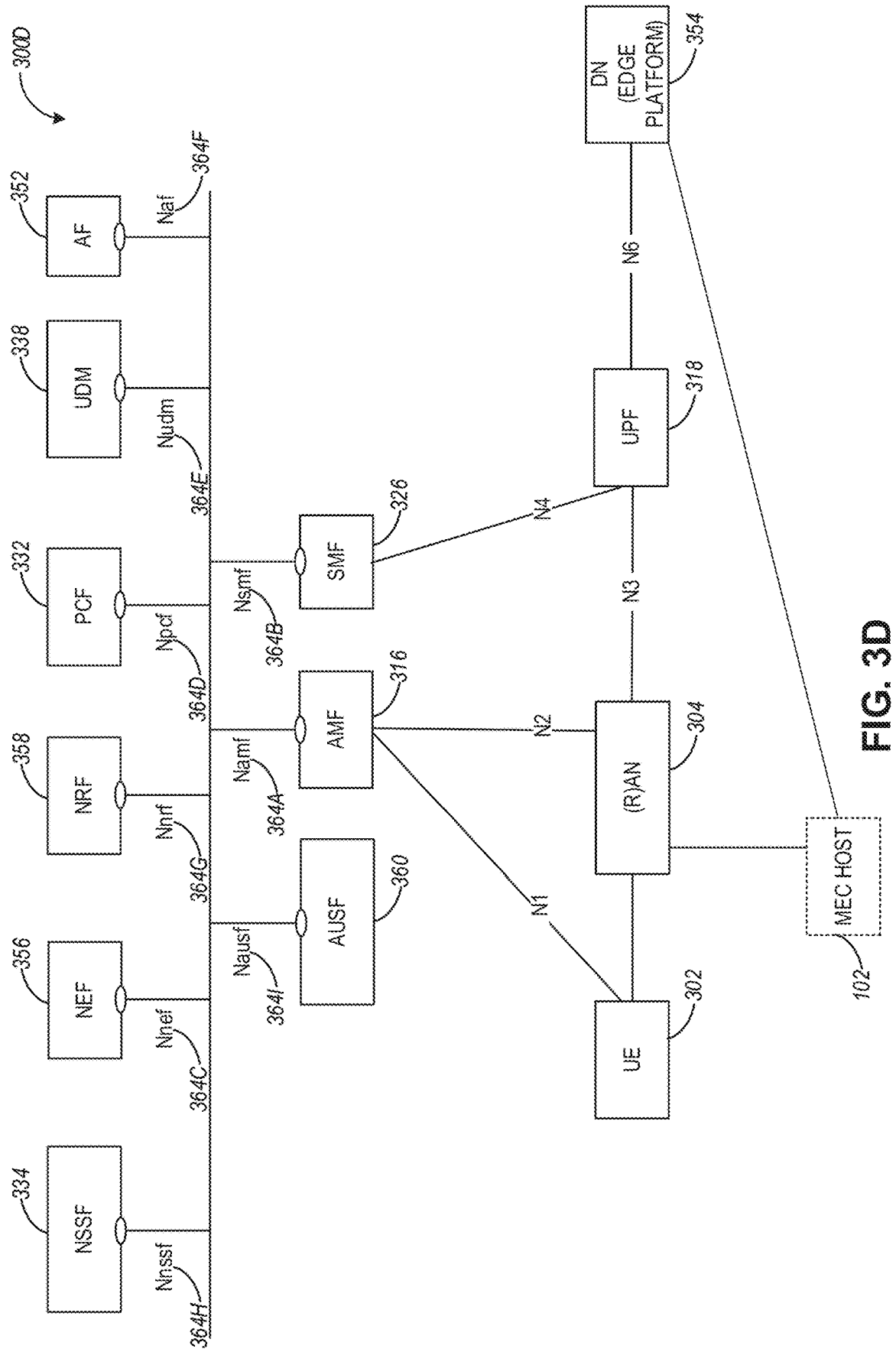
Figure 3E:
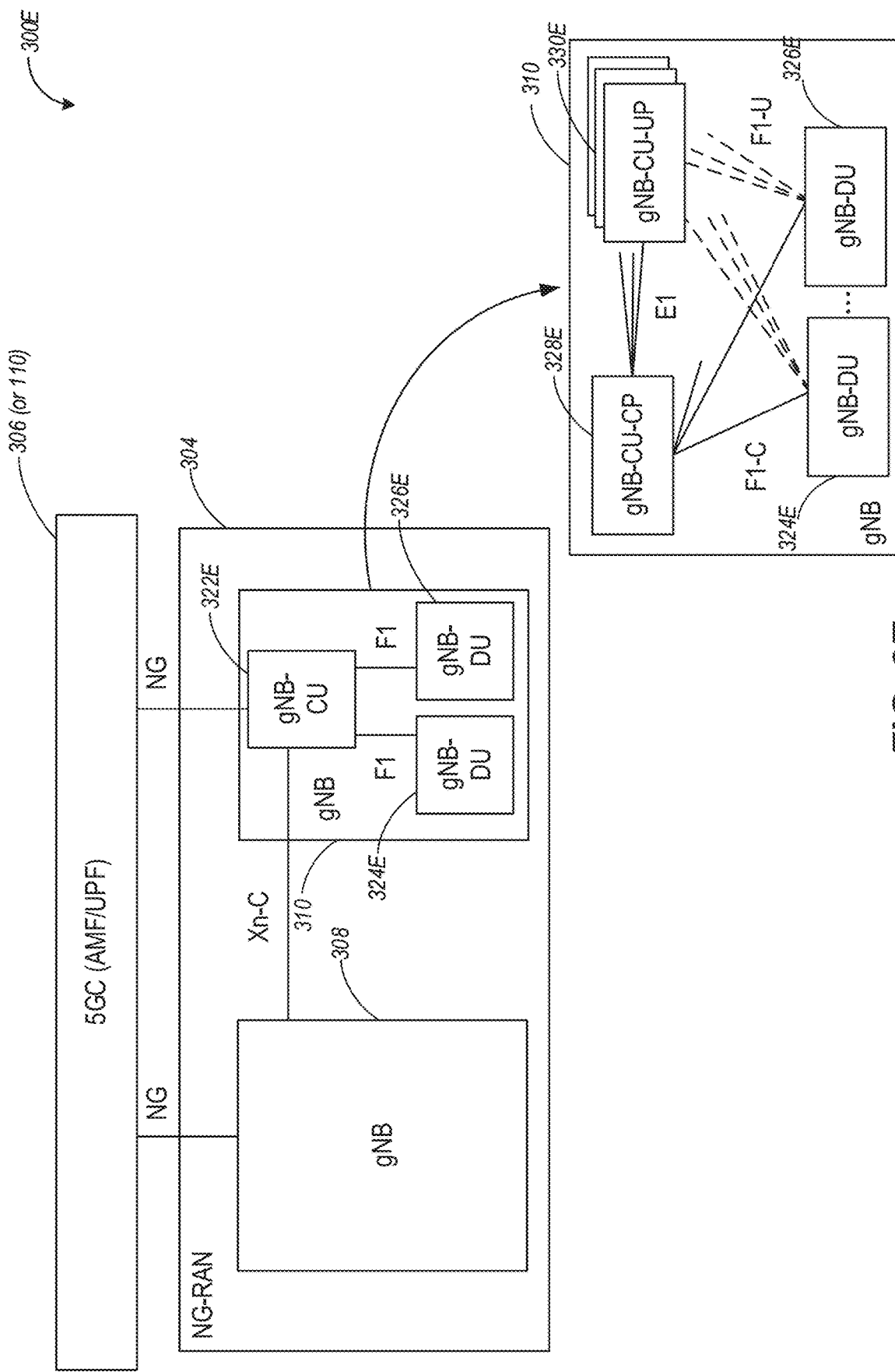
FIG. 3E illustrates components of an exemplary 5G-NR architecture with control unit control plane (CU-CP)-control unit user plane (CU-UP) separation, according to an example.

FIG. 3C and FIG. 3D illustrate exemplary non-roaming 5G system architectures with a MEC host using a MEC QoS manager, according to an example. Referring to FIG. 3C, an exemplary 5G system architecture 300C is illustrated in a reference point representation. More specifically. UE 302 can be in communication with RAN 304 as well as one or more other 5G core (5GC) network entities. The 5G system architecture 300C includes a plurality of network functions (NFs), such as access and mobility management function (AMF) 316, session management function (SMF) 326, policy control function (PCF) 332, application function (AF) 352, user plane function (UPF) 318, network slice selection function (NSSF) 334, authentication server function (AUSF) 336, and unified data management (UDM) 338.

The UPF 318 can provide a connection to a data network (DN) 354, which can include, for example, operator services, Internet access, or third-party services. The AMF 316 can be used to manage access control and mobility and can also include network slice selection functionality. The SMF 326 can be configured to set up and manage various sessions according to network policy. The UPF 318 can be deployed in one or more configurations according to the desired service type. The PCF 332 can be configured to provide a policy framework using network slicing, mobility management, and roaming (similar to PCRF in a 4G communication system). The UDM 338 can be configured to store subscriber profiles and data (similar to an HSS in a 4G communication system), such as V2X subscription information or another type of subscription information for services available within the architecture 300C.

In some aspects, the 5G system architecture 300C includes an IP multimedia subsystem (IMS) 342 as well as a plurality of IP multimedia core network subsystem entities, such as call session control functions (CSCFs). More specifically, the IMS 342 includes a CSCF, which can act as a proxy CSCF (P-CSCF) 344, a serving CSCF (S-CSCF) 346, an emergency CSCF (E-CSCF) (not illustrated in FIG. 3C), or interrogating CSCF (I-CSCF) 348. The P-CSCF 344 can be configured to be the first contact point for the UE 302 within the IMS 342. The S-CSCF 346 can be configured to handle the session states in the network, and the E-CSCF can be configured to handle certain aspects of emergency sessions such as routing an emergency request to the correct emergency center or public safety answering point (PSAP). The I-CSCF 348 can be configured to function as the contact point within an operator's network for all IMS connections destined to a subscriber of that network operator, or a roaming subscriber currently located within that network operator's service area. In some aspects, the I-CSCF 348 can be connected to another IP multimedia network 350, e.g. an IMS operated by a different network operator.

In some aspects, the UDM 338 can be coupled to an application server 340, which can include a telephony application server (TAS) or another application server (AS) including an MEC host. The AS 340 can be coupled to the IMS 342 via the S-CSCF 346 or the I-CSCF 348. In some aspects, the 5G system architecture 300C can use one or more MEC hosts to provide an interface and offload processing of wireless communication traffic. For example and as illustrated in FIG. 3C, the MEC host 102 can provide a connection between the RAN 304 and UPF 318 in the core network. The MEC host 102 can use one or more NFV instances instantiated on virtualization infrastructure within the host to process wireless connections to and from the RAN 304 and the UPF 318. Additionally, the MEC host 102 can use the RBSM module 121 and techniques disclosed herein to manage resource management and traceability functions.

FIG. 3D illustrates an exemplary 5G system architecture 300D in a service-based representation. System architecture 300D can be substantially similar to (or the same as) system architecture 300C. In addition to the network entities illustrated in FIG. 3C, system architecture 300D can also include a network exposure function (NEF) 356 and a network repository function (NRF) 358. In some aspects, 5G system architectures can be service-based and interaction between network functions can be represented by corresponding point-to-point reference points N1 (as illustrated in FIG. 3C) or as service-based interfaces (as illustrated in FIG. 3D).

A reference point representation shows that interaction can exist between corresponding NF services. For example, FIG. 3C illustrates the following reference points: N1 (between the UE 302 and the AMF 316), N2 (between the RAN 304 and the AMF 316), N3 (between the RAN 304 and the UPF 318), N4 (between the SMF 326 and the UPF 318), N5 (between the PCF 332 and the AF 352), N6 (between the UPF 318 and the DN 354), N7 (between the SMF 326 and the PCF 332), N8 (between the UDM 338 and the AMF 316), N9 (between two UPFs 318), N10 (between the UDM 338 and the SMF 326), N11 (between the AMF 316 and the SMF 326), N12 (between the AUSF 336 and the AMF 316), N13 (between the AUSF 336 and the UDM 338), N14 (between two AMFs 316), N15 (between the PCF 332 and the AMF 316 in case of a non-roaming scenario, or between the PCF 332 and a visited network and AMF 316 in case of a roaming scenario), N16 (between two SMFs; not shown), and N22 (between AMF 316 and NSSF 334). Other reference point representations not shown in FIG. 3C can also be used.

In some aspects, as illustrated in FIG. 3D, service-based representations can be used to represent network functions within the control plane that enable other authorized network functions to access their services. In this regard, 5G system architecture 300D can include the following service-based interfaces: Namf 364A (a service-based interface exhibited by the AMF 316), Nsmf 364B (a service-based interface exhibited by the SMF 326), Nnef 364C (a service-based interface exhibited by the NEF 356), Npcf 364D (a service-based interface exhibited by the PCF 332), Nudm 364E (a service-based interface exhibited by the UDM 338), Naf 364F (a service-based interface exhibited by the AF 352), Nnrf 364G (a service-based interface exhibited by the NRF 358), Nnssf 364H (a service-based interface exhibited by the NSSF 334), Nausf 364I (a service-based interface exhibited by the AUSF 360). Other service-based interfaces (e.g., Nudr, N5g-eir, and Nudsf) not shown in FIG. 3D can also be used.

In some aspects, the NEF 356 can provide an interface to a MEC host such as MEC host 102, which can be used to process wireless connections with the RAN 304.

FIG. 3E illustrates components of an exemplary 5G-NR architecture with a control unit control plane (CU-CP)—control unit user plane (CU-UP) separation, according to an example. Referring to FIG. 3E, the 5G-NR architecture 300E can include a 5G core (5GC) 306 and NG-RAN 304. The NG-RAN 304 can include one or more gNBs such as gNB 308 and 310. In some aspects, network elements of the NG-RAN 304 may be split into central and distributed units, and different central and distributed units, or components of the central and distributed units, may be configured for performing different protocol functions (e.g., different protocol functions of the protocol layers).

In some aspects, the gNB 308 can comprise or be split into one or more of a gNB Central Unit (gNB-CU) 322E and gNB Distributed Unit(s) (gNB-DU) 324E, 326E. Additionally, the gNB 308 can comprise or be split into one or more of a gNB-CU-Control Plane (gNB-CU-CP) 328E and a gNB-CU-User Plane (gNB-CU-UP) 330E. The gNB-CU 322E is a logical node configured to host the radio resource control (RRC) layer, service data adaptation protocol (SDAP) layer, and packet data convergence protocol layer (PDCP) protocols of the gNB or RRC, and PDCP protocols of the E-UTRA-NR gNB (en-gNB) that controls the operation of one or more gNB-DUs. The gNB-DU (e.g., 324E or 326E) is a logical node configured to host the radio link control layer (RLC), medium access control layer (MAC), and physical layer (PHY) layers of the gNB 128A, 128B or en-gNB, and its operation is at least partly controlled by gNB-CU 322E. In some aspects, one gNB-DU (e.g., 324E) can support one or multiple cells.

The gNB-CU 322E comprises a gNB-CU-Control Plane (gNB-CU-CP) entity 328E and a gNB-CU-User Plane entity (gNB-CU-UP) 330E. The gNB-CU-CP 328E is a logical node configured to host the RRC and the control plane part of the PDCP protocol of the gNB-CU 322E for an en-gNB or a gNB. The gNB-CU-UP 330E is a logical (or physical) node configured to host the user plane part of the PDCP protocol of the gNB-CU 322E for an en-gNB, and the user plane part of the PDCP protocol and the SDAP protocol of the gNB-CU 322E for a gNB.

The gNB-CU 322E and the gNB-DUs 324E, 326E can communicate via the F1 interface, and the gNB 308 can communicate with the gNB-CU 322E via the Xn-C interface. The gNB-CU-CP 328E and the gNB-CU-UP 330E can communicate via the E1 interface(s). Additionally, the gNB-CU-CP 328E and the gNB-DUs 324E, 326E can communicate via the F1-C interface, and the gNB-DUs 324E, 326E, and the gNB-CU-UP 330E can communicate via the F1-U interface.

In some aspects, the gNB-CU 322E terminates the F1 interface connected with the gNB-DUs 324E, 326E, and in other aspects, the gNB-DUs 324E, 326E terminate the F1 interface connected with the gNB-CU 322E. In some aspects, the gNB-CU-CP 328E terminates the E1 interface connected with the gNB-CU-UP 330E and the F1-C interface connected with the gNB-DUs 324E, 326E. In some aspects, the gNB-CU-UP 330E terminates the E1 interface connected with the gNB-CU-CP 328E and the F1-U interface connected with the gNB-DUs 324E, 326E.

In some aspects, the F1 interface is a point-to-point interface between endpoints and supports the exchange of signaling information between endpoints and data transmission to the respective endpoints. The F1 interface can support the control plane and user plane separation and separate the Radio Network Layer and the Transport Network Layer. In some aspects, the E1 interface is a point-to-point interface between a gNB-CU-CP and a gNB-CU-UP and supports the exchange of signaling information between endpoints. The E1 interface can separate the Radio Network Layer and the Transport Network Layer, and in some aspects, the E1 interface may be a control interface not used for user data forwarding.

Referring to the NG-RAN 304, the gNBs 308, 310 of the NG-RAN 304 may communicate to the 5GC 306 via the NG interfaces, and can be interconnected to other gNBs via the Xn interface. In some aspects, the gNBs 308, 310 can be configured to support FDD mode, TDD mode, or dual mode operation. In certain aspects, for EN-DC, the S1-U interface and an X2 interface (e.g., X2-C interface) for a gNB, consisting of a gNB-CU and gNB-DUs, can terminate in the gNB-CU.

In some aspects, gNB 310 supporting CP/UP separation, includes a single CU-CP entity 328E, multiple CU-UP entities 330E, and multiple DU entities 324E, . . . , 326E, with all entities being configured for network slice operation. As illustrated in FIG. 3E, each DU entity 324E, . . . , 326E can have a single connection with the CU-CP 328E via an F1-C interface. Each DU entity 324E, . . . , 326E can be connected to multiple CU-UP entities 330E using F1-U interfaces. The CU-CP entity 328E can be connected to multiple CU-UP entities 330E via E1 interfaces. Each DU entity 324E, . . . , 326E can be connected to one or more UEs, and the CU-UP entities 330E can be connected to a user plane function (UPF) and the 5G core 306.

In some aspects, entities within the gNB 310 can perform one or more procedures associated with interfaces or radio bearers within the NG-RAN 304 with the separation of CP/UP. For example, NG-RAN 304 can support the following procedures associated with network slice configuration:

E1 interface setup: this procedure allows the setup of the E1 interface, and it includes the exchange of the parameters needed for interface operation. The E1 setup is initiated by the CU-CP 328E;

E1 interface reset: this procedure allows the reset of the E1 interface, including changes in the configuration parameters. The E1 interface reset is initiated by either the CU-CP 328E or the CU-UP 330E;

E1 error indication: this procedure allows reporting of detected errors in one incoming message. The E1 interface reset is initiated by either the CU-CP 328E or the CU-UP 330E;

E1 load information: this procedure allows CU-UP 328E to inform CU-CP 328E of the prevailing load condition periodically. The same procedure could also be used to indicate the overload of CU-UP 330E with overload status (Start/Stop);

E1 configuration update: this procedure supports updates in CU-UP 330E configuration, such as capacity changes;

Data Radio Bearer (DRB) setup: this procedure allows the CU-CP 328E to setup DRBs in the CU-CP, including the security key configuration and the quality of service (QoS) flow to DRB mapping configuration;

DRB modification: this procedure allows the CU-CP 328E to modify DRBs in the CU-CP, including the modification of security key configuration and the modification of the QoS flow to DRB mapping configuration;

DRB release: this procedure allows the CU-CP 328E to release DRBs in the CU-CP; and Downlink Data Notification (DDN): This procedure allows CU-UP 330E to request CU-CP 328E to trigger a paging procedure to support RRC Inactive state.

In some aspects, the NG-RAN 304 can be configured to support E1 interface management procedures for network slicing including resource availability indication from the CU-UP 330E, resource management in CU-UP 330E, and latency indication from the CU-UP 330E.

In some aspects, the NG-RAN 304 can be configured to support F1-C interface management procedures for network slicing including resource availability indication from the DU entities 324E, . . . 326E, the resource management in the DU entities 324E, . . . , 326E, and latency indication from the DU entities 324E, . . . , 326E.

In some aspects, the NG-RAN 304 can be configured to support latency measurements over the F1-U interface so that the UP elements including DU entities (324E, . . . , 326E) and CU-UP entities 330E are able to communicate latency information to other neighboring UP elements. In this regard, network slicing can be supported in the NG-RAN 304 with the separation of CP/UP. In some aspects, slice-level isolation and improved resource utilization can be provided by the central RRM in the CU-CP 328E.

In some aspects, procedures associated with network slicing include operations and communications over the E1 interface, the F1-C interface, and the F1-U interface. With these procedures, the CU-CP 328E can select the appropriate DU and CU-UP entities to serve the specific network slicing request associated with a certain service level agreement (SLA).

In some aspects, the procedure over the E1 interface can include information collection from the CU-UP entities 330E and resource management in the CU-CP 328E. Specifically, the information collection can include resource availability indication and latency indication, while resource management can include resource allocation and resource release. The CU-CP 328E can be configured to collect the information from the CU-UP entities 330E periodically or issue an on-demanding query based on a network slice request. In some aspects, a resource availability indication procedure can allow the CU-UP entities 330E to inform the CU-CP 328E of the availability of resources to process a network slicing request. For example, the indication of the available resource can assist the CU-CP 328E to determine whether the specific CU-UP can serve the specific network slice requesting associated with a certain SLA.

In some aspects, a resource allocation procedure can allow the CU-CP 328E to allocate the resource in the CU-UP 330E that is associated with a specific slice. Upon the reception of a request for a network slice creation, the CU-CP 328E can select the CU-UP 330E (e.g., one of the CU-UP entities) following the indicated SLA and allocate the resource in the selected CU-UP to the network slice. In some aspects, a resource release procedure can allow the CU-CP 328E to release the resource in the CU-UP that is assigned to an established network slice. Upon the removal of the slice, the CU-CP 328E can notify the corresponding CU-UP to release the resource used by the removed network slice.

Figure 4:
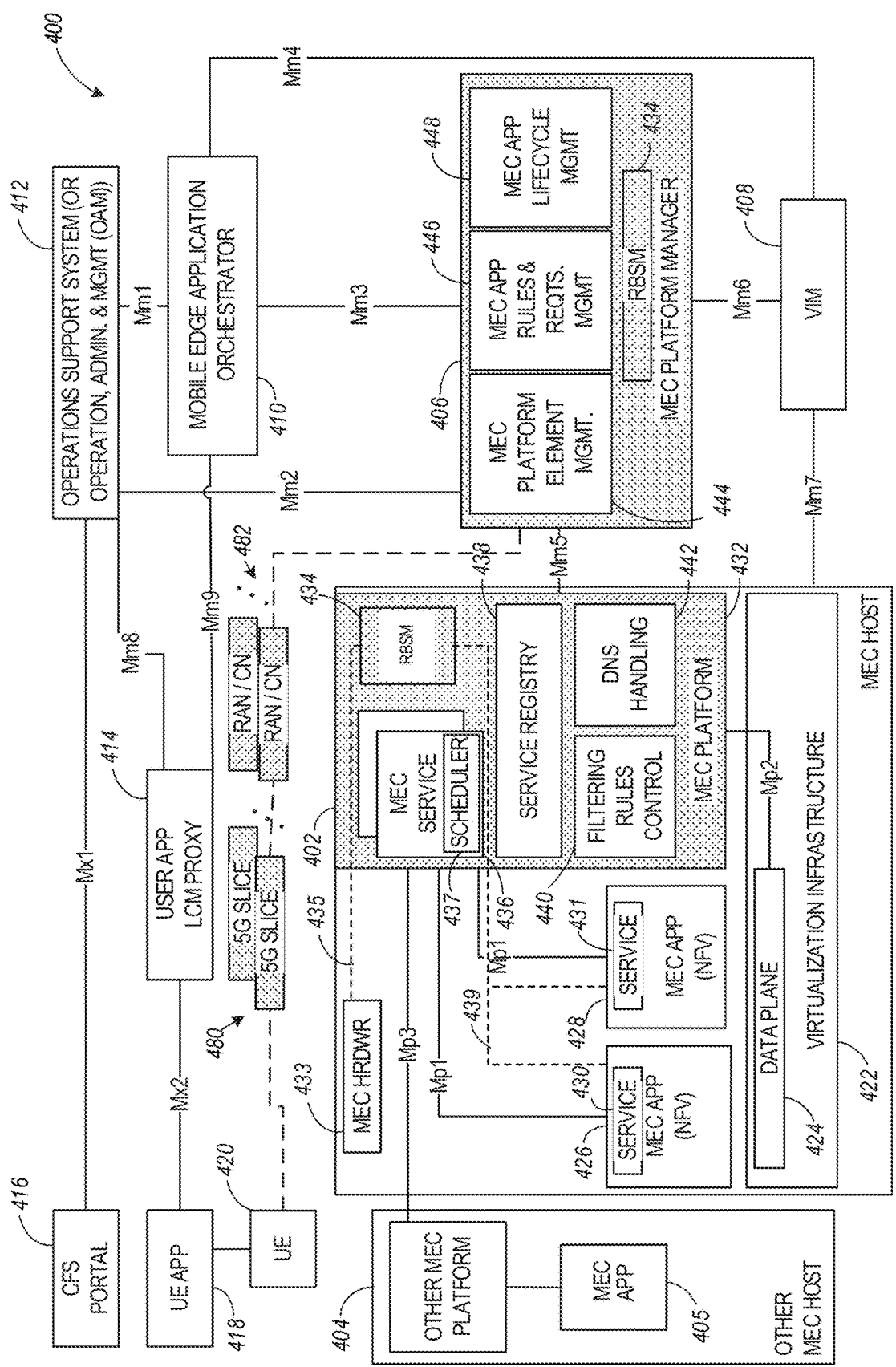
FIG. 4 illustrates a MEC network architecture modified for supporting slice management, resource management, and traceability functions, according to an example.

FIG. 4 illustrates a MEC network architecture 400 modified for supporting slice management, resource management, and traceability functions, according to an example. FIG. 4 specifically illustrates a MEC architecture 400 with MEC hosts 402 and 404 providing functionalities in accordance with the ETSI GS MEC-003 specification, with the shaded blocks used to indicate processing aspects for the MEC architecture configuration described herein in connection with slice management, resource management, and traceability functions. Specifically, enhancements to the MEC platform 432 and the MEC platform manager 406 may be used for providing slice management, resource management, and traceability functions within the MEC architecture 400. This may include provisioning of one or more network slices, dynamic management of resources used by the network slices, as well as resource traceability functions within the MEC architecture.

Referring to FIG. 4, the MEC network architecture 400 can include MEC hosts 402 and 404, a virtualization infrastructure manager (VIM) 408, an MEC platform manager 406, an MEC orchestrator 410, an operations support system (or operation, administration, and management (OAM) node) 412, a user app proxy 414, a UE app 418 running on UE 420, and CFS portal 416. The MEC host 402 can include a MEC platform 432 with filtering rules control module 440, a DNS handling module 442, service registry 438, and MEC services 436. The MEC services 436 can include at least one scheduler 437, which can be used to select resources for instantiating MEC apps (or NFVs) 426 and 428 upon virtualization infrastructure 422. The MEC apps 426 and 428 can be configured to provide services 430/431, which can include processing network communications traffic of different types associated with one or more wireless connections (e.g., connections to one or more RAN (including Wi-Fi, Zigbee, or other network connections) or core network entities as illustrated in FIGS. 1-3D). The MEC hardware 433 and the at least one scheduler 437 can be similar to the MEC hardware 123 and the scheduler 120 discussed in connection with FIG. 1A.

The MEC platform manager 406 can include MEC platform element management module 444, MEC app rules and requirements management module 446, and MEC app lifecycle management module 448. The various entities within the MEC architecture 400 can perform functionalities as disclosed by the ETSI GS MEC-003 specification.

In some aspects, UE 420 can be configured to communicate to one or more of the core networks 482 via one or more of the network slices 480. In some aspects, the core networks 482 can use slice management functions (e.g., as provided by slice management module 164) to dynamically configure slices 480, including dynamically assign a slice to a UE, reassign a slice to a UE, dynamically allocate or reallocate resources used by one or more of the slices 480, or other slice related management functions. One or more of the functions performed in connection with slice management can be initiated based on user requests (e.g., via a UE) or request by a service provider. In some aspects, the slice management functions in connection with network slices 480 can be facilitated by AIRM and BCTM resource management and traceability related functions (provided by, e.g., the RBSM module 434 within the MEC host 402 or the MEC platform manager 406). Additional dynamic network slice instance allocation and resource management use cases are illustrated in connection with FIGS. 11-16.

Figure 5:
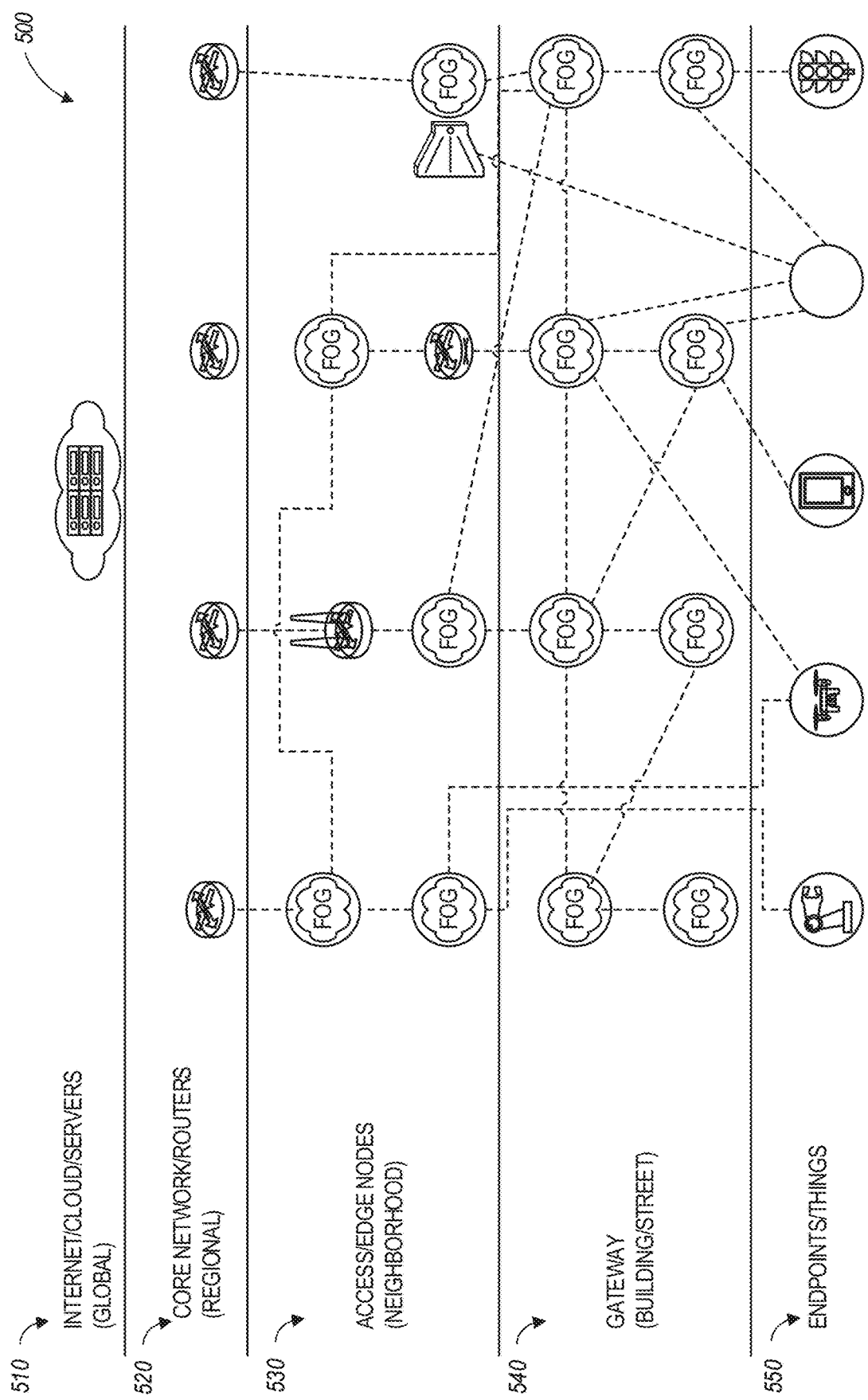
FIG. 5 illustrates a MEC and FOG network topology, according to an example.

FIG. 5 illustrates a MEC and FOG network topology 500, according to an example. Referring to FIG. 5, the network topology 500 can include a number of conventional networking layers, that can be extended through the use of a resource, blockchain, and slice management function discussed herein. Specifically, the relationships between endpoints (at endpoints/things network layer 550), gateways (at gateway layer 540), access or edge computing nodes (e.g., at neighborhood nodes layer 530), core network or routers (e.g., at regional or central office layer 520), may be represented through the use of data communicated via MEC hosts that use RBSM functionalities that can be located at various nodes within the topology 500.

A FOG network (e.g., established at gateway layer 540) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 5 illustrates a general architecture that integrates a number of MEC and FOG nodes-categorized in different layers (based on their position, connectivity and processing capabilities, etc.), with each node implementing a MEC V2X API that can enable a MEC app or other entity of a MEC enabled node to communicate with other nodes. It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a MEC host, or a simple entity hosting a MEC app and a light-weighted MEC platform.

In an example, a MEC or FOG node may be defined as an application instance, connected to or running on a device (MEC host) that is hosting a MEC platform. Here, the application consumes MEC services and is associated with a MEC host in the system. The nodes may be migrated, associated with different MEC hosts, or consume MEC services from other (e.g., local or remote) MEC platforms.

In contrast to this approach, traditional V2V applications are reliant on remote cloud data storage and processing to exchange and coordinate information. A cloud data arrangement allows for long-term data collection and storage but is not optimal for highly time-varying data, such as a collision, traffic light change, etc. and may fail in attempting to meet latency challenges, such as stopping a vehicle when a child runs into the street.

In some aspects, the MEC or FOG facilities can be used to locally create, maintain, and destroy MEC or FOG nodes to host data exchanged via NFVs and using resources managed by a MEC QoS manager, based upon need. Depending on the real-time requirements in a vehicular communications context, a hierarchical structure of data processing and storage nodes can be defined. For example, including local ultra-low-latency processing, regional storage, and processing as well as remote cloud data-center based storage and processing. Key Performance Indicators (KPIs) may be used to identify where sensor data is best transferred and where it is processed or stored. This typically depends on the ISO layer dependency of the data. For example, the lower layer (PHY, MAC, routing, etc.) data typically changes quickly and is better handled locally in order to meet latency requirements. Higher layer data such as Application Layer data is typically less time critical and may be stored and processed in a remote cloud data-center. In some aspects, the KPIs are metrics or operational parameters that can include spatial proximity to a V2X-related target event (e.g., accident, etc.); physical proximity to other objects (e.g., how much time is required to transfer data from one data or application object to another object); available processing power; or current load of the target (network) node and corresponding processing latency. In some aspects, the KPIs can be used to facilitate automated location and relocation of data in an MEC architecture.

Figure 6:
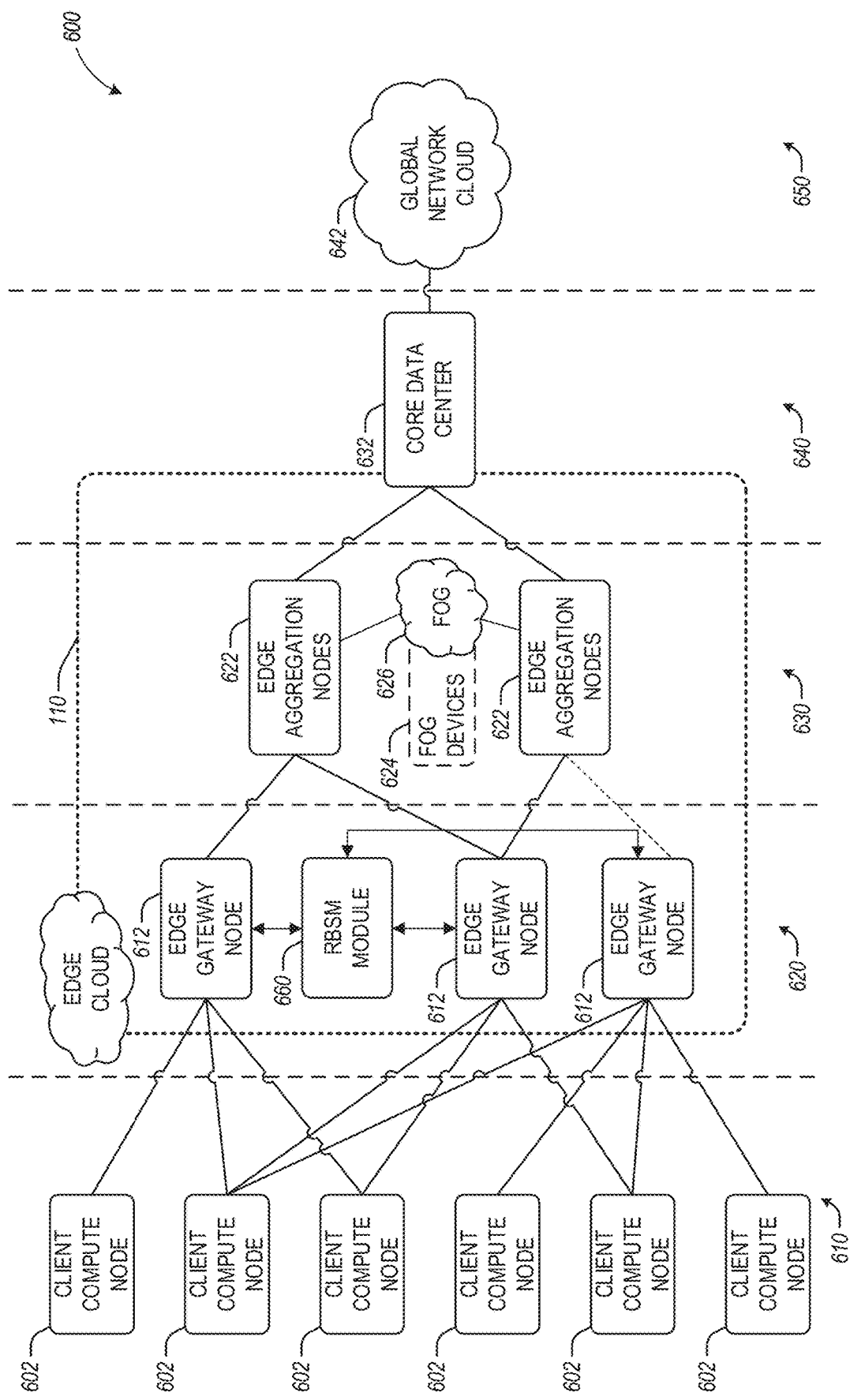
FIG. 6 illustrates an overview of layers of distributed compute deployed among an edge computing system, according to an example.

At a more generic level, an edge computing system may be described to encompass any number of deployments operating in the edge cloud 110B, which provide coordination from the client and distributed computing devices. FIG. 6 provides a further abstracted overview of layers of distributed compute deployed among an edge computing environment for purposes of illustration.

FIG. 6 generically depicts an edge computing system for providing edge services and applications to multi-stakeholder entities, as distributed among one or more client compute nodes 602, one or more edge gateway nodes 612, one or more edge aggregation nodes 622, one or more core data centers 632, and a global network cloud 642, as distributed across layers of the network. The implementation of the edge computing system may be provided at or on behalf of a telecommunication service provider ("telco", or "TSP"), Internet-of-Things (IoT) service provider, a communications service provider (CSP), enterprise entity, or any other number of entities. Various forms of wired or wireless connections may be configured to establish connectivity among the nodes 602, 612, 622, 632, including interconnections among such nodes (e.g., connections among edge gateway nodes 612, and connections among edge aggregation nodes 622).

Each node or device of the edge computing system is located at a particular layer corresponding to layers 610, 620, 630, 640, and 650. For example, the client compute nodes 602 are each located at an endpoint layer 610, while each of the edge gateway nodes 612 is located at an edge devices layer 620 (local level) of the edge computing system. Additionally, each of the edge aggregation nodes 622 (and/or fog devices 624, if arranged or operated with or among a fog networking configuration 626) is located at a network access layer 630 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of fog may be integrated into an edge computing architecture.

The core data center 632 is located at a core network layer 640 (e.g., a regional or geographically-central level), while the global network cloud 642 is located at a cloud data center layer 650 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 632 may be located within, at, or near the edge cloud 110B.

Although an illustrative number of client compute nodes 602, edge gateway nodes 612, edge aggregation nodes 622, core data centers 632, and global network clouds 642 are shown in FIG. 6, it should be appreciated that the edge computing system may include more or fewer devices or systems at each layer. Additionally, as shown in FIG. 6, the number of components of each layer 610, 620, 630, 640, and 650 generally increases at each lower level (i.e., when moving closer to endpoints). As such, one edge gateway node 612 may service multiple client compute nodes 602, and one edge aggregation node 622 may service multiple edge gateway nodes 612.

Consistent with the examples provided herein, each client compute node 602 may be embodied as any type of end point component, device, appliance, or "thing" capable of communicating as a producer or consumer of data. Further, the label "node" or "device" as used in the edge computing system 600 does not necessarily mean that such node or device operates in a client or slave role; rather, any of the nodes or devices in the edge computing system 600 refer to individual entities, nodes, or subsystems which include discrete or connected hardware or software configurations to facilitate or use the edge cloud 110B.

As such, the edge cloud 110B is formed from network components and functional features operated by and within the edge gateway nodes 612 and the edge aggregation nodes 622 of layers 620, 630, respectively. The edge cloud 110B may be embodied as any type of network that provides edge computing and/or storage resources which are proximately located to radio access network (RAN) capable endpoint devices (e.g., mobile computing devices, IoT devices, smart devices, etc.), which are shown in FIG. 6 as the client compute nodes 602. In other words, the edge cloud 110B may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110B may form a portion of or otherwise provide an ingress point into or across a fog networking configuration 626 (e.g., a network of fog devices 624, not shown in detail), which may be embodied as a system-level horizontal and distributed architecture that distributes resources and services to perform a specific function. For instance, a coordinated and distributed network of fog devices 624 may perform computing, storage, control, or networking aspects in the context of an IoT system arrangement. Other networked, aggregated, and distributed functions may exist in the edge cloud 110B between the cloud data center layer 650 and the client endpoints (e.g., client compute nodes 602). Some of these are discussed in the following sections in the context of network functions or service virtualization, including the use of virtual edges and virtual services which are orchestrated for multiple stakeholders.

The edge gateway nodes 612 and the edge aggregation nodes 622 cooperate to provide various edge services and security to the client compute nodes 602. Furthermore, because each client compute node 602 may be stationary or mobile, each edge gateway node 612 may cooperate with other edge gateway devices to propagate presently provided edge services and security as the corresponding client compute node 602 moves about a region. To do so, each of the edge gateway nodes 612 and/or edge aggregation nodes 622 may support multiple tenancies and multiple stakeholder configurations, in which services from (or hosted for) multiple service providers and multiple consumers may be supported and coordinated across a single or multiple compute devices.

In various examples, the present 5G network slice instance management with AI-based network inferencing and blockchain traceability techniques may be implemented among the client compute nodes 602, the edge gateway nodes 612, the aggregation nodes 622, and other intermediate nodes in the edge cloud 110B (e.g., which operate orchestrator functions or other node management functions, etc.), as further discussed below with reference to FIGS. 11-16. For example, the edge cloud 110B may include an RBSM module 660 (which can be similar to the RBSM module 170C in FIG. 1C) that is configured to perform one or more of the functionalities of the AI-based resource management module 160, the blockchain traceability management module 162, and the slice management module 164 as discussed herein above in connection with FIG. 1A.

Even though techniques disclosed herein for network slicing, resource management, and blockchain traceability are discussed in connection with edge-related architectures where at least one edge compute node is present, the disclosure is not limited in this regard and the disclosed techniques may be used in architectures that do not use edge entities. For example, techniques associated with network slicing, resource management, and blockchain traceability can be performed in non-edge architectures as well.

Even though techniques disclosed herein are described in connection with an edge architecture and a 5G architecture, the disclosure is not limited in this regard and the disclosed techniques can be used with other types of wireless architectures (e.g., 2G, 3G, 4G, etc.) that use one or more edge nodes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.1 lad, IEEE 802.1 lay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), all Wi-Fi network spectrums including but not limited to Wi-Fi-6, etc.

Aspects described herein can be used in the context of any spectrum management scheme including a dedicated licensed spectrum, unlicensed spectrum, (licensed) shared spectrum (such as LSA=Licensed Shared Access in 2.3-2.4 GHz, 3.4-3.6 GHz, 3.6-3.8 GHz, and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively), IMT-advanced spectrum. IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig in US (FCC part 15) allocated as total 14 GHz spectrum, while EU (ETSI EN 302 567 and ETSI EN 301 217-2 for fixed P2P) allocated as total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz), where particularly the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme by, e.g., introducing a hierarchical prioritization of usage for different types of users (e.g., low/medium/high priority, etc.), based on a prioritized access to the spectrum e.g. with the highest priority to tier-1 users, followed by tier-2, then tier-3 users, and so forth.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources. Some of the features in this document are defined for the network side, such as Access Points, eNodeBs, New Radio (NR) or next generation Node-Bs (gNodeB or gNB), such as used in the context of 3GPP fifth generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

Figure 7:
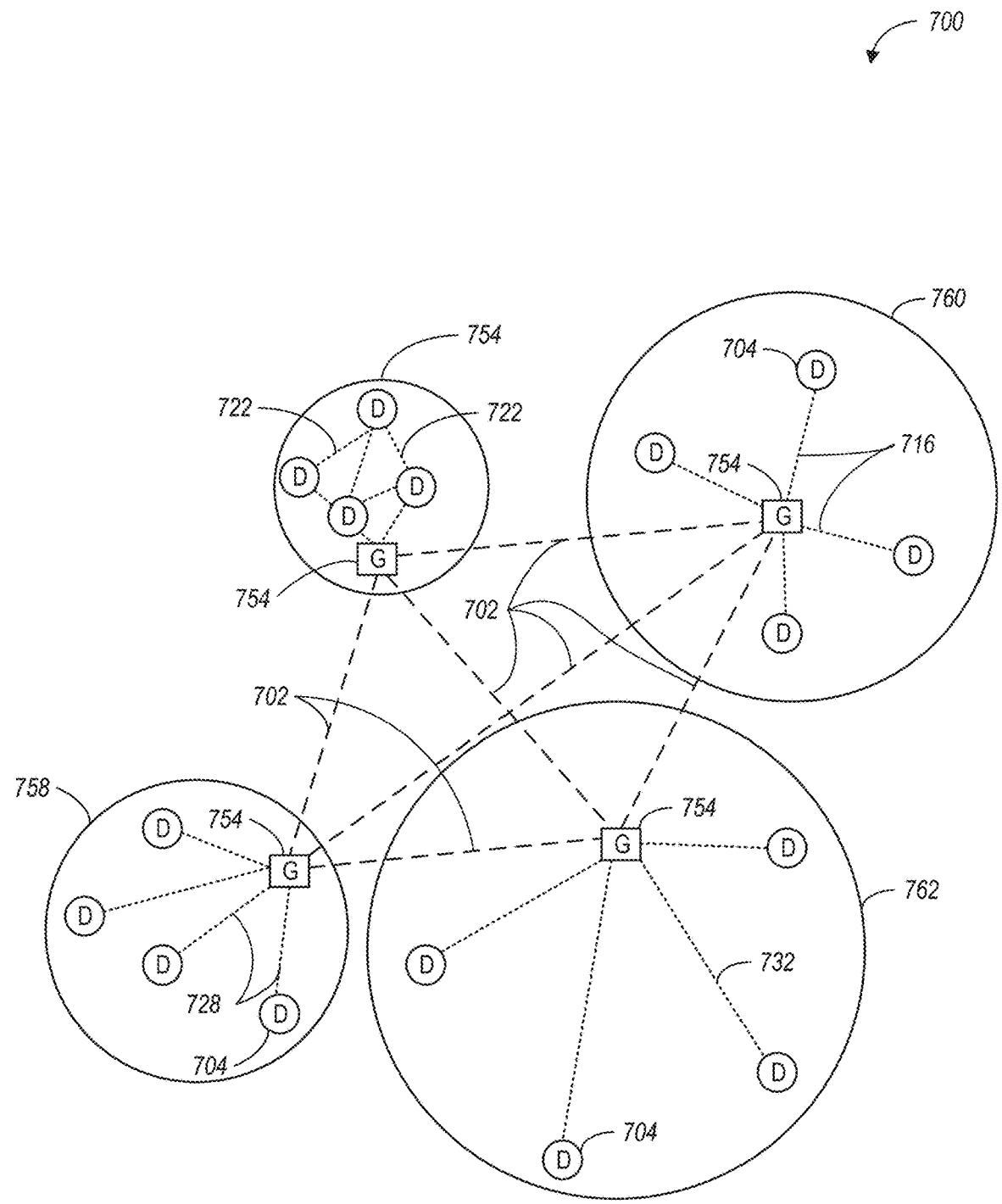
FIG. 7 illustrates a domain topology for respective Internet-of-Things (IoT) networks coupled through links to respective gateways, according to an example.

In further examples, the preceding examples of network communications and operations may be integrated with IoT and like device-based network architectures. FIG. 7 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an edge computing device may include a semi-autonomous device performing a function, such as sensing or control, among others, in communication with other edge computing devices and a wider network, such as the Internet.

MEC use cases have been envisioned to integrate into a number of network and application settings, including those to support network arrangements of IoT deployments. Edge computing devices are physical or virtualized objects that may communicate on a network (typically at the edge or endpoint of a network) and may include sensors, actuators, and other input/output components, such as to collect data or perform actions from a real-world environment. For example, edge computing devices may include low-powered devices that are embedded or attached to everyday things, such as buildings, vehicles, packages, etc., to provide sensing, data, or processing functionality. Recently, edge computing devices have become more popular and thus applications and use cases using these devices have proliferated.

Various standards have been proposed to more effectively interconnect and operate edge computing devices and IoT network use cases, including those with MEC and mobile network architectures. Some of the relevant communication and network architecture standards include those distributed by groups such as ETSI, 3rd Generation Partnership Project (3GPP), Institute of Electrical and Electronics Engineers (IEEE), in addition to specialized IoT application interaction architecture and configuration standards distributed by working groups such as the Open Connectivity Foundation (OCF).

Often, edge computing devices are limited in memory, size, or functionality, enabling larger numbers to be deployed for a similar cost to smaller numbers of larger devices. However, an edge computing device may be a smartphone, laptop, tablet, PC, or other larger device. Further, an edge computing device may be a virtual device, such as an application on a smartphone or another computing device. Edge computing devices may include IoT gateways, used to couple edge computing devices to other edge computing devices and to cloud applications, for data storage, process control, and the like.

Networks of edge computing devices may include commercial and home automation devices, such as water distribution systems, electric power distribution systems, pipeline control systems, plant control systems, light switches, thermostats, locks, cameras, alarms, motion sensors, and the like. The edge computing devices may be accessible through remote computers, servers, and other systems, for example, to control systems or access data.

The future growth of the Internet and like networks may involve very large numbers of edge computing devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of edge computing devices and networks present a number of new challenges in a heterogeneous network of connectivity comprising a combination of wired and wireless technologies.

FIG. 7 specifically provides a simplified drawing of a domain topology that may be used for a number of IoT networks comprising edge computing devices 704, with the IoT networks 756, 758, 760, 762, coupled through backbone links 702 to respective gateways 754. For example, a number of edge computing devices 704 may communicate with a gateway 754, and with each other through the gateway 754. To simplify the drawing, not every edge computing device 704, or communications link (e.g., link 716, 722, 728, or 732) is labeled. The backbone links 702 may include any number of wired or wireless technologies, including optical networks, and may be part of a local area network (LAN), a wide area network (WAN), or the Internet. Additionally, such communication links facilitate optical signal paths among both edge computing devices 704 and gateways 754, including the use of MUXing/deMUXing components that facilitate the interconnection of the various devices.

The network topology may include any number of types of IoT networks, such as a mesh network provided with the network 756 using Bluetooth low energy (BLE) links 722. Other types of IoT networks that may be present include a wireless local area network (WLAN) network 758 used to communicate with edge computing devices 704 through IEEE 802.11 (Wi-Fi®) links 728, a cellular network 760 used to communicate with edge computing devices 704 through an LTE/LTE-A (4G) or 5G cellular network, and a low-power wide area (LPWA) network 762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with the use of a variety of network and internet application protocols such as the Constrained Application Protocol (CoAP). The respective IoT networks may also be integrated with coordinator devices that provide a chain of links that form the cluster tree of linked devices and networks.

Each of these IoT networks may provide opportunities for new technical features, such as those described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. Improved technologies may even enable IoT networks to function without centralized controlled systems. Accordingly, the improved technologies described herein may be used to automate and enhance network management and operation functions far beyond current implementations.

Such IoT networks may be further enhanced by the integration of sensing technologies, such as sound, light, electronic traffic, facial and pattern recognition, smell, vibration, into the autonomous organizations among the edge computing devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 756, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance and deliver a metric of data confidence.

The WLAN network 758, for instance, may use systems that perform standards conversion to provide multi-standard connectivity, enabling edge computing devices 704 using different protocols to communicate. Further systems may provide seamless interconnectivity across a multi-standard infrastructure comprising visible Internet resources and hidden Internet resources.

Communications in the cellular network 760, for instance, may be enhanced by systems that offload data, extend communications to more remote devices, or both. The LPWA network 762 may include systems that perform non-Internet protocol (IP) to IP interconnections, addressing, and routing. Further, each of the edge computing devices 704 may include the appropriate transceiver for wide area communications with that device. Further, each edge computing device 704 may include other transceivers for communications using additional protocols and frequencies. This is discussed further with respect to the communication environment and hardware of edge computing devices depicted in FIG. 9 and FIGS. 10A-10B.

Finally, clusters of edge computing devices may be equipped to communicate with other edge computing devices as well as with a cloud network. This may enable the edge computing devices to form an ad-hoc network between the devices, enabling them to function as a single device, which may be termed a fog device, fog platform, or fog network. This configuration is discussed further with respect to FIG. 8 below.

Figure 8:
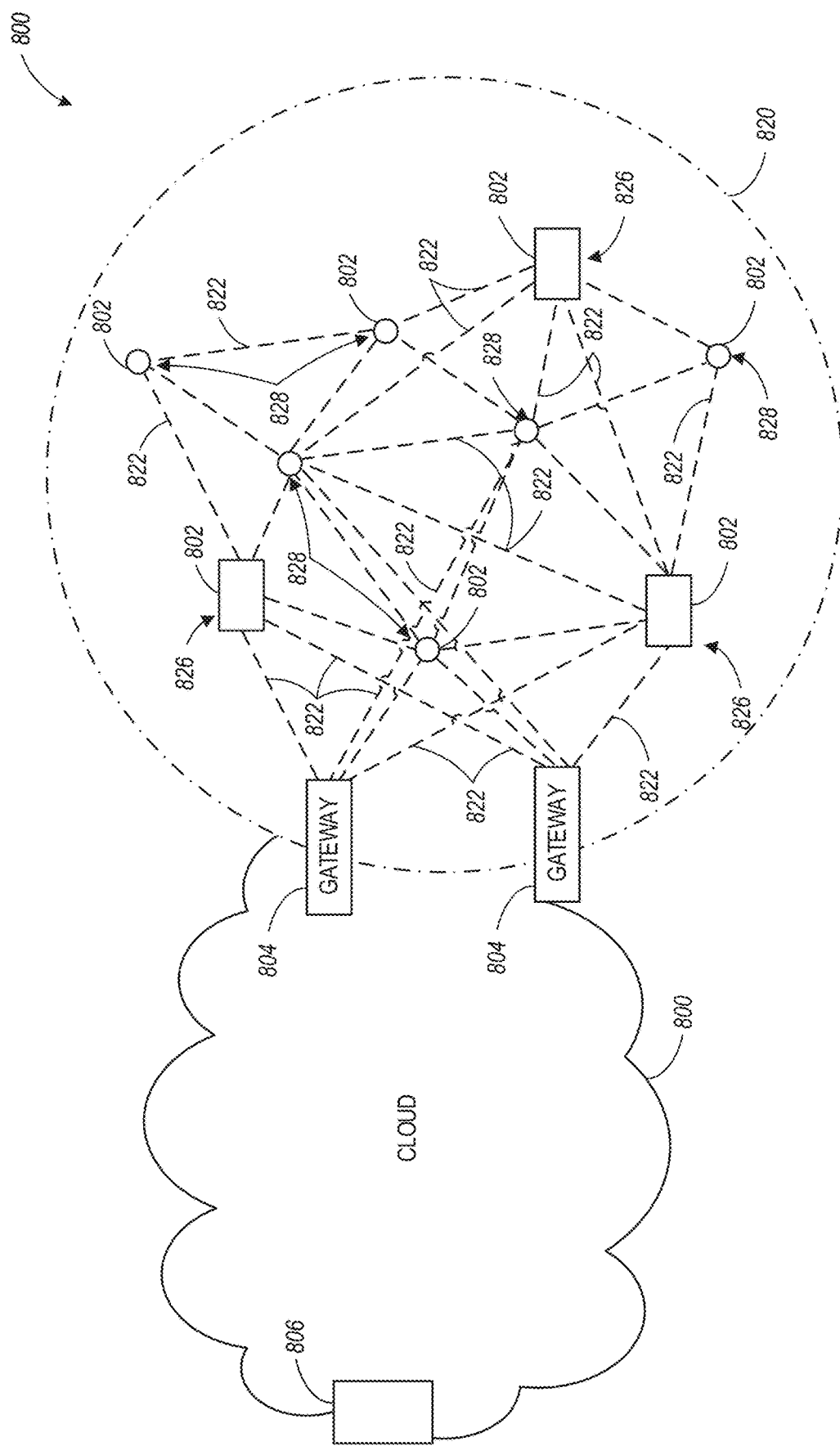
FIG. 8 illustrates a cloud-computing network in communication with a mesh network of edge computing devices operating as fog devices at the edge of the cloud computing network, according to an example.

FIG. 8 illustrates a cloud-computing network in communication with a mesh network of edge computing devices (devices 802) operating as fog devices at the edge of the cloud computing network, according to an example. The mesh network of edge computing devices may be termed a fog network 820, established from a network of devices operating at the edge of the cloud 800. To simplify the diagram, not every edge computing device 802 is labeled.

The fog network 820 may be considered to be a massively interconnected network wherein a number of edge computing devices 802 are in communications with each other, for example, by radio links 822. The fog network 820 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 820 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of edge computing devices 802 are shown in this example, gateways 804, data aggregators 826, and sensors 828, although any combinations of edge computing devices 802 and functionality may be used. The gateways 804 may be edge devices that provide communications between the cloud 800 and the fog 820 and may also provide the backend process function for data obtained from sensors 828, such as motion data, flow data, temperature data, and the like. The data aggregators 826 may collect data from any number of the sensors 828 and perform the back-end processing function for the analysis. The results, raw data, or both may be passed along to the cloud 800 through the gateways 804. The sensors 828 may be full edge computing devices 802, for example, capable of both collecting data and processing the data. In some cases, the sensors 828 may be more limited in functionality, for example, collecting the data and enabling the data aggregators 826 or gateways 804 to process the data.

Communications from any of the edge computing devices 802 may be passed along a convenient path (e.g., a most convenient path) between any of the edge computing devices 802 to reach the gateways 804. In these networks, the number of interconnections provides substantial redundancy, enabling communications to be maintained, even with the loss of a number of edge computing devices 802. Further, the use of a mesh network may enable edge computing devices 802 that are very low power or located at a distance from infrastructure to be used, as the range to connect to another edge computing devices 802 may be much less than the range to connect to the gateways 804.

The fog 820 provided from these edge computing devices 802 may be presented to devices in the cloud 800, such as a server 806, as a single device located at the edge of the cloud 800, e.g., a fog device. In this example, the alerts coming from the Fog device may be sent without being identified as coming from a specific edge computing devices 802 within the fog 820. In this fashion, the fog 820 may be considered a distributed platform that provides computing and storage resources to perform processing or data-intensive tasks such as data analytics, data aggregation, and machine learning, among others.

In some examples, the edge computing devices 802 may be configured using an imperative programming style, e.g., with each edge computing devices 802 having a specific function and communication partners. However, the edge computing devices 802 forming the fog device may be configured in a declarative programming style, enabling the edge computing devices 802 to reconfigure their operations and communications, such as to determine needed resources in response to conditions, queries, and device failures. As an example, a query from a user located at a server 806 about the operations of a subset of equipment monitored by the edge computing devices 802 may result in the fog 820 device selecting the edge computing devices 802, such as particular sensors 828, needed to answer the query. The data from these sensors 828 may then be aggregated and analyzed by any combination of the sensors 828, data aggregators 826, or gateways 804, before being sent on by the fog 820 device to the server 806 to answer the query. In this example, edge computing devices 802 in the fog 820 may select the sensors 828 used based on the query, such as adding data from flow sensors or temperature sensors. Further, if some of the edge computing devices 802 are not operational, other edge computing devices 802 in the fog 820 device may provide analogous data, if available.

In other examples, the operations and functionality described above may be embodied by an edge computing device machine in the example form of an electronic processing system, within which a set or sequence of instructions may be executed to cause the electronic processing system to perform any one of the methodologies discussed herein, according to an example embodiment. The machine may be an edge computing device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, these and like examples to a processor-based system shall be taken to include any set of one or more machines that are controlled by or operated by a processor, set of processors, or processing circuitry (e.g., a machine in the form of a computer, a UE, an MEC processing device, an edge computing device, an IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 9:
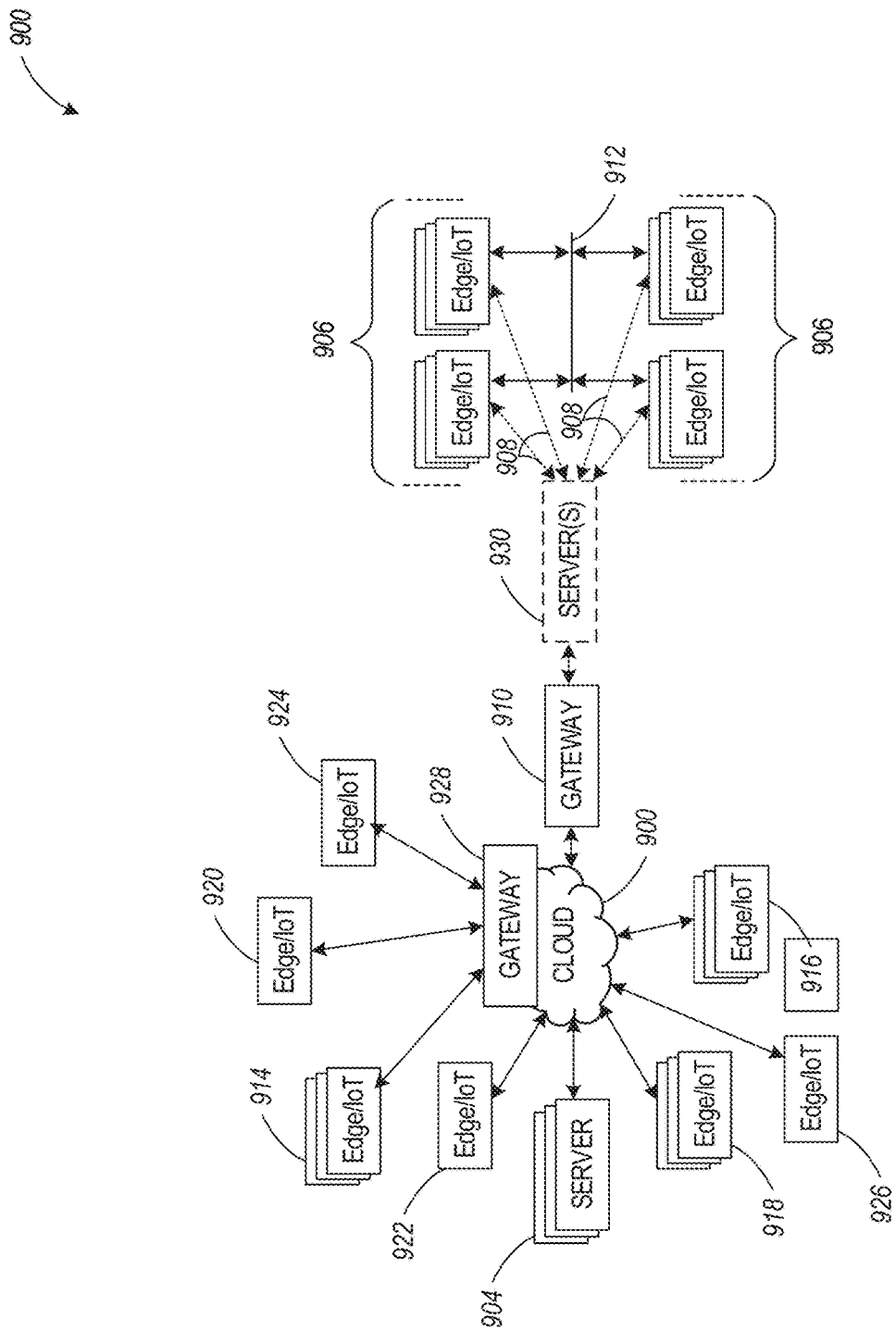
FIG. 9 illustrates a block diagram of a cloud computing network in communication with a number of edge computing devices, according to an example.

FIG. 9 illustrates a block diagram of a cloud computing network, or cloud 900, in communication with a number of edge computing devices, according to an example. The cloud computing network (or "cloud") 900 may represent the Internet or may be a local area network (LAN), or a wide area network (WAN), such as a proprietary network for a company. The edge computing devices may include any number of different types of devices, grouped in various combinations, which may be configured to perform one or more of the 5G network slice instance management functionalities, using blockchain traceability and AI-based resource management techniques discussed herein.

For example, a traffic control group 906 may include edge computing devices along the streets in a city. These edge computing devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the edge computing devices to communicate with each other, such as through a local area network, a wireless local area network, and the like. The edge computing devices may use another device, such as a gateway 910 or 928 to communicate with remote locations such as the cloud 900; the edge computing devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various edge computing devices 914, 920, 924 being constrained or dynamic to an assignment and use of resources in the cloud 900.

Other example groups of edge computing devices may include remote weather stations 914, local information terminals 916, alarm systems 918, automated teller machines 920, alarm panels 922, or moving vehicles, such as emergency vehicles 924 or other vehicles 926, among many others. Each of these edge computing devices may be in communication with other edge computing devices, with servers 904, with another IoT fog platform or system, or a combination therein. The groups of edge computing devices may be deployed in various residential, commercial, and industrial settings (including in both private or public environments).

As may be seen from FIG. 9, a large number of edge computing devices may be communicating through the cloud 900. This may allow different edge computing devices to request or provide information to other devices autonomously. For example, a group of edge computing devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection insufficient time for the emergency vehicle 924 to have unimpeded access to the intersection.

Clusters of edge computing devices, such as the remote weather stations 914 or the traffic control group 906, may be equipped to communicate with other edge computing devices as well as with the cloud 900. This may allow the edge computing devices to form an ad-hoc network between the devices, allowing them to function as a single device, which may be termed a fog platform or system (e.g., as described above with reference to FIG. 8).

Example Computing Devices

In further examples, any of the compute nodes or devices discussed with reference to the present edge computing systems and environment may be fulfilled based on the components depicted in FIGS. 10A and 10B. Each edge compute node may be embodied as a type of device, appliance, computer, or other "thing" capable of communicating with other edges, networking, or endpoint components. For example, an edge compute device may be embodied as a smartphone, a mobile computing device, a smart appliance, an in-vehicle computing system (e.g., a navigation system), or other device or system capable of performing the described functions.

Figure 10A:
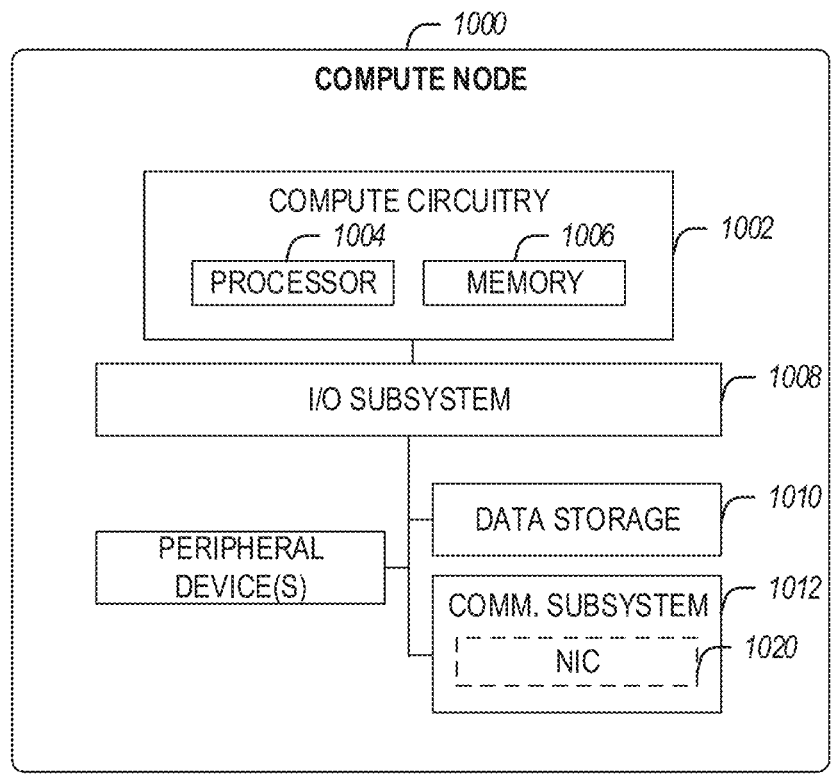
FIG. 10A illustrates an overview of example components deployed at a compute node system, according to an example.

In the simplified example depicted in FIG. 10A, an edge compute node 1000 includes a compute engine (also referred to herein as "compute circuitry") 1002, an input/output (I/O) subsystem 1008, data storage 1010, a communication circuitry subsystem 1012, and, optionally, one or more peripheral devices 1014. In other examples, each computing device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1000 may be embodied as any type of engine, device, or collection of devices capable of performing various compute functions. In some examples, the compute node 1000 may be embodied as a single device such as an integrated circuit, an embedded system, a field-programmable gate array (FPGA), a system-on-a-chip (SOC), or other integrated system or device. In the illustrative example, the compute node 1000 includes or is embodied as a processor 1004 and a memory 1006. The processor 1004 may be embodied as any type of processor capable of performing the functions described herein (e.g., executing an application). For example, the processor 1004 may be embodied as a multi-core processor(s), a microcontroller, or other processor or processing/controlling circuit. In some examples, the processor 1004 may be embodied as, include, or be coupled to an FPGA, an application-specific integrated circuit (ASIC), reconfigurable hardware or hardware circuitry, or other specialized hardware to facilitate the performance of the functions described herein.

The main memory 1006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte-addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 1006 may be integrated into the processor 1004. The main memory 1006 may store various software and data used during operation such as one or more applications, data operated on by the application(s), libraries, and drivers.

The compute circuitry 1002 is communicatively coupled to other components of the compute node 1000 via the I/O subsystem 1008, which may be embodied as circuitry and/or components to facilitate input/output operations with the compute circuitry 1002 (e.g., with the processor 1004 and/or the main memory 1006) and other components of the compute circuitry 1002. For example, the I/O subsystem 1008 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1008 may form a portion of a system-on-a-chip (SoC) and be incorporated, along with one or more of the processor 1004, the main memory 1006, and other components of the compute circuitry 1002, into the compute circuitry 1002.

The one or more illustrative data storage devices 1010 may be embodied as any type of device configured for short-term or long-term storage of data such as, for example, memory devices and circuits, memory cards, hard disk drives, solid-state drives, or other data storage devices. Each data storage device 1010 may include a system partition that stores data and firmware code for the data storage device 1010. Each data storage device 1010 may also include one or more operating system partitions that store data files and executables for operating systems depending on, for example, the type of compute node 1000.

The communication circuitry 1012 may be embodied as any communication circuit, device, or collection thereof, capable of enabling communications over a network between the compute circuitry 1002 and another compute device (e.g., an edge gateway node 612 of the edge computing system 600). The communication circuitry 1012 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 1012 includes a network interface controller (NIC) 1020, which may also be referred to as a host fabric interface (HFI). The NIC 1020 may be embodied as one or more add-in-boards, daughter cards, network interface cards, controller chips, chipsets, or other devices that may be used by the compute node 1000 to connect with another compute device (e.g., an edge gateway node 612). In some examples, the NIC 1020 may be embodied as part of a system-on-a-chip (SoC) that includes one or more processors or included on a multichip package that also contains one or more processors. In some examples, the NIC 1020 may include a local processor (not shown) and/or a local memory and storage (not shown) that are local to the NIC 1020. In such examples, the local processor of the NIC 1020 (which can include general-purpose accelerators or specific accelerators) may be capable of performing one or more of the functions of the compute circuitry 1002 described herein. Additionally, or alternatively, in such examples, the local memory of the NIC 1020 may be integrated into one or more components of the client compute node at the board level, socket level, chip level, and/or other levels.

Additionally, in some examples, each compute node 1000 may include one or more peripheral devices 1014. Such peripheral devices 1014 may include any type of peripheral device found in a compute device or server such as audio input devices, a display, other input/output devices, interface devices, and/or other peripheral devices, depending on the particular type of the compute node 1000. In further examples, the compute node 1000 may be embodied by a respective edge compute node in an edge computing system (e.g., client compute node 602, edge gateway node 612, edge aggregation node 622) or like forms of appliances, computers, subsystems, circuitry, or other components.

Figure 10B:
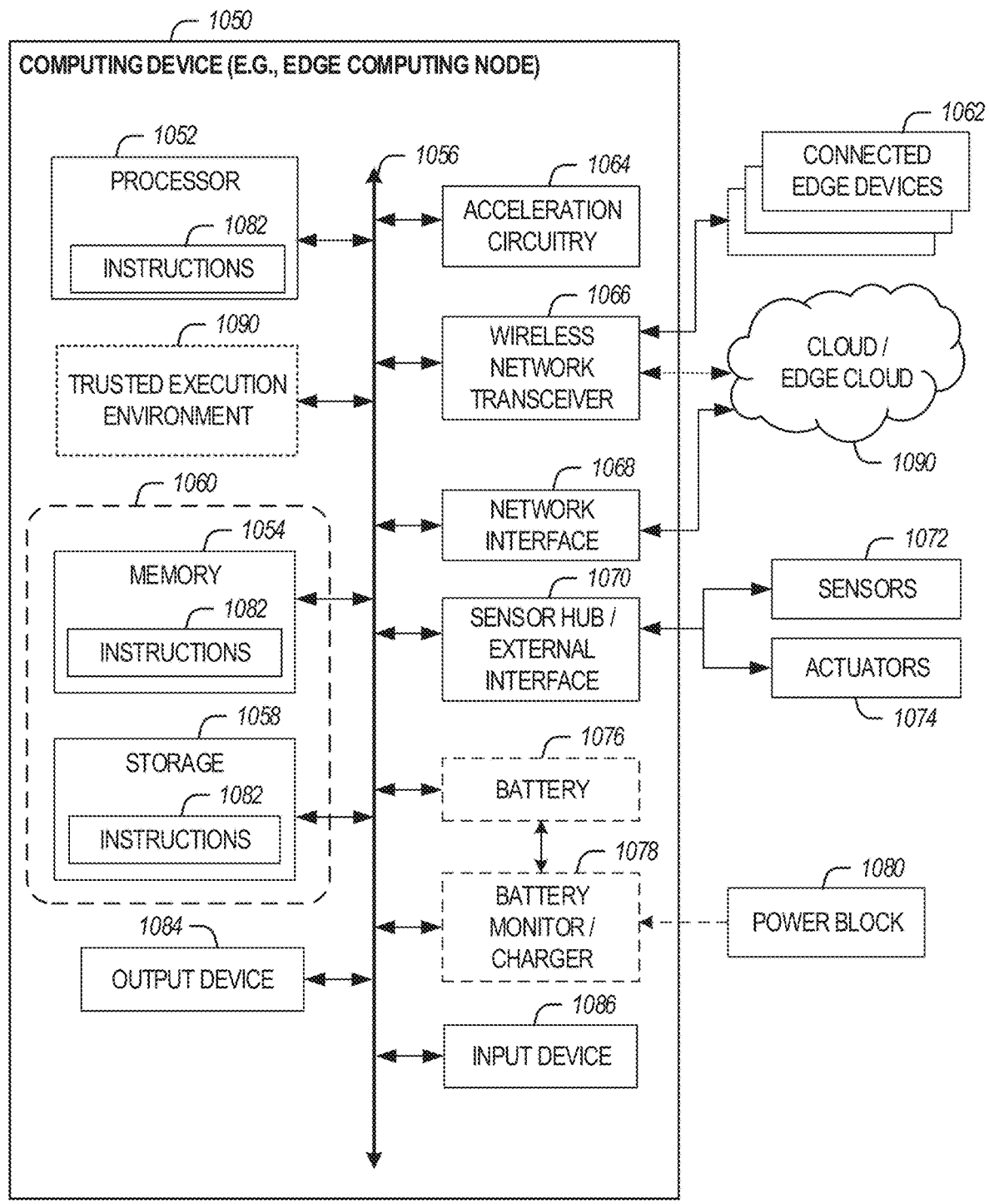
FIG. 10B illustrates a further overview of example components within a computing device for implementing the techniques (e.g., operations, processes, methods, and methodologies) described herein, according to an example.

In a more detailed example, FIG. 10B illustrates a block diagram of an example of components that may be present in an edge computing device (or node) 1050 for implementing the techniques (e.g., operations, processes, methods, and methodologies) described herein. The edge computing node 1050 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 1050, or as components otherwise incorporated within a chassis of a larger system.

The edge computing node 1050 may include processing circuitry in the form of a processor 1052, which may be a microprocessor, a multi-core processor, a multithreaded processor, an ultra-low voltage processor, an embedded processor, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, Calif. As an example, the processor 1052 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low power implementations, the storage 1058 may be on-die memory or registers associated with the processor 1052. However, in some examples, the storage 1058 may be implemented using a micro hard disk drive (HDD) or solid-state drive (SSD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an I2C interface, an SPI interface, point to point interfaces, and a power bus, among others.

The interconnect 1056 may couple the processor 1052 to a transceiver 1066, for communications with the connected edge devices 1062. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the edge computing node 1050 may communicate with close devices, e.g., within about 10 meters, using a local transceiver based on BLE, or another low power radio, to save power. More distant connected edge devices 1062, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1066 (e.g., a radio transceiver) may be included to communicate with devices or services in the edge cloud 1090 via local or wide area network protocols. The wireless network transceiver 1066 may be an LPWA transceiver that follows the IEEE 802.15.4, or IEEE 802.15.4g standards, among others. The edge computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1068 may be included to provide a wired communication to nodes of the edge cloud 1090 or to other devices, such as the connected edge devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, Time Sensitive Networks (TSN), among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1064, 1066, 1068, or 1070. Accordingly, in various examples, applicable means for communicating (e.g., receiving, transmitting, etc.) may be embodied by such communications circuitry.

The edge computing node 1050 may include or be coupled to acceleration circuitry 1064, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, a global positioning system (GPS) sensors, pressure sensors, barometric pressure sensors, and the like. The hub or interface 1070 further may be used to connect the edge computing node 1050 to actuators 1074, such as power switches, valve actuators, an audible sound generator, a visual warning device, and the like.

In some optional examples, various input/output (I/O) devices may be present within or connected to, the edge computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1050.

A battery 1076 may power the edge computing node 1050, although, in examples in which the edge computing node 1050 is mounted in a fixed location, it may have a power supply coupled to an electrical grid. The battery 1076 may be a lithium-ion battery, or a metal-air battery, such as a zinc-air battery, an aluminum-air battery, a lithium-air battery, and the like.

A battery monitor/charger 1078 may be included in the edge computing node 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the edge computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the edge computing node 1050. A wireless battery charging circuit, such as an LTC4020 chip from Linear Technologies of Milpitas, Calif., among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application-specific integrated circuit (ASIC).

In an example embodiment, the instructions 1082 provided via memory 1054, the storage 1058, or the processor 1052 may be embodied as a non-transitory, machine-readable medium 1060 including code to direct the processor 1052 to perform electronic operations in the edge computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as optical disks, flash drives, or any number of other hardware devices. The non-transitory, machine-readable medium 1060 may include instructions to direct the processor 1052 to perform a specific sequence or flow of actions, for example, as described with respect to the flowchart(s) and block diagram(s) of operations and functionality depicted above. As used in, the terms "machine-readable medium" and "computer-readable medium" are interchangeable.

In an example embodiment, the computing device 1050 can be implemented using components/modules/blocks 1052-1086 which are configured as IP Blocks. Each IP Block may contain a hardware RoT (e.g., device identifier composition engine, or DICE), where a DICE key may be used to identify and attest the IP Block firmware to a peer IP Block or remotely to one or more of components/modules/blocks 1062-1080.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 10A and 10B are intended to depict a high-level view of components of a device, subsystem, or arrangement of an edge computing node. However, it will be understood that some of the components shown may be omitted, additional components may be present, and a different arrangement of the components shown may occur in other implementations.

Examples of 5G Network Slice Instance Configuration with Distributed Ledger Traceability and AI-Based Network Inferencing In some aspects, 5G adoption depends on the ability to provide communication service providers (CSPs) the ability to provision, manage, adjust, and operate multiple virtual networks over a common set of physical (wireless and wired) network infrastructure. End-to-end network slice instances (or "slices") carve out virtual logical networks using physical computing and network resources. Each network slice instance can be specifically configured to support performance related to the service supported including capacity, security levels, geographical coverage, and latency. Network slice instances include partitioning the wireless radio of Radio Access Network (RAN), core infrastructure including the Evolved Packet Core (EPC), as well as the switches and Data Center Servers where the 5G mobile applications and content may be hosted. Furthermore, 5G edge devices may also be included in the slice depending on the service latency requirements.

In some aspects, 5G network slice instances will support a wide range of applications from (semi-)autonomous vehicles, remote health monitoring, and first-responder applications requiring the best security/traceability to tiered smartphone plans and IoT devices that may be ok without extra resource traceability.

Conventional network slice techniques use network slice instances that are deployed statically, i.e., as a pipe to a business. In some aspects, network slicing can be configured from the 5G radio access layer and up through the enterprise application layer. A network slice instance may be self-contained, not shared or carved up to create more slices and not dynamically scaled for individual applications. However, the cost of having static network slice instances and/or a single end-to-end blockchain may be too high and may not fulfill the need for edge networks. Additionally, conventional techniques do not use AI-based network inferencing functions to provide real-time market pricing and resource impacts.

As described herein above, distributed ledger (e.g., blockchain) techniques can be private, public, or hybrid. In some aspects, such techniques may be applied to network slicing as a function to trace and track different application resource transfers and communications, as well as to facilitate the resource-related exchange of information (e.g., in connection with billing for network slice instance configuration and deployment functionalities). In some aspects, AI and machine learning can be used to learn and derive predications and inferences associated with network resource usage.

Techniques disclosed herein (e.g., in connection with FIGS. 11-16) utilize 5G innovations including network slicing (e.g., real-time, automated and dynamic slicing) and blockchain techniques to solve the logistics of transfer of resources, and AI to predict and provide impacts to changes in transferring of resources to and from different entities to solve the challenges facing the enterprise and the network operator. AI's role may include inference of market pricing at the time of the request, resource pool, and other user impacts. Techniques disclosed herein enable automation of the billing and changes in SLAs.

In some aspects, 5G network slice instance sharing can be enabled through a blockchain, and every transaction (resource exchange) can require that the owner of the resource will sign the transaction with a private key. Processing techniques associated with dynamic network slice configuration and blockchain traceability can include the following operations and use cases:

(a) Communication Network Operators and/or Cloud Service Providers have different enterprises or businesses that they supply services to. In particular, the edge of the network is providing a location for new services. However, this is not the only deployment scenario, but will be used as an example and provides innovation to the disclosed techniques.

(b) Dynamic Network slicing usage of resources, including and not limited to processing units, memory, input/output, frequency, time, and predictions.

(c) Blockchain can be implemented in various businesses and/or enterprises for contracts, logistics, and several different types of enterprises various enterprise vendors supply applications. The enterprise needs the ability to consolidate the workloads, have vision into the applications for its own KPIs and requirements in order to be efficient. On the platform or server, a capability to consolidate workloads or applications is needed (currently being placed at the edge). Isolation between these different applications is required along with service level agreements in order for the enterprise to get what they pay for. Each of these applications may have their own slicing requirements (e.g., not all may require a blockchain, however for secure transactions between different enterprise applications/slices, a blockchain may be used for traceability). In some aspects, not every application has its own resource usages.

(d) A distributed ledger (e.g., a blockchain) may be used in connection with the transaction of resources (processing, data, memory, Input/Output (I/O), bandwidth, time) between the different resource consumers.

In some aspects, each application within the single enterprise is connected to a network (4G, 5G, 6G, Wi-Fi, unlicensed spectrum, Ethernet, ZigBee, etc.) and the slicing could incorporate multiple radio technologies (RATs) with dynamic CPU, I/O, and memory resource allocations for dynamic slice management.

In some aspects, multiple business and/or enterprises can take advantage of the disclosed architectures, platforms or systems (i.e., 1:n enterprises, 1: n vendors/apps, 1: n cloud service providers, and 1:n communication operators can be included in the disclosed architecture and use cases).

In some aspects, 5G innovations including dynamic network slicing (real time, automated and dynamic slicing) in edge computing are disclosed, including techniques for using blockchain to solve the logistics of transfer of resources, and AI-based network inferencing functions to predict and provide impacts to changes in transferring of resources to and from different entities to solve the challenges facing the enterprise and the network operator. The AI's functionalities can include inference of market pricing at the time of the request, resource pool, and other user impacts. Techniques disclosed herein can be used for automation of the billing and changes in SLAs.

In some aspects, network processing resources (which usage may be predicted via the AI-based network inferencing functions) include CPUs, FPGAs, memory, I/O, bandwidth, telemetrics, key performance indicators (KPIs), at least one radio access network (RAN) of the CSP, a control plane network function of the CSP, a user plane network function of the CSP, at least one hardware processing resource of the CSP in the edge computing network, and at least one data network of the CSP.

Techniques disclosed herein can be associated with the following multiple resource actors:
   (a) operators (who own telecommunication networks and processing resources, e.g., CSPs that own OAM nodes and other management nodes and networks);
   (b) enterprises (who own non-telecommunication processing resources and applications);
   (c) software (or application) vendors (who own applications, typically packaged as executable images in virtual machines or containers as well as network slice instances);
   (d) real-time (RT) orchestrators/schedulers (a special type of software entity that interacts with the other actors to deploy, operate, and shutdown a service);
   (e) cloud service providers (who own processing elements, typically focused on hosting);
   (f) analytics (a special type of software entity that is allowed to monitor traffic, resource utilization and undertakes service reconfiguration on behalf of an orchestrator);
   (g) AI (could be owned by the network operator, the enterprise, and the cloud provider for each of their roles, or provided as a service) used to predict or infer Service Level Agreements, SLA metrics, SLA impact, and so forth (e.g., using AI-based inferencing functions); and
   (h) end users (e.g., network service subscribers such as UEs).

In some aspects, the following interactions between the above actors can be used by the disclosed systems in connection with 5G network slice instance configuration, deployment, and reconfiguration using blockchain traceability and AI-based inferencing functions:
   (a) applications, provided by software vendors request resources;
   (b) orchestrators/schedulers request resources from operators/enterprises/cloud providers/software vendors;

(c) cloud/operators/enterprises/software vendors offer or withdraw resources from their use;
(d) operators/enterprises/software vendors/cloud grant analytics access to traffic and resource utilization traces; and
(e) end users request service instances from orchestrators.

Figure 11:
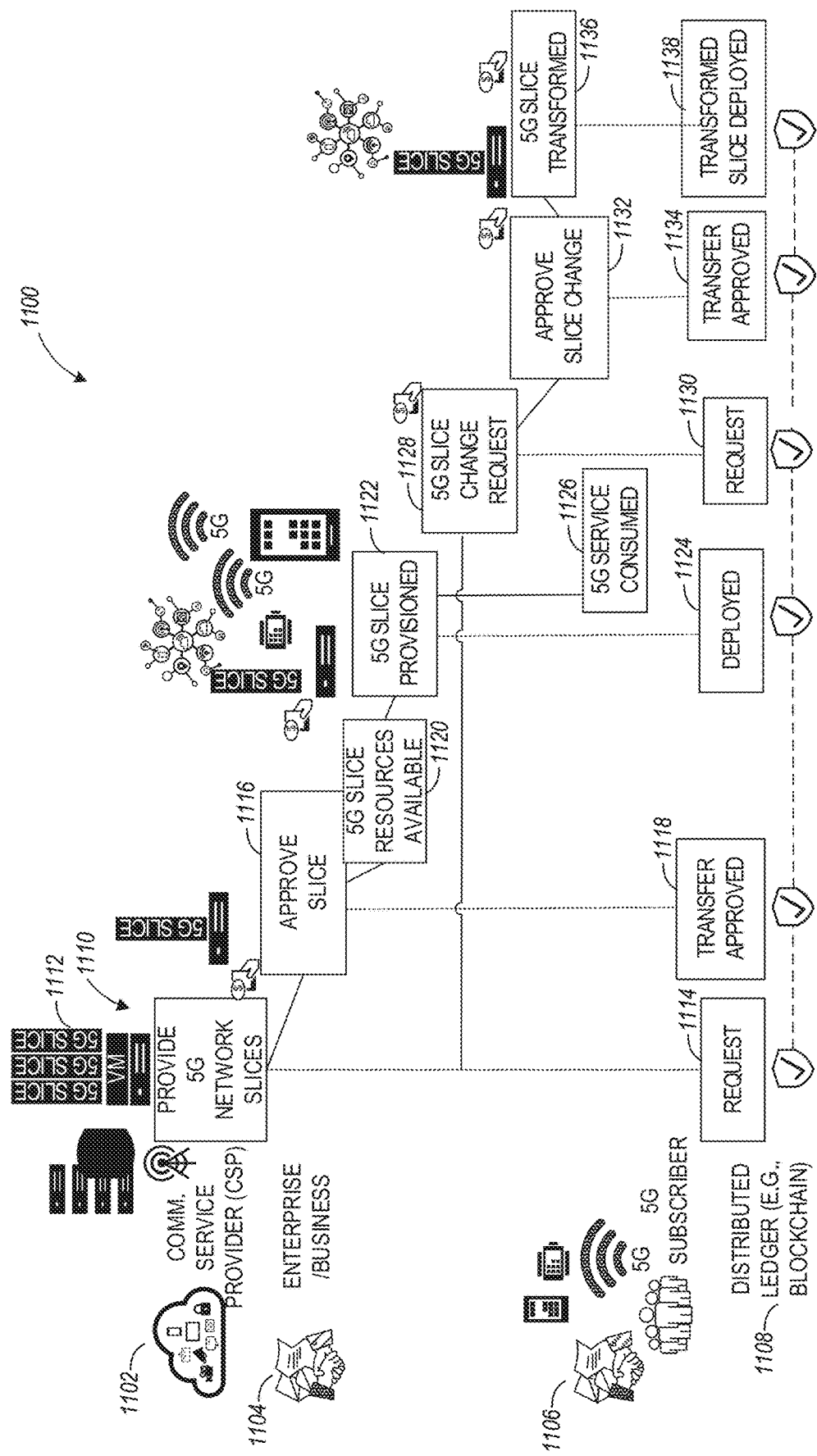
FIG. 11 illustrates 5G network slices with blockchain traceability, according to example.

FIG. 11 illustrates 5G network slices with blockchain traceability, according to example. Referring to FIG. 11, diagram 1100 illustrates provisioning of 5G network slices by a communication services provider 1102 to enterprise/business entities 1104 for use by individual 5G subscribers (e.g., UEs) 1106. As seen in FIG. 11, distributed ledger (e.g., blockchain) techniques can be used to configure a distributed ledger (e.g., 1108) for traceability of subscriber requests in connection with 5G slice usage, 5G slice transfer approvals, 5G slice provisioning and deployment, 5G slice change requests, 5G slice transfer approvals, 5G slice transformations, and so forth.

In some aspects, the blockchain 1108 may be a private blockchain configured on multiple blockchain nodes that form a blockchain network. The blockchain network may be configured by the CSP 1102 using secure credentials (e.g., cryptographic keys) of the CSP 1102. In some aspects, CSP 1102 nodes that perform the disclosed 5G network slice instance related functions including configuring the blockchain network may use a Public Key Encryption (PKE) unit to secure cryptographic keys for accessing the private blockchain 1108. The PKE unit may be primarily used to perform modular exponentiation operations on large numbers, though it performs many other functions as well. Modular exponentiation is defined as the integer operation g mod m, where g is the base, e is the exponent, and m is the modulus. The PKE unit may be optimized to work with modular exponentiation operands in the range of 512 to 8192 bits, in connection with Diffie-Hellman key exchange, DSA digital signature, RSA digital signature, RSA encryption/decryption, and primality testing. The PKE unit may also provide hardware (HW) acceleration of computational primitives required to perform elliptic curve cryptography (ECC) over NIST standard curves prime fields, binary fields, and specialized curves.

The following example pertains to a 5G network (e.g., a 5G network of the CSP 1102), using a distributed ledger (e.g., 1108) and AI-based inferencing engine (e.g., 160, 1446, 1546, 1646) to perform resource usage predictions.

As a population of UEs (e.g., 1106) register with a network and start to run applications, they make requests for PDU sessions, each specifying via an S-NSSAI the type of network slice that they want to use. The procedures for creating the PDU sessions carried out by the network operator (e.g., CSP 1102), consist of identifying an NSI that matches the request and associating the UE with that NSI, or rejecting the request and providing a default NSI, or possibly creating a new NSI. To do NSI management, the network operator maintains its own inventory of resources, which include RANs, control plane network functions, and data plane network functions. The network functions, in general, can be any of the NFs that are described in FIGS. 3A-3D, including edge platforms.

By making use of the private blockchain 1108, the ownership and management of resources can be distributed among multiple network resource owners (e.g., the enterprise 1104), and not be restricted to the network operator (e.g., CSP 1102). The network operator provides the private blockchain 1108 and authorizes additional resource providers (e.g., the enterprise 1 104) to access it. When the network operator wants to create a new NSI, it issues transactions that are recorded, as illustrated in FIG. 11, in the blockchain 1108. Resource providers respond to requests, and the responses are recorded on the blockchain. The selected resource allocation is made, and the "ownership" (in this case allocation of resources to an NSI) is made and recorded. With the resource allocation recorded, it is now possible to make secure, non-repudiable, charging transactions for the resources.

A request for NSIs 1114 is recorded as a first entry in the blockchain 1108. In response to the request, at operation 1110, 5G NSIs 1112 are configured and provided by the CSP 1102. At operation 1116, a 5G NSI of the plurality of available NSIs 1112 is selected and approved (e.g., by the enterprise 1104) for use by the UE 1106. A corresponding "transfer approved" transaction 1118 is recorded in the blockchain 1108. At operation 1120, the 5G resources associated with the selected NSI are made available. At operation 1122, the selected NSI is provisioned. At operation 1126, the 5G service is consumed by the UE 1106 using the provisioned 5G NSI. At operation 1124, a "deployed" transaction is recorded in the blockchain 1108 associated with the provisioned NSI and the consumed 5G service.

At operation 1128, a slice change request may be issued, which is recorded as a "request" transaction in the blockchain 1108. For example, the enterprise 1104 (or the CSP 1102) may use AI-based network inferencing to predict resource usage allocations associated with the selected NSI and/or one or more other configured NSIs. Such resource usage allocations may also be determined (or predicted) based on one or more SLAs configured between any of the network entities illustrated in FIG. 11. The resource allocation may be associated with using different resource allocation from the same resource provider or transfer at least a portion of the resources used by the selected NSI to one or more other resource providers. At operation 1132, an NSI change request is approved (e.g., by the enterprise 1104), and a corresponding "transfer approved" transaction 1134 is recorded in the blockchain 1108. At operation 1136, the selected 5G NSI is transformed based on the approved slice change, and a corresponding "transformed slice deployed" transaction 1138 is recorded in the blockchain 1108.

In some aspects, each of the transactions recorded in the blockchain 1108 may identify the specific network resources used or released at the time the corresponding transaction is recorded.

A network operator wanting to extend the functionality of its network to external networks (in order to let its subscribers visit external networks) may authorize an external network and external resource providers to also access the blockchain 1108.

During network operation, the utilization of network resources (i.e., RANs, control and user plane functions, edge platforms/data networks) are generally in flux, depending on the system load. The system load may vary by time of day, day of week/month, external events, weather conditions, special events such as concerts or athletic events, as well as other factors. These factors may necessitate an operator to change the number of network slice instances of a given type, or change the number or location of resources allocated to a network slice.

During operation, resources participating in a network slice instance, as well as the network operator, may monitor the system load and performance in order to make decisions on reconfiguration as described above. These functions may make the decisions through a private AI-based process, or they may allow an external AI-based performance prediction function to have access to their monitoring information in order to make predictions of system loads in the future and make recommendations for reconfiguration of network resources. An external AI-based prediction function (e.g., a network inferencing function) may be permitted similar access to system load information in external networks to allow predictions and recommendations to be made on a regional or global, rather than local, basis. This AI-based functionality could be implemented in edge computing systems without disrupting existing mobile networks. Implementing this functionality in a 5G network itself may necessitate additions to the 3GPP technical specifications in order to standardize the transaction protocol maintained by the blockchain, and to establish the functionality of the prediction function.

Figure 12:
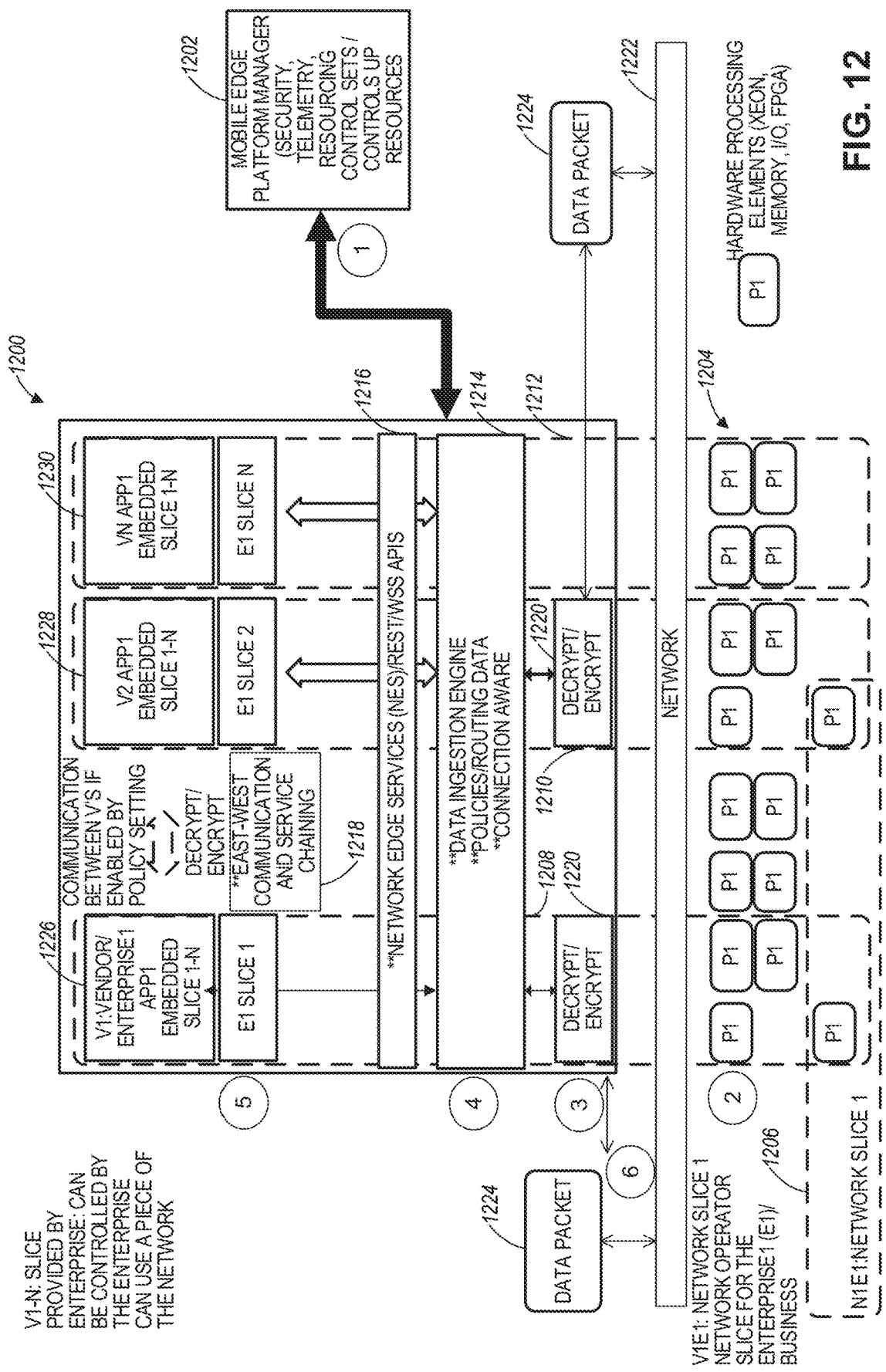
FIG. 12 illustrates a depiction of application and network slices for a single enterprise, single network operator, according to an example.
Figure 14:
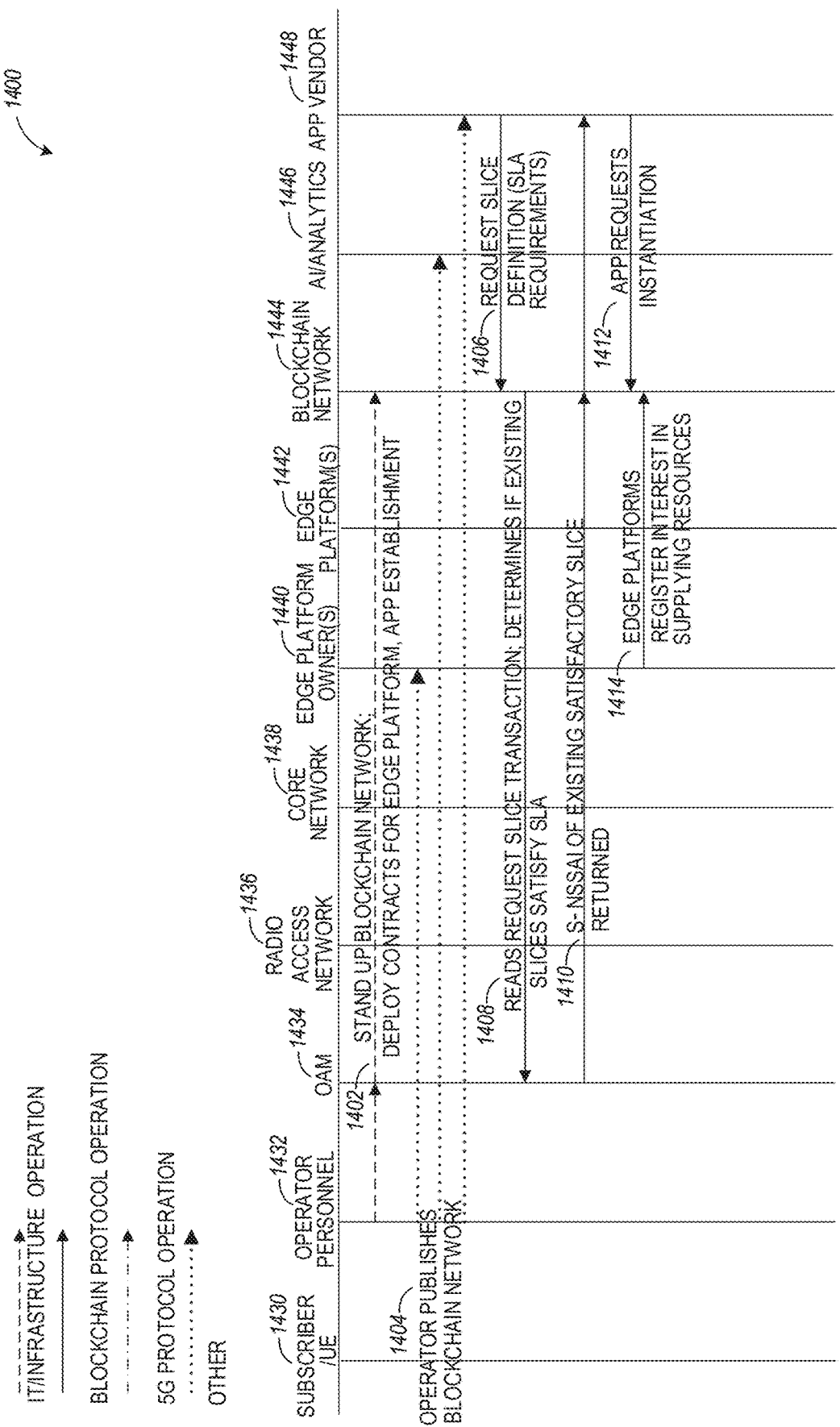
FIG. 14 illustrates a flow diagram of example functionalities performed in connection with setting up a distributed ledger network for resource management, according to an example.
Figure 15:
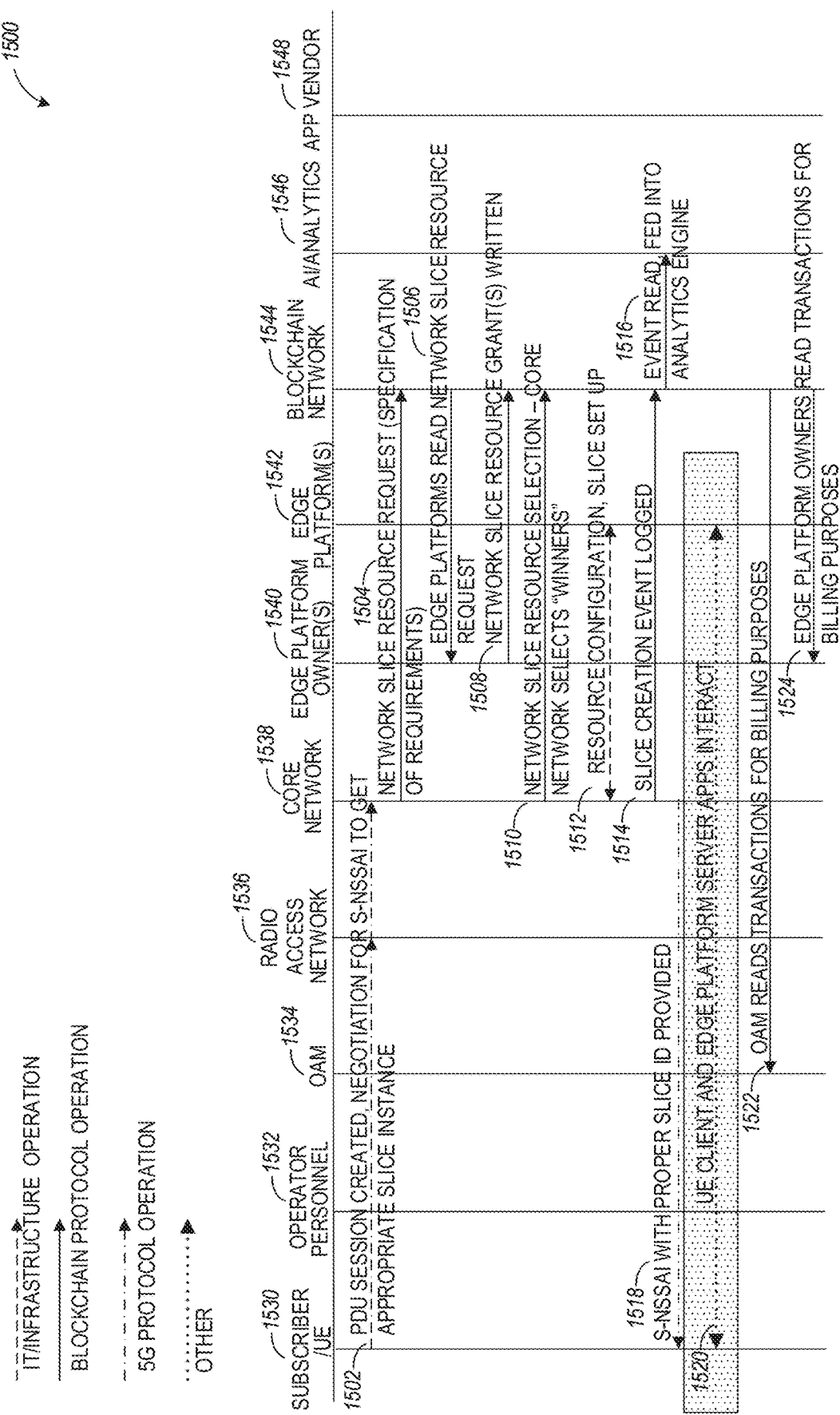
FIG. 15 illustrates a flow diagram of example functionalities performed in connection with network slice instance provisioning using a distributed ledger network for resource management, according to an example.

FIG. 12 illustrates a depiction of network slice instances 1200 for a single enterprise, single network operator, according to an example. Referring to FIG. 12, the communication service provider (e.g., 1102) (or network operator) can have access to multiple network resources 1204. The network resources 1204 can be resources of the network operator and/or resources made available by one or more other entities such as an enterprise (e.g., 1104), an edge platform owner, or other resource providers as illustrated in FIG. 14-FIG. 16. The network operator can configure a network slice instance 1206 (for use by the network operator) using a first subset of the network resources 1204. Additionally, the network operator can configure a plurality of additional NSIs 1208, 1210, . . . , 1212, which can all be associated with the enterprise 1104, using additional subsets of the network resources 1204.

During NSI configuration, a mobile edge platform manager 1202 (which can be associated with the CSP) can configure security, telemetry, AI-based network inferencing, resource allocation, etc. in connection with NSIs of the CSP. In some aspects, the mobile edge platform manager 1202 can perform resource, blockchain, and slice management functions discussed herein. The mobile edge platform manager 1202 can allocate the network resources 1204 and cause generating of the NSIs 1208, 1210, . . . , 1212 using the allocated resources. The mobile edge platform manager 1202 configures encryption/decryption modules 1220 as well as data ingestion engine, data routing policies, communication policies (collectively 1214) and network edge services APIs 1216. The mobile edge platform manager 1202 further configures "East-West" communications 1218 between the slices.

In operation, data packets 1224 communicated via network 1222 are processed by one or more of the NSIs 1208, 1210, . . . , 1212, based on which NSI the data packet originating network entity (e.g., a UE) is associated with. In some aspects, the enterprise can control NSI configuration and reconfiguration and may generate one or more embedded slices within an existing NSI. For example, embedded NSIs 1226, 1228, . . . , 1230 can be associated with one or more application vendors and can be instantiated within corresponding slices 1208, 1210, . . . , 1212. The enterprise and/or the CSP can use AI-based inferencing functions to reconfigure network resources used by the NSIs 1208, 1210, . . . , 1212 or the embedded NSIs 1226, 1228, . . . , 1230.

Figure 13:
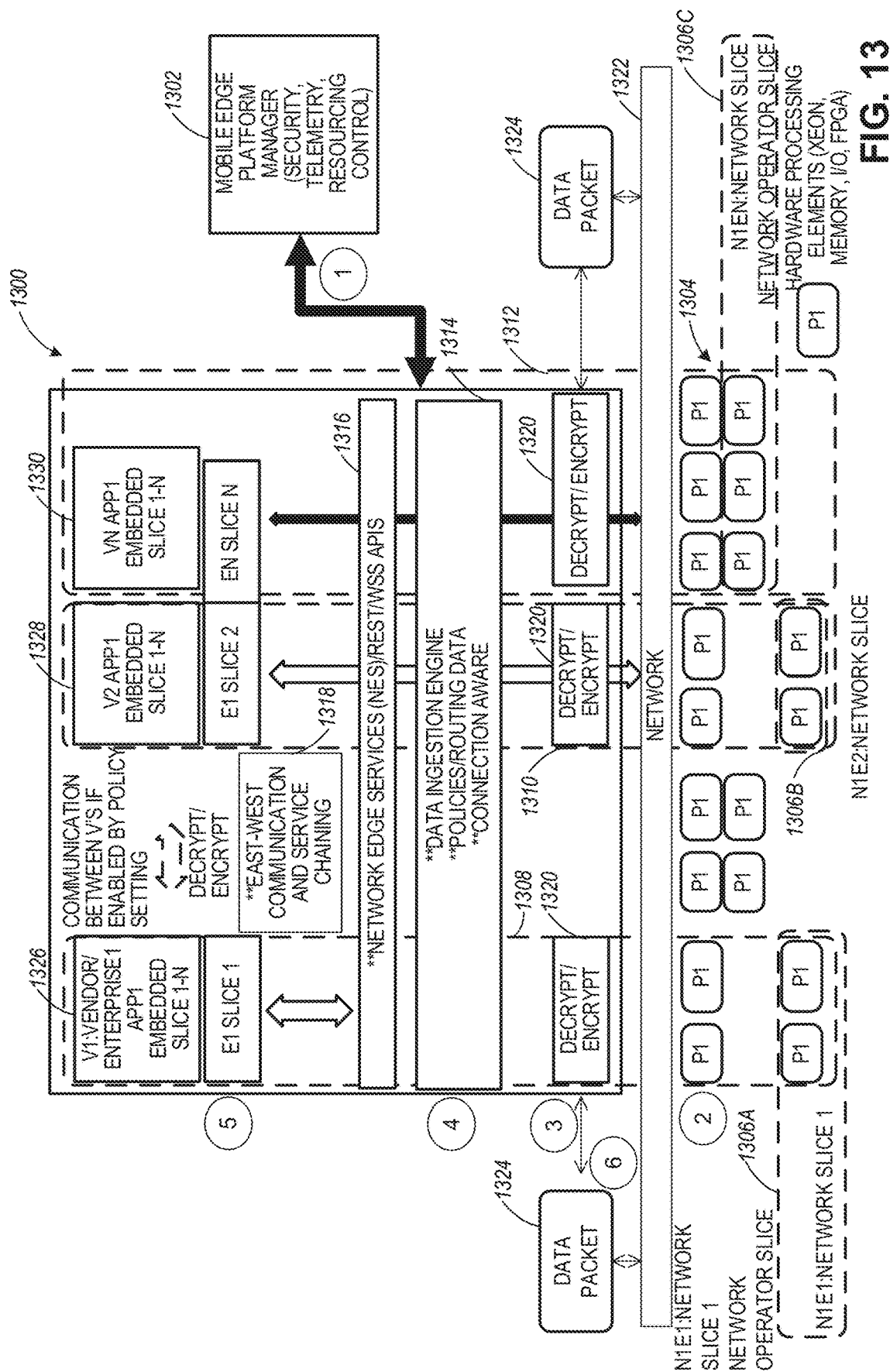
FIG. 13 illustrates a depiction of application and network slices for multiple enterprises, single network operator, according to an example.

FIG. 13 illustrates a depiction of network slice instances 1300 for multiple enterprises, single network operator, according to an example. Referring to FIG. 13, the communication service provider (e.g., 1102) (or network operator) can have access to multiple network resources 1304. The network resources 1304 can be resources of the network operator and/or resources made available by one or more other entities such as an enterprise (e.g., 1 104), an edge platform owner, or other resource providers as illustrated in FIG. 14-FIG. 16. The network operator can configure network slice instances 1306A, 1306B, and 1306C (for use by the network operator) using a first subset of the network resources 1304. Additionally, the network operator can configure a plurality of additional NSIs 1308, 1310, . . . , 1312, which can all be associated with different enterprises and using additional subsets of the network resources 1304.

During NSI configuration, a mobile edge platform manager 1302 (which can be associated with the CSP) can configure security, telemetry, AI-based network inferencing, resource allocation, etc. in connection with NSIs of the CSP. In some aspects, the mobile edge platform manager 1302 can perform resource, blockchain, and slice management functions discussed herein. The mobile edge platform manager 1302 can allocate the network resources 1304 and cause generating of the NSIs 1308, 1310, . . . , 1312 using the allocated resources. The mobile edge platform manager 1302 configures encryption/decryption modules 1320 as well as data ingestion engine, data routing policies, communication policies (collectively 1314) and network edge services APIs 1316 for all NSIs. The mobile edge platform manager 1302 further configures "East-West" communications 1318 between the NSIs.

In operation, data packets 1324 communicated via network 1322 are processed by one or more of the NSIs 1308, 1310 . . . . , 1312, based on which NSI the data packet originating network entity (e.g., a UE) is associated with. In some aspects, the enterprises can control NSI configuration and reconfiguration and may generate one or more embedded slices within an existing NSI. For example, embedded NSIs 1326, 1328, . . . , 1330 can be associated with one or more application vendors and can be instantiated within corresponding slices 1308, 1310, . . . , 1312. The enterprises and/or the CSP can use AI-based inferencing functions to reconfigure network resources used by the NSIs 1308, 1310, . . . , 1312 or the embedded NSIs 1326, 1328, . . . , 1330. As illustrated in FIG. 13, the CSP uses a separate network slice instances (e.g., 1306A, 1306B, 1306C) to manage NSIs allocated to each of the enterprises.

FIG. 14 illustrates a flow diagram 1400 of example functionalities performed in connection with setting up a distributed ledger network for resource management, according to an example. The communication exchange illustrated in FIG. 14 takes place between the following network entities: a subscriber/UE 1430, CSP (e.g., operator personnel of the CSP) 1432, an OAM node 1434, a RAN 1436, a core network 1438, edge platform owners 1440, edge platforms 1442, a blockchain network 1444, AI-based analytics node 1446, and an application vendor 1448.

At operation 1402, CSP 1432 using the OAM 1434 configures the blockchain network 1444 (e.g., by deploying contracts for edge platforms and application establishment). At operation 1404, the CSP 1432 publishes the blockchain network, and the edge platform owners, CSP, and application developers become known to each other. At operation 1406, the application vendor 1448 on-boards the application and a slice definition request (e.g., associated with the SLA requirements) is recorded by the blockchain network 1444. At 1408, the OAM 1434 meets the slice definition request transaction and determines if existing slices satisfy the SLA requirements of the application vendor. At operation 1410, S-NSSAI of an existing satisfactory NSI is returned and recorded as a new transaction within the blockchain network 1444, which is read by the application vendor 1448. At operation 1412, the application of the application vendor requests instantiation and a corresponding transaction is recorded by the blockchain network 1444. At operation 1414, the edge platform owners 1440 register interest in supplying network resources for the indicated NSI, and a corresponding transaction is recorded in the blockchain network 1444.

FIG. 15 illustrates a flow diagram of example functionalities performed in connection with network slice instance provisioning using a distributed ledger network for resource management, according to an example. The communication exchange illustrated in FIG. 15 takes place between the following network entities: a subscriber/UE 1530, CSP (e.g., operator personnel of the CSP) 1532, an OAM node 1434, a RAN 1536, a core network 1538, edge platform owners 1540, edge platforms 1542, a blockchain network 1544, AI-based analytics node 1546, and an application vendor 1548.

At operation 1502, a PDU session is created and a negotiation for S-NSSAI to obtain an appropriate NSI takes place between the UE 1530, the RAN 1536, and the core network 1538. At operation 1504, a network slice resource request (e.g., specification of requirements) is initiated by the core network 1538 and recorded as a transaction by the blockchain network 1544. At operation 1506, the edge platforms 1542 perform a read of a distributed ledger of the blockchain network 1544 to obtain the network slice resource request. At operation 1508, one or more network slice resource grants by the edge platform owners 1540 associated with the edge platforms 1542 are recorded as a corresponding transaction by the blockchain network 1544. At operation 1510, the core network selects optimal network slice resources for determined NSIs and a corresponding transaction is recorded by the blockchain network 1544. At operation 1512, resources are configured between the core network 1538 and the edge platforms 1542 to set up the NSIs. At operation 1514, a slice creation event is logged by the blockchain network 1544. At operation 1516, the AI-based analytics node 1546 reads one or more of the transactions recorded by the blockchain network 1544 in connection with the NSI generation. At operation 1518, the core network 1538 provides the UE 1530 with the S-NSSAI with the corresponding slice ID of the allocated NSI. At operation 1520, the UE 1530 and one or more nodes of the edge platforms 1542 interact via the established NSI. At operation 1522, OAM 1534 may read one or more of the recorded transactions in the blockchain network 1544 (e.g., for billing purposes). At operation 1524, the edge platform owners 1540 may read one or more of the recorded transactions in the blockchain network 1544 (e.g., for billing purposes).

FIG. 16 illustrates a flow diagram of example functionalities performed in connection with the re-provisioning of network slice instances using a distributed ledger network for resource management, according to an example. The communication exchange illustrated in FIG. 16 takes place between the following network entities: a subscriber/UE 1630, CSP (e.g., operator personnel of the CSP) 1632, an OAM node 1634, a RAN 1636, a core network 1638, edge platform owners 1640, edge platforms 1642, a blockchain network 1644, AI-based analytics node 1646, and an application vendor 1648.

At operation 1602, the AI-based analytics node 1646 predicts network traffic trends. At operation 1604, the AI-based analytics node 1646 records a corresponding transaction in the blockchain network 1644. At operation 1606, the OAM 1634 reads the transaction recorded by the AI-based analytics node 1646 in connection with the predicted network traffic trend. At 1608, CSP 1632 may optionally intervene to approve NSI redefinition (e.g., reconfiguration of resources used by one or more of the available NSIs). At operation 1610, the OAM 1634 generates a network slice resize request (with the specification of resource usage requirements and other configuration requirements) which is recorded by the blockchain network 1644. If at operation 1612, the core network 1638 generates a network slice resize request (with the specification of resource usage requirements and other configuration requirements) which is recorded by the blockchain network 1644. At operation 1614, the edge platform 1642 (via the edge platform owners 1640) read the recorded network slice resize request from the blockchain network 1644. At operation 1616, the edge platform 1642 record a network slice resource grant as a transaction in the blockchain network 1644. At operation 1618, the core network 1638 selects the network slice resources based on the resize request and a corresponding transaction is recorded by the blockchain network 1644. At operation 1620, the resource configuration and slice setup procedure takes place between the core network 1638 in the edge platform 1642. At operation 1622, a slice creation event is logged by the blockchain network 1644.

At operation 1624, the AI-based analytics node 1646 performs a read of one or more of the recorded transactions in the blockchain network 1644 for purposes of performing resource utilization prediction for subsequent NSI resource utilization adjustments. The AI-based analytics node 1646 can be configured to determine new guardrails and impact to network resource utilization if changes to one or more of existing SLAs or NSAs occurs and are detected via a transaction read using the blockchain network 1644.

In some aspects, a system configured to track network slicing operations and perform one or more of the functionalities discussed herein can be implemented as a standalone computing device, a server blade, a network interface card or a combination thereof, integrated as part of an edge computing network.

In some aspects, the information elements required to perform the disclosed interactions are complex and dynamic and must be access controlled. It may be visualized as a resource graph (i.e., which CPUs, memories, bandwidth, I/O, storage systems, network nodes), which resources are owned by which actor, the state of allocation (of a resource) to a particular service instance. However, for security, not all parts of this "graph" are equally visible to each actor. The elements are stored in different slices; communication between slices and thus block chain is based on policies and rights settings, which are dynamic in nature. In some aspects, AI techniques disclosed herein can be used to infer/predict SLA impacts to the network operator resources and the enterprise SLAs, including the price of resourcing at the time of request for transfer of resourcing.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

ADDITIONAL NOTES AND EXAMPLES

Additional examples of the presently described method, system, and device embodiments include the following, non-limiting configurations. Each of the following non-limiting examples may stand on its own or may be combined in any permutation or combination with any one or more of the other examples provided below or throughout the present disclosure.

Example 1 is a system configured to track network slicing operations, the system including memory and processing circuitry coupled to the memory. The processing circuitry is configured to select a network slice instance from a plurality of available network slice instances based on a network slice instance type specified by a client node, the plurality of available network slice instances using virtualized network resources of a first network resource provider; associate the client node with the selected network slice instance, determine using an artificial intelligence (AI)-based network inferencing function, utilization of the virtualized network resources of the first network resource provider by the plurality of available network slice instances; and record a ledger entry of associating the selected network slice instance with the client node in a distributed ledger of a distributed ledger network, the distributed ledger further including at least a second ledger entry indicating allocations of resource subsets of the network resources to each of the plurality of available network slice instances based on the determined utilization.

In Example 2, the subject matter of Example 1 includes subject matter where the processing circuitry is further configured to adjust the allocations of the resource subsets to each of the plurality of available network slice instances based on the determined utilization.

In Example 3, the subject matter of Example 2 includes subject matter where the processing circuitry is further configured to record a resource transformation entry in the distributed ledger of the distributed ledger network, the resource transformation entry indicating the adjusted allocations of the resource subsets.

In Example 4, the subject matter of Examples 2-3 includes subject matter where the processing circuitry is further configured to determine using the AI-based network inferencing function, a second utilization of a resource subset of the resource subsets of the first network resource provider used by the selected network slice instance associated with the client node; and adjust allocations of the resource subset used by the selected network slice instance based on the determined second utilization.

In Example 5, the subject matter of Example 4 includes subject matter where the processing circuitry is further configured to record a resource transformation entry in the distributed ledger of the distributed ledger network, the resource transformation entry indicating the adjusted allocations of the resource subset used by the selected network slice instance.

In Example 6, the subject matter of Examples 2-5 includes subject matter where the processing circuitry is further configured to obtain, from an orchestration provider, a Service Level Agreement (SLA), the SLA defining usage of the network resources of the first network resource provider by network slice instances associated with the client node; and adjust the allocations of the resource subsets to each of the plurality of available network slice instances based on the usage defined in the SLA.

In Example 7, the subject matter of Example 6 includes subject matter where the processing circuitry is further configured to determine using the AI-based network inferencing function, a second utilization of a resource subset of the resource subsets of the first network resource provider used by the selected network slice instance associated with the client node; and adjust allocations of the resource subset used by the selected network slice instance based on the determined second utilization and the usage defined in the SLA.

In Example 8, the subject matter of Examples 6-7 includes subject matter where the processing circuitry is further configured to obtain, from the orchestration provider, an updated SLA, the updated SLA defining updated usage of the network resources of the first network resource provider by the network slice instances associated with the client node; and determine using the AI-based network inferencing function, updated allocations of the resource subset to each of the plurality of available network slice instances based on the updated usage defined by the updated SLA.

Example 9 is a computing device in an edge computing network, comprising: a network interface card (NIC); and processing circuitry coupled to the NIC. The processing circuitry is configured to perform operations to decode a packet data unit (PDU) session request received via the NIC from a client node coupled to the edge computing network, the PDU session request specifying a type of a network slice instance. A network slice instance is selected from a plurality of available network slice instances based on the type of the network slice instance, the plurality of available network slice instances associated with virtualized network resources of a first network resource provider within the edge computing network. The client node is associated with the selected network slice instance. A ledger entry is communicated via the NIC to a distributed ledger node within the edge computing network for recordation in a distributed ledger. The ledger entry associates the selected network slice instance with the client node. The distributed ledger further includes a plurality of additional ledger entries indicating resource subsets of the virtualized network resources allocated to each of the plurality of available network slice instances.

In Example 10, the subject matter of Example 9 includes subject matter where the first network resource provider is a communications service provider (CSP), and wherein the network resources include one or more of: at least one radio access network (RAN) of the CSP; a control plane network function of the CSP; a user plane network function of the CSP; at least one hardware processing resource of the CSP in the edge computing network; and at least one data network of the CSP.

In Example 11, the subject matter of Examples 9-10 includes subject matter where the PDU session request includes a single network slice selection assistance information (S-NSSAI) information element identifying the type of the network slice instance.

In Example 12, the subject matter of Examples 9-11 includes subject matter where the type of the network slice instance is a slice service type (SST) value.

In Example 13, the subject matter of Example 12 includes subject matter where the SST value indicates one of a network slice instance for 5G enhanced mobile broadband (eMBB) communications; a network slice instance for ultra-reliable low latency communications (URLLC); and a network slice instance for massive Internet-of-Things (MIoT) communications.

In Example 14, the subject matter of Examples 9-13 includes subject matter where the distributed ledger is a private blockchain associated with the first network resource provider and the distributed ledger network is a blockchain network.

In Example 15, the subject matter of Example 14 includes subject matter where the instructions further configure the processing circuitry to perform operations to encode an authorization message for transmission to a second network resource provider, the authorization message authorizing the second network resource provider to access the private blockchain.

In Example 16, the subject matter of Example 15 includes subject matter where the private blockchain further includes a blockchain entry from the second network resource provider, the blockchain entry from the second network resource provider indicating network resources of the second network resource provider used for provisioning additional network slice instances.

In Example 17, the subject matter of Example 16 includes subject matter where the instructions further configure the processing circuitry to perform operations to detect the client node is associated with one of the additional network slice instances; and record a deployment blockchain entry in the private blockchain within the blockchain network, the deployment blockchain entry indicating one of the additional network slice instances of the second network resource provider is consumed by the client node.

In Example 18, the subject matter of Examples 9-17 includes subject matter where the instructions further configure the processing circuitry to perform operations to determine using an artificial intelligence (AI)-based network inferencing function, utilization of the network resources of the first network resource provider by the plurality of available network slice instances; and adjust allocations of the resource subsets to each of the plurality of available network slice instances based on the determined utilization.

In Example 19, the subject matter of Example 18 includes subject matter where the instructions further configure the processing circuitry to perform operations to record a resource transformation entry in the distributed ledger of the distributed ledger network, the resource transformation entry indicating the adjusted allocations of the resource subsets.

In Example 20, the subject matter of Examples 18-19 includes subject matter where the instructions further configure the processing circuitry to perform operations to determine using the AI-based network inferencing function, a second utilization of a resource subset of the resource subsets of the first network resource provider used by the selected network slice instance associated with the client node; and adjust allocations of the resource subset used by the selected network slice instance based on the determined second utilization.

In Example 21, the subject matter of Example 20 includes subject matter where the instructions further configure the processing circuitry to perform operations to record a resource transformation entry in the distributed ledger of the distributed ledger network, the resource transformation entry indicating the adjusted allocations of the resource subset used by the selected network slice instance.

In Example 22, the subject matter of Examples 18-21 includes subject matter where the instructions further configure the processing circuitry to perform operations to obtain, from an orchestration provider, a Service Level Agreement (SLA), the SLA defining usage of the network resources of the first network resource provider by network slice instances associated with the client node; and adjust the allocations of the resource subsets to each of the plurality of available network slice instances based on the usage defined in the SLA.

In Example 23, the subject matter of Example 22 includes subject matter where the instructions further configure the processing circuitry to perform operations to determine using the AI-based network inferencing function, a second utilization of a resource subset of the resource subsets of the first network resource provider used by the selected network slice instance associated with the client node; and adjust allocations of the resource subset used by the selected network slice instance based on the determined second utilization and the usage defined in the SLA.

In Example 24, the subject matter of Examples 22-23 includes subject matter where the instructions further configure the processing circuitry to perform operations to obtain, from the orchestration provider, an updated SLA, the updated SLA defining updated usage of the network resources of the first network resource provider by the network slice instances associated with the client node; and determine using the AI-based network inferencing function, updated allocations of the resource subset to each of the plurality of available network slice instances based on the updated usage defined by the updated SLA.

Example 25 is at least one non-transitory machine-readable storage medium comprising instructions subject matter where the instructions, when executed by a processing circuitry of a computing device operable in an edge computing network, cause the processing circuitry to perform operations that: decode a packet data unit (PDU) session request from a client node, the PDU session request specifying a type of a network slice instance; select a network slice instance from a plurality of available network slice instances based on the type of the network slice instance, the plurality of available network slice instances associated with network resources of a first network resource provider; associate the client node with the selected network slice instance; and record a ledger entry of associating the selected network slice instance with the client node in a distributed ledger of a distributed ledger network, the distributed ledger further including a plurality of additional ledger entries indicating resource subsets of the network resources allocated to each of the plurality of available network slice instances.

In Example 26, the subject matter of Example 25 includes subject matter where the first network resource provider is a communications service provider (CSP), and wherein the network resources include one or more of: at least one radio access network (RAN) of the CSP; a control plane network function of the CSP; a user plane network function of the CSP; at least one hardware processing resource of the CSP in the edge computing network; and at least one data network of the CSP.

In Example 27, the subject matter of Examples 25-26 includes subject matter where the PDU session request includes a single network slice selection assistance information (S-NSSAI) information element identifying the type of the network slice instance.

In Example 28, the subject matter of Examples 25-27 includes subject matter where the type of the network slice instance is a slice service type (SST) value.

In Example 29, the subject matter of Example 28 includes subject matter where the SST value indicates one of a network slice instance for 5G enhanced mobile broadband (eMBB) communications; a network slice instance for ultra-reliable low latency communications (URLLC); and a network slice instance for massive Internet-of-Things (MIoT) communications.

In Example 30, the subject matter of Examples 25-29 includes subject matter where the distributed ledger is a private blockchain associated with the first network resource provider and the distributed ledger network is a blockchain network.

In Example 31, the subject matter of Example 30 includes subject matter where the instructions further cause the processing circuitry to perform operations that: encode an authorization message for transmission to a second network resource provider, the authorization message authorizing the second network resource provider to access the private blockchain.

In Example 32, the subject matter of Example 31 includes subject matter where the private blockchain further includes a blockchain entry from the second network resource provider, the blockchain entry from the second network resource provider indicating network resources of the second network resource provider used for provisioning additional network slice instances.

In Example 33, the subject matter of Example 32 includes subject matter where the instructions further cause the processing circuitry to perform operations that: detect the client node is associated with one of the additional network slice instances; and record a deployment blockchain entry in the private blockchain within the blockchain network, the deployment blockchain entry indicating one of the additional network slice instances of the second network resource provider is consumed by the client node.

In Example 34, the subject matter of Examples 25-33 includes subject matter where the instructions further cause the processing circuitry to perform operations that: determine using an artificial intelligence (AI)-based network inferencing function, utilization of the network resources of the first network resource provider by the plurality of available network slice instances; and adjust allocations of the resource subsets to each of the plurality of available network slice instances based on the determined utilization.

In Example 35, the subject matter of Example 34 includes subject matter where the instructions further cause the processing circuitry to perform operations that record a resource transformation entry in the distributed ledger of the distributed ledger network, the resource transformation entry indicating the adjusted allocations of the resource subsets.

In Example 36, the subject matter of Examples 34-35 includes subject matter where the instructions further cause the processing circuitry to perform operations that: determine using the AI-based network inferencing function, a second utilization of a resource subset of the resource subsets of the first network resource provider used by the selected network slice instance associated with the client node; and adjust allocations of the resource subset used by the selected network slice instance based on the determined second utilization.

In Example 37, the subject matter of Example 36 includes subject matter where the instructions further cause the processing circuitry to perform operations that record a resource transformation entry in the distributed ledger of the distributed ledger network, the resource transformation entry indicating the adjusted allocations of the resource subset used by the selected network slice instance.

In Example 38, the subject matter of Examples 34-37 includes subject matter where the instructions further cause the processing circuitry to perform operations that: obtain, from an orchestration provider, a Service Level Agreement (SLA), the SLA defining usage of the network resources of the first network resource provider by network slice instances associated with the client node; and adjust the allocations of the resource subsets to each of the plurality of available network slice instances based on the usage defined in the SLA.

In Example 39, the subject matter of Example 38 includes subject matter where the instructions further cause the processing circuitry to perform operations that: determine using the AI-based network inferencing function, a second utilization of a resource subset of the resource subsets of the first network resource provider used by the selected network slice instance associated with the client node; and adjust allocations of the resource subset used by the selected network slice instance based on the determined second utilization and the usage defined in the SLA.

In Example 40, the subject matter of Examples 38-39 includes subject matter where the instructions further cause the processing circuitry to perform operations that: obtain, from the orchestration provider, an updated SLA, the updated SLA defining updated usage of the network resources of the first network resource provider by the network slice instances associated with the client node; and determine using the AI-based network inferencing function, updated allocations of the resource subset to each of the plurality of available network slice instances based on the updated usage defined by the updated SLA.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, the inventive subject matter lies in less than all features of a single disclosed aspect. Thus the following claims are hereby incorporated into the Detailed Description, with each claim standing on its own as a separate aspect.

What is claimed is:

1. A system configured to track network slicing operations, the system comprising:
   memory; and
   processing circuitry coupled to the memory, the processing circuitry configured to:
   select a network slice instance from a plurality of available network slice instances based on a network slice instance type specified by a client node, the plurality of available network slice instances using virtualized network resources of a first network resource provider, the network slice instance selected further based on a data rate throughput of a wireless communication link used by the network slice instance;
   associate the client node with the selected network slice instance;
   determine using an artificial intelligence (AI)-based network inferencing function, utilization of the virtualized network resources of the first network resource provider by the plurality of available network slice instances;
   determine allocations of resource subsets of the virtualized network resources to each of the plurality of available network slice instances based on the determined utilization; and
   record a ledger entry of associating the selected network slice instance with the client node in a distributed ledger of a distributed ledger network, the distributed ledger further including at least a second ledger entry indicating the allocations of resource subsets of the virtualized network resources of the first network resource provider and virtualized network resources of at least a second network resource provider to each of the plurality of available network slice instances based on the determined utilization of the virtualized network resources of the first network resource provider.

2. The system of claim 1, wherein the processing circuitry is further configured to:
   adjust the allocations of the resource subsets to each of the plurality of available network slice instances based on the determined utilization.

3. The system of claim 2, wherein the processing circuitry is further configured to:
   record a resource transformation entry in the distributed ledger of the distributed ledger network, the resource transformation entry indicating the adjusted allocations of the resource sub sets.

4. The system of claim 2, wherein the processing circuitry is further configured to:
   determine using the AI-based network inferencing function, a second utilization of a resource subset of the resource subsets of the first network resource provider used by the selected network slice instance associated with the client node; and
   adjust allocations of the resource subset used by the selected network slice instance based on the determined second utilization.

5. The system of claim 4, wherein the processing circuitry is further configured to:
   record a resource transformation entry in the distributed ledger of the distributed ledger network, the resource transformation entry indicating the adjusted allocations of the resource subset used by the selected network slice instance.

6. The system of claim 2, wherein the processing circuitry is further configured to:
   obtain, from an orchestration provider, a Service Level Agreement (SLA), the SLA defining usage of the virtualized network resources of the first network resource provider by network slice instances associated with the client node; and
   adjust the allocations of the resource subsets to each of the plurality of available network slice instances based on the usage defined in the SLA.

7. The system of claim 6, wherein the processing circuitry is further configured to:
   determine using the AI-based network inferencing function, a second utilization of a resource subset of the resource subsets of the first network resource provider used by the selected network slice instance associated with the client node; and
   adjust allocations of the resource subset used by the selected network slice instance based on the determined second utilization and the usage defined in the SLA.

8. The system of claim 6, wherein the processing circuitry is further configured to:

obtain, from the orchestration provider, an updated SLA, the updated SLA defining updated usage of the virtualized network resources of the first network resource provider by the network slice instances associated with the client node; and determine using the AI-based network inferencing function, updated allocations of the resource subset to each of the plurality of available network slice instances based on the updated usage defined by the updated SLA.

9. A computing device in an edge computing network, comprising:

a network interface card (NIC); and processing circuitry coupled to the NIC, the processing circuitry configured to perform operations to:

decode a packet data unit (PDU) session request from a client node, the PDU session request including an indicator specifying a type of network slice instance, the type of network slice instance indicative of a data rate throughput of a wireless communication link used by the network slice instance;

select a network slice instance from a plurality of available network slice instances based on the type of network slice instance, the plurality of available network slice instances associated with virtualized network resources of a first network resource provider within the edge computing network;

associate the client node with the selected network slice instance; and communicate via the NIC, a ledger entry to a distributed ledger node within the edge computing network for recordation in a distributed ledger, the ledger entry associating the selected network slice instance with the client node and indicating allocation of the virtualized network resources to the client node, the distributed ledger further including a plurality of additional ledger entries indicating allocation of resource subsets of the virtualized network resources of the first network resource provider and virtualized network resources of at least a second network resource provider to each of the plurality of available network slice instances based on utilization of the virtualized network resources of the first network resource provider by the plurality of available network slice instances.

10. The computing device of claim 9, wherein the first network resource provider is a communications service provider (CSP) within the edge computing network, and wherein the virtualized network resources include one or more of:

at least one radio access network (RAN) of the CSP;
a control plane network function of the CSP;
a user plane network function of the CSP;
at least one hardware processing resource of the CSP in the edge computing network; and
at least one data network of the CSP.

11. The computing device of claim 9, wherein the indicator in the PDU session request includes a single network slice selection assistance information (S-NSSAI) information element identifying the type of network slice instance.

12. The computing device of claim 9, wherein the type of network slice instance is a slice service type (SST) value.

13. The computing device of claim 12, wherein the SST value indicates one of:

a network slice instance for 5G enhanced mobile broadband (eMBB) communications;

a network slice instance for ultra-reliable low latency communications (URLLC); and a network slice instance for massive Internet-of-Things (MIoT) communications.

14. The computing device of claim 9, wherein the distributed ledger is a private blockchain associated with the first network resource provider and the distributed ledger node is associated with a blockchain network within the edge computing network.

15. The computing device of claim 14, wherein the processing circuitry is further configured to perform operations to:

encode an authorization message for transmission to a second network resource provider via the NIC, the authorization message authorizing the second network resource provider to access the private blockchain.

16. The computing device of claim 15, wherein the private blockchain further includes a blockchain entry from the second network resource provider, the blockchain entry from the second network resource provider indicating virtualized network resources of the second network resource provider used for provisioning additional network slice instances.

17. The computing device of claim 16, wherein the processing circuitry is further configured to perform operations to:

detect the client node is associated with one of the additional network slice instances; and record via the NIC, a deployment blockchain entry in the private blockchain within the blockchain network, the deployment blockchain entry indicating one of the additional network slice instances of the second network resource provider is consumed by the client node.

18. At least one non-transitory machine-readable storage medium comprising instructions, wherein the instructions, when executed by a processing circuitry of a computing device operable in an edge computing network, cause the processing circuitry to perform operations that:

decode a packet data unit (PDU) session request from a client node, the PDU session request including an indicator specifying a type of network slice instance, the type of network slice instance indicative of a data rate throughput of a wireless communication link used by the network slice instance;

select a network slice instance from a plurality of available network slice instances based on the type of network slice instance, the plurality of available network slice instances associated with virtualized network resources of a first network resource provider;

associate the client node with the selected network slice instance; and record a ledger entry of associating the selected network slice instance with the client node in a distributed ledger of a distributed ledger node within the edge computing network, the ledger entry indicating allocation of the virtualized network resources to the client node, the distributed ledger further including a plurality of additional ledger entries indicating allocation of resource subsets of the virtualized network resources of the first network resource provider and virtualized network resources of at least a second network resource provider to each of the plurality of available network slice instances based on utilization of the virtualized network resources of the first network resource provider by the plurality of available network slice instances.

19. The at least one non-transitory machine-readable storage medium of claim 18, wherein the instructions further cause the processing circuitry to perform operations that:
- determine using an artificial intelligence (AI)-based network inferencing function, utilization of the virtualized network resources of the first network resource provider by the plurality of available network slice instances; and
- adjust allocations of the resource subsets to each of the plurality of available network slice instances based on the determined utilization.

20. The at least one non-transitory machine-readable storage medium of claim 19, wherein the instructions further cause the processing circuitry to perform operations that:
- record a resource transformation entry in the distributed ledger of the distributed ledger node, the resource transformation entry indicating the adjusted allocations of the resource subsets.

* * * * *